US006551561B1

United States Patent
Tabatabaie-Raissi et al.

(10) Patent No.: US 6,551,561 B1
(45) Date of Patent: Apr. 22, 2003

(54) APPARATUS FOR DECOUPLED THERMO-PHOTOCATALYTIC POLLUTION CONTROL

(75) Inventors: Ali Tabatabaie-Raissi, Melbourne, FL (US); Nazim Z. Muradov, Melbourne, FL (US); Eric Martin, Indialantic, FL (US)

(73) Assignee: University of Central Florida, Orlando, FL (US)

( * ) Notice: Subject to any disclaimer, the term of this patent is extended or adjusted under 35 U.S.C. 154(b) by 51 days.

(21) Appl. No.: 09/784,602

(22) Filed: Feb. 15, 2001

Related U.S. Application Data

(62) Division of application No. 09/289,401, filed on Apr. 10, 1999, now Pat. No. 6,342,128.
(60) Provisional application No. 60/081,324, filed on Apr. 10, 1998, and provisional application No. 60/107,236, filed on Nov. 5, 1998.

(51) Int. Cl.⁷ ................................................ B01J 19/08
(52) U.S. Cl. ..................... 422/186; 422/186.3; 422/209; 423/213.7
(58) Field of Search ........................ 422/186, 186.3, 422/209; 210/748, 763; 423/213.7

(56) References Cited

U.S. PATENT DOCUMENTS

| | | | |
|---|---|---|---|
| 4,437,954 A | 3/1984 | Sammells | 204/129 |
| 4,446,236 A | 5/1984 | Clyde | 435/287 |
| 4,602,988 A | 7/1986 | Kolts | 204/157.52 |
| 4,966,759 A | 10/1990 | Robertson | 422/186 |
| 5,045,288 A | 9/1991 | Raupp | 42/186.3 |
| 5,069,855 A | 12/1991 | Ritchie | 422/186 |
| 5,449,443 A | 9/1995 | Jacoby | 204/157.3 |
| 5,564,065 A | 10/1996 | Fleck | 422/186.3 |
| 5,683,589 A | 11/1997 | De Lasa | 210/748 |
| 5,689,798 A | * 11/1997 | Oeste | 422/168 |
| 5,862,449 A | 1/1999 | Bischoff | 422/186.3 |
| 5,937,266 A | 8/1999 | Kadoya | 422/186.3 |
| 5,965,097 A | 10/1999 | Mortec | 423/210 |

OTHER PUBLICATIONS

Muradov, Nazim, et al. (Selective Photocatalytic Destruction of Airbourne VOC's, 1996, Solar Energy, vol. 56, No. 5, pp. 445–453) No month available.*

* cited by examiner

Primary Examiner—Nam Nguyen
Assistant Examiner—Wesley A. Nicolas
(74) Attorney, Agent, or Firm—Brian S. Steinberger; Law Offices of Brian S. Steinberger, P.A.

(57) ABSTRACT

A new method for design and scale-up of photocatalytic and thermocatalytic processes is disclosed. The method is based on optimizing photoprocess energetics by decoupling of the process energy efficiency from the DRE for target contaminants. The technique is applicable to photo-thermocatalytic reactor design and scale-up. At low irradiance levels, the method is based on the implementation of low pressure drop biopolymeric and synthetic polymeric support for titanium dioxide and other band-gap media. At high irradiance levels, the method utilizes multifunctional metal oxide aerogels and other media within a novel rotating fluidized particle bed reactor.

13 Claims, 33 Drawing Sheets

- ●— Experimental Data
- — — Simple line source model prediction
- ——— Line Source with refraction model prediction Normalized Irradiance, $q_r/q_{max}$ ○ Cotton or Glass Fibers ← ← ← Air Flow
∘ Titania Particles ⋯⋯⋯⋯ Irradiance ○ Cotton or Glass Fibers ← ← ← Air Flow
∘ Titania Particles ⋯⋯⋯⋯ Irradiance

APPARATUS FOR DECOUPLED THERMO-PHOTOCATALYTIC POLLUTION CONTROL

This invention is a divisional application of U.S. patent application Ser. No. 09/289,401 filed Apr. 10, 1999 now U.S. Pat. No. 6,342,128, which claims the benefit of priority to Provisional Application No. 60/107,326 filed Nov. 5, 1998 and Provisional Application No. 60/081,324 filed Apr. 10, 1998.

This invention relates to processes and apparatus for photocatalytic, thermocatalytic or combined photo- and thermocatalytic treatment of fluids containing undesirable compounds for pollution control and energy production applications and was made with the financial support of the U.S. Department of Defense, Naval Surface Warfare Center, Indian Head Division under contract number N00174-91-C-0161, Office of Naval Research under Augmentation Awards for Science and Engineering Research Training Program, contract number N00014-93-1-0907, and Army Research Office under Defense University Research Instrumentation Program, contract number DAAH04-96-1-0295.

FIELD OF THE INVENTION

Examples of treatable streams include, among others, ventilation makeup air, ambient air, air from stripping and off-gassing operations, soil vapor extraction (SVE), airborne matter (e.g. organic particulate, biogenic and microbial matter) and process vent gas, wastewater treatment off-gas, liquid effluents (e.g. wastewater, industrial and agricultural runoff) containing at least one undesirable or otherwise unwanted compound. Moreover, this application presents a holistic approach to the design of the high performance photo- and thermocatalytic systems that possess:

i—Rapid species mass transfer to and from the active sites of the catalyst.
ii—Uniform transport of thermal and radiant energy to the active sites of the catalyst.
iii—Decoupling of the conversion efficiency from process intrinsic energy efficiency.
iv—Minimal pressure drop.

BACKGROUND OF THE INVENTION

As environmental regulations become progressively more stringent, new techniques and approaches are needed for dealing with difficult contaminants. For example, the required destruction and removal efficiencies (DREs) for some environmental pollutants, such as toluene diisocyanate (TDI), dioxin, dibenzofurans and polychlorinated biphenyls (PCBs) are extremely high. Conventional methods such as carbon adsorption or liquid scrubbing are not a complete remediation solution due to the fact that they simply transfer contaminants from one medium (i.e. water or air) to another (i.e. solid carbon or scrubbing liquid). On the other hand, incineration and catalytic thermal oxidation present their own limitations. For example, the widespread production and use of chlorinated compounds in the industrially developed countries has resulted in large amounts of halogenated organic contaminants to seep into the soil, water and air. Incineration and even thermocatalytic oxidation of wastestreams containing halogenated compounds in many cases produce emission of products of incomplete combustion (PIC) such as dibenzofurans, dioxin and other pollutants that are known or suspected carcinogens. It is to be understood that in the terminology of this application "target species/compounds" denote those entities contained within the contaminated stream that are targeted for complete destruction and removal.

The past two decades has seen rapid growth and promulgation of new remediation technologies. In particular, a class of pollution control technologies known as the advanced oxidation processes (AOPs) has been the focus of much research and development. Among AOPs, those that employ ultraviolet (UV) radiation in conjunction with active oxidants (i.e. ozone, hydrogen peroxide, hydroxyl radical, superoxide ion radical, etc.) to accomplish mineralization of the target organic contaminants are of special interest. Generally, UV/AOPs are characterized with respect to the type of either the catalyst and chemical reactions involved (i.e. homogeneous vs. heterogeneous) or light source employed (i.e. solar vs. artificial).

In general, UV/AOPs for treatment of the hazardous organic contaminants (HOCs) in fluids (both gas- and liquid-phase) comprise the following steps:

In the first step, an organic contaminant (hereafter-called "primary reactant" or "target compound") that is adsorbed on the catalyst surface or resides within the fluid reacts to form products (hereafter termed "intermediate" or "secondary" products).

In the next step, the secondary products react to form other products (hereafter called "tertiary products" or "final products") that can be regarded as more benign, safer, or less detrimental to health and environment. The tertiary products are formed through a sequence or stepwise reaction scheme and an effective way to obtain tertiary or final products is to use specially engineered catalytic reactors disclosed in this document.

DESCRIPTION OF THE PRIOR ART

It is generally recognized that the UV-based AOPs do not universally enjoy high process energy efficiencies. This realization has motivated many researchers to test the concept of integrated or hybrid processes. In this approach, several processes are combined to produce a hybrid system that is capable of treating contaminants in the waste stream at much higher overall process energy efficiency and reduced life-cycle costs than each of individual processes, alone. This is especially true in applications where the initial concentration of the target compound may vary wildly in the course of the treatment process.

A good example is ethanol emission (in air) from some pharmaceutical product dryers. Ethanol concentration in the product dryer varies during a typical cycle by two orders of magnitude. Also, hybrid processes can be used in certain applications where valuable chemicals (e.g. acrylonitrile monomer, solvents, etc.) are emitted in the effluent that can be recovered. Yet another example involves treatment of the energetic materials. It is known that the photocatalytic treatment and mineralization of 2,4,6-trinitrotoluene (TNT) in aqueous media is difficult. However, once partially oxidized, many microorganisms can readily metabolize the partial oxidation products. Here, a UV/AOP is combined with another treatment process (i.e. biological) to achieve a much higher process efficiency. Examples of surrogate processes employed in the prior art include bioremediation, electron beam, thermocatalytic oxidation, activated carbon or synthetic adsorbents, $UV/H_2O_2$ and $UV/O_3$, to name just few. Alternatively, performance improvement can be made at the catalyst/support level, using multifunctional catalytic media, i.e. capable of acting as both photocatalyst and thermocatalyst.

It is to be understood that, in the terminology of this application, "media" or "catalytic media" denotes the combination of photocatalyst(s) and its/their supporting base material(s). Most base material(s) of the prior art simply provide(s) a structural support for the active catalyst(s) used and do not normally partake in the reactions or provide other known functions. Examples include, but not limited to, U.S. Pat. Nos. 4,892,712, 4,966,759 and 5,032,241 to Robertson et al.; U.S. Pat. No. 5,126,111 to Al-Ekabi et al.; and U.S. Pat. No. 5,035,784 to Anderson et al. However, it is possible to have a multifunctional media that is both photocatalytically and thermocatalytically active. The rationale for using a multifaceted media will now be described.

Consider a UV/AOP that employs a high power light source such as a medium-pressure mercury lamp (MPML). MPMLs generate large amounts of thermal radiation, at relatively high temperatures. Even when a low-pressure mercury lamp (LPML) is used as the source of UV light, considerable amount of low-level waste heat is given off. For example, according to vendor specifications, a standard 65 W Voltarc$^R$ lamp (G64T5VH), converts less than 40% of the input electrical power to emitted light in the form of 254-nm radiation. The electric to UV energy conversion efficiency is lower yet for fluorescent black light (less than 25%) and medium pressure mercury lamps (less than 15%).

It is generally recognized that only a very thin layer on the photocatalyst surface can actually be excited to enter photocatalytic reactions. For most active photocatalysts, the physical thickness of this layer or skin does not exceed few microns. This is due to the fact that UV radiation is completely absorbed within a skin only few microns thick on the exposed photocatalyst surface. On the other hand, thermal radiation can penetrate deep into the supported catalyst and base material. The fact that most target species can also be adsorbed into the deep layers of the photocatalytic media (inaccessible to UV but affected by thermal radiation and heat) encourages the use of multifunctional catalysts capable of utilizing both heat and light emitted by medium and high pressure UV lamps. Thus, a multipurpose catalyst can comprise a base material that acts as both a thermocatalyst as well as support structure for the photocatalyst. Alternatively, a dual catalyst may be used that can function as both thermocatalyst and photocatalyst, simultaneously. It is also possible to implement a thermocatalyst and a photocatalyst separate but together, in series.

The use of combined photo- and thermocatalytic action as in an integrated media is known in the prior art. Examples include Muradov, N. Z., Tabatabaie-Raissi, A., Muzzey, D., Painter, C. R. and M. R. Kemme, Solar Energy, 56, 5 (1996) 445–453; and Fu, X., Clark, L. A., Zeltner, W. A., and M. A. Anderson, J. of Photochemistry and Photobiology, A: Chemistry 97 (1996) 181–186, among others. Muradov et al. describe a photo/thermocatalytic method for selective oxidation of airborne volatile organic compounds (VOCs) including nitroglycerin, ethanol and acetone. The light source used was a low-pressure mercury lamp. The catalytic media employed was $TiO_2$ modified with silicotungstic acid (STA) and platinum. Fu et al. describe photocatalytic degradation of ethylene in air at elevated temperatures over sol-gel derived $TiO_2$ and platinized $TiO_2$ particulates, irradiated with a fluorescent black light lamp. Both studies report improved performance at elevated reaction temperatures without platinization of the photocatalyst.

The use of bandgap semiconductors such as titania ($TiO_2$), ZnO, $ZrO_2$, CdS, etc. and their various modified forms as the gaseous and aqueous phase photocatalysts is well known in the prior art. For example, $TiO_2$ particles (anatase crystalline form, in particular) are readily excited upon exposure to near UV radiation (wavelengths below approximately 400 nm) producing electron/hole ($e^-/h^+$) pairs on the semiconductor surface. The recombination of $e^-/h^+$ pairs has the resulting effect of reducing the process quantum efficiency. The recombination can occur either between the energy bands or on the semiconductor surface.

It has long been recognized that certain materials such as noble metals (e.g. Pt, Pd, Au, Ag) and some metal oxides (e.g. $RuO_2$, $WO_3$, and $SiO_2$) facilitate electron transfer and prolong the length of time that electrons and holes remain segregated. The electrons and holes act as strong reducing and oxidizing agents that cause break down of the target compounds via formation of active radicals on the photocatalyst surface. The following groups of reactions describe the excitation of titania leading to the generation of active radicals:

$$TiO_2 + h\nu \rightarrow h^+_{vb} + e^-_{cb} \qquad (i)$$

$$h^+_{vb} + OH^-_{ad} \rightarrow {}^\bullet OH_{ad} \qquad (ii)$$

$$e^-_{cb} + (O_2)_{ad} \rightarrow (O^\bullet_2)_{ad} \qquad (iii)$$

$$(O_2{-}^\bullet)_{ad} + H_2O \rightarrow OH^-_{ad} + (HO^\bullet_2)_{ad} \qquad (iv)$$

$$h^+_{vb} + e^-_{cb} \rightarrow heat\ (recombination) \qquad (v)$$

Reaction (a) occurs within the $TiO_2$ lattice. When $TiO_2$ absorbs a UV photon, represented by $h\nu$, having an energy equal to or greater than its bandgap energy, electrons ($e^-_{cb}$) shift to the conduction band, and positively charged "holes" ($h^+_{vb}$) remain behind in the valence band. Energy is related to wavelength by Planck's equation:

$$E = hc/\lambda$$

Where: E is the bandgap energy (eV), h is Planck's constant ($6.6256 \times 10^{-34}$ Js) and c refers to the velocity of light ($2.998 \times 10^{10}$ cm/s), and $\lambda$ is the wavelength (nm) of radiation.

Assuming bandgap energy of 3.1 eV for $TiO_2$, a threshold wavelength of about 400 nm is obtained. $TiO_2$ will absorb light having a wavelength equal to or lower than this value. Once holes and electrons are photo-generated they move about the crystal lattice freely in a manner described as the "random walk". The random walk results in the electrons and holes either recombining (thermalizing) per equation (v) or reaching the surface of the catalyst to react with adsorbed species and produce reactive radicals as indicated by equation (ii), (iii) and (iv).

An important factor in controlling the rate of electron-hole recombination on the photocatalyst surface is the size of catalyst particles. The smaller these particles are, the shorter the distance that charge carriers must travel to reach the surface and the larger the exposed catalyst surface area is. Photocatalysts having X-ray diameter of only a few nanometers and BET surface area of many 100s $m^2/g$ are commercially available (e.g. ST-01 and ST-31 grades titania produced by Ishihara Sangyo Kaisha, LTD of Japan).

The rate of recombination of holes and electrons is a function of the catalyst surface irradiance. Prior art teaches that higher the surface irradiance, the greater the rate of recombination of electrons and holes (Egerton, T. A., King, C. J., J. Oil Col. Chem. Assoc., 62 (1979) 386–391). Prior art also teaches that only one of the process (ii) or (iii+iv) is the rate-limiting step. The process involving the other radical completes the reaction and preserves the overall charge neutrality. Thus, it is generally recognized that the hydroxyl radical formation is the rate-limiting step. The rate of surface reactions will then be equal to $r = k_{(c+d)}[h^+_{vb}]$. The rate of hole formation is $k_a q_i$, where $q_i$ denotes catalyst surface irradiance (quanta/s/cm$^2$). The rate of electron-hole recombination is then $k_e[h^+_{vb}][e^-_{cb}]=k_e[h^+_{vb}]^2$. When $q_i$ is high, a large number of electrons and holes will be generated, and Egerton and King have already shown that: $r=kq_i^{1/2}$. At low values of $q_i$ when surface concentration of holes, $[h^+_{vb}]$, is relatively small, the recombination term will be negligible and $r=k_a q_i$. The surface irradiance value (hereafter called "Egerton-King threshold") at which the reaction rate transition from $q_i$ to $q_i^{1/2}$ (1 to ½ dependency) occurs is $q_{EK}=2.5\times10^{15}$ quanta/s/cm$^2$ (at $\lambda$=335, 365 and 404 nm).

The $q_{EK}$ can be calculated for two commonly used UV light sources (i.e. low- and medium-pressure mercury lamps). For the LPMLs and MPMLs $q_{EK}$ is approximately equal to 1.95 mW/cm$^2$ (for $\lambda$=254 nm) and 1.36 mW/cm$^2$ (for $\lambda$=365 nm), respectively. In order to limit the rate of recombination of electrons and holes and maximize the photoreactor performance, it is necessary to limit the catalyst surface irradiance to levels at or below the Egerton-King threshold. The rate of surface reactions, r, is proportional to $q_i^m$, where m varies between ½ and 1. To increase the rate of surface reactions for target pollutants, it may be necessary to allow $q_i$ to exceed $q_{EK}$ under certain conditions. Therefore, in a practical situation, the requirement for an efficient utilization of the photogenerated charge carriers must be balanced against the need for optimum rate of the surface reactions involving the primary and secondary reactants that produce desirable final products. In general, this requires a careful photoreactor design that allows uniform irradiation over all photocatalytic surfaces at a level that is as close to $q_{EK}$ as possible and optimum rate of conversion of surface-borne target species to desirable final products.

Just like radiation and heat transfer, transport of the primary reactants to and final products from the catalyst surface affect the photoprocess performance. The reactor engineering is closely coupled to the choice and configuration of the media and the type of light source used. A proper photoreactor design should provide for uniform irradiance on all catalytic surfaces as well as effective species mass transport to and from the catalyst active sites. Mass transfer limitations affect the process efficiency, as all target species must reach the active/activated catalyst surface before any reaction can occur. For process streams containing very low concentration of contaminants, the transport effects are even more pronounced. In general, photoreactor designs fall into one of the following three categories:

1. Most photocatalytic reactors/processes of the prior art belong in here. The Category I photoreactors possess good mass transfer but generally poor radiation field characteristics. FIG. 1a, 1b, 1c depict several examples from prior art depicting photocatalyst-coated monolith, photocatalyst-coated panel, and baffled annular photoreactor, respectively. Other examples include Australian Patent PH7074 to Matthews; U.S. Pat. No. 3,781,194 to Juillet et al.; U.S. Pat. No. 4,446,236 to Clyde; U.S. Pat. No. 4,774,026 to Kitamori et al.; U.S. Pat. Nos. 4,888,101 & 5,736,055 to Cooper; U.S. Pat. Nos. 4,892,712, 4,966,759 & 5,032,241 to Robertson et al.; U.S. Pat. No. 5,126,111 to Al-Ekabi et al.; U.S. Pat. No. 5,045,288 to Raupp et al.; U.S. Pat. No. 5,069,885 to Ritchie; U.S. Pat. No. 5,480,524 to Oeste; U.S. Pat. No. 5,564,065 to Fleck et al.; U.S. Pat. No. 5,683,589 to de Lasa et al.; U.S. Pat. No. 5,790,934 to Say et al.; and U.S. Pat. No. 5,030,607 to Colmenares, to name just a few.

2. Poor mass transfer but mostly uniform catalyst surface irradiance, e.g. annular photoreactor design (no internals, catalyst coated on the outer wall).

3. Poor mass transfer and non-uniform catalyst surface irradiance, e.g. externally lit annular photoreactor (no internals, catalyst coated on the inner wall).

As noted before, a good photocatalytic reactor design should provide for a uniform near $q_{EK}$ catalyst surface irradiance and temperature as well as no mass transfer limitations. This requires considerable process and reactor optimization effort prior to scale-up. Experimental techniques involving the measurement of the radiative properties of materials including photocatalysts are generally very complex and time consuming. Likewise, computational methods for analyzing radiative exchange among surfaces and between surfaces and gases even under the simplest of conditions are very difficult to execute. This so because the equation of transfer, in general, is of the complex integro-differential form and very difficult to solve. Other complexities including chemical reactions, species mass transfer, etc. further complicate photoprocess/reactor analysis and optimization. Therefore, it is not surprising that the prior art offers very little in the way of photocatalytic process and reactor analysis, modeling, optimization and scale-up. When it comes to the photocatalytic reactor and process engineering and design, the prior art methodologies are mostly pseudo-quantitative, semi-empirical and intuitive, in nature.

For example, it has long been recognized that providing means for generating and enhancing turbulence in the flow generally improves species mass transfer to and from the catalyst surface active sites. An examination of the prior art reveals that many articles such as ribs, fins, pleats, beads, chips, flaps, strips, coils, baffles, baskets, wires, etc. have been conceived, used and patented for generating mixing and turbulence in the flow and generally improve mass transfer characteristics of the reactors. Thus, using flow agitating articles or "internals" to enhance the contaminant mass transfer to the catalyst surface is more or less intuitive. But, the effect of internals or "turbulators" on the radiation field within the photoreactor seems to be less obvious and seldom fully appreciated. Often, methods used in the prior art to eliminate mass transfer intrusions adversely affect the extent and uniformity of radiation received on the catalyst surface, within the same photoreactor. One example is the annular photoreactor having internal baffles such as one shown in FIG. 1c. The U.S. Pat. No. 5,683,589 (de Lasa et al.), U.S. Pat. No. 5,069,885 (Ritchie), U.S. Pat. No. 5,116,582 (Cooper), and U.S. Pat. No. 5,790,934 (Say et al.) are all variations of this basic configuration. The catalyst surface irradiance for the photoreactor configuration of FIG. 1c has been carried out by the subject inventor and results are given in FIG. 2.

Results of FIG. 2 indicate that, if internals must be used to improve mass transfer, it is more advantageous to design the photoreactors in such a way that the bulk of catalyst resides on the reactor wall. This requirement limits the number and proximity of internals, in general, and baffles, in particular, that can be incorporated into the photoreactor. It can be seen that for the baffle spacing smaller than one baffle diameter (see U.S. Pat. No. 5,683,589 to de Lasa et al. and U.S. Pat. No. 5,790,934 to Say et al.), the surface irradiance (as a fraction of the lamp's radiosity) is lower on reactor wall than the baffle surface. Furthermore, results of FIG. 2 indicate that the point of diminishing return with respect to the magnitude and uniformity of the surface irradiance is reached at inter-baffle spacing, L, of about 10 times the sleeve diameter ($D_i$). The fact that the baffle spacing equal or greater than $L=10D_i$ is necessary for achieving a uniform irradiance results in the wall irradiance levels that are well above the $q_{EK}$. Moreover, the $L/D_i=10$ requirement results in inter-baffle distances that are unsuited to proper fluid mixing. These and other effects combine to make the use of most internals or turbulators generally undesirable.

Another important but poorly understood phenomenon within the photocatalytic reactors of the prior art is the light refraction and reflection effect. FIG. 3 depicts an annular photoreactor with three linear UV lamps, 120° apart, along the reactor axis. FIGS. 4a–4b depict the lateral variation of the wall irradiance as a function of the packing radius, $r_p$. All three lamps are lit and data are shown for two $r_p/r_o$ values (0.333 and 0.452) and a range of baffle spacing, denoted by $L/r_o$, from 0.76 to 6.10. On the same graph, the analytical predictions for the lamp as a diffuse line source emitter are also given. The measured wall irradiance dips at all locations having shortest radial distance to the lamp axis. This effect is due to the refraction and blocking of UV rays from the posterior lamps. When the refraction effects are all accounted for, the experimental data are in good agreement with the analytical and model predictions. This is shown in FIG. 5 for one of the baffle spacing of the arrangement of FIG. 4a, i.e. $L/r_o$=6.10. This example clearly shows that refraction and reflection of light is likely to affect irradiance distribution within the catalytic matrix of several photoreactor designs of the prior art such as the U.S. Pat. Nos. 4,892,712, 4,966,759 & 5,032,241 (Robertson et al.) and U.S. Pat. No. 5,126,111 (Al-Ekabi et al.). It can now be appreciated that the configuration of the catalytic media and design of the photocatalytic and thermocatalytic reactors must be kept as simple as possible. This requirement is in addition to ones discussed before (i.e. having good mass transfer and radiation field characteristics).

Moreover, a photoreactor design that yields a uniform irradiance distribution over all its catalytic surfaces, does not lend itself to mass transfer intrusions and has a simple design that is readily scalable, can still be affected by low process energy efficiency. This is so because, in one-pass reactors, the process energy efficiency is coupled with the conversion efficiency (or process DRE). When very high process DREs are required, the transport effects lead to process energy efficiencies that are well below the maximum realizable. This so-called "coupling effect" adds another complexity to the design of high-performance photocatalytic and thermocatalytic reactors. Thus, one object of the present invention is to teach a novel method for mitigating the adverse effects of coupling on the performance and energetics of single-pass photocatalytic, thermocatalytic or combined photo- and thermocatalytic reactors.

An examination of the prior art reveals that six distinct types of catalytic media arrangement have been used, to date. For the sake of discussions here, they are termed as the Type 0, Type I, Type II, Type III, Type IV and Type V, of which Types 0–II and IV are substantially photocatalytic and Types III and V are substantially thermocatalytic, albeit multifunctional media.

In Type 0 photocatalyst/support configuration, a suitable catalyst such as titania is used in colloidal form without any support or base material(s). Examples of Type 0 media include, among others, U.S. Pat. Nos. 5,554,300 and 5,589, 078 to Butters et al.; U.S. Pat. Nos. 4,888,101 and 5,118,422 to Cooper et al.; and U.S. Pat. No. 4,861,484 to Lichtin. A sub-category of Type 0 media includes, among others, U.S. Pat. No. 5,580,461 (Cairns et al.). Cairns, et al. employ a combined process that includes, in addition to colloidal titania photocatalysis, a surrogate process based on the use of adsorbent material. The contaminated fluid is first contacted with a particulate adsorbent material that physically adsorbs the target compound. The contaminant-loaded adsorbent is then separated from the fluid and brought into contact with aqueous slurry of a suitable photocatalyst. The use of adsorbent material implies, implicitly, that the technique is more suited to treatment of processes in which the adsorption of target species on the photocatalyst surface is the rate-limiting step. This is not generally the case, especially in the vapor-phase processes where the rate of reaction for one or more surface bound species (primary or secondary reactants) control the overall rate of the reaction and final process outcome. It is therefore desirable to simplify the treatment process by eliminating the surrogate adsorbent in favor of a multifunctional catalytic media (catalyst and support combination) that is both a good adsorbent as well as a good photocatalyst.

In Type I photocatalyst/support arrangement, the catalyst (often a modification of the anatase crystalline form of $TiO_2$) is immobilized or bonded onto a ceramic, glassy (e.g. fiberglass mesh, woven glass tape, etc.) or metal oxide (e.g. silica gel), metallic (e.g. stainless steel), or synthetic polymeric (e.g. plastic) substrate. Examples of Type I media include, among others, U.S. Pat. No. 5,564,065 to Fleck et al.; U.S. Pat. No. 5,449,443 to Jacoby et al.; U.S. Pat. No. 5,045,288 to Raupp et al.; U.S. Pat. No. 5,069,885 to Ritchie; U.S. Pat. No. 4,446,236 to Clyde; U.S. Pat. No. 5,736,055 to Cooper; U.S. Pat. No. 5,683,589 to de Lasa et al.; U.S. Pat. No. 5,790,934 to Say et al.; and U.S. Pat. No. 5,374,405 to Firnberg et al.

In Type II media configuration, impregnated glassy mesh/matrix or porous ceramic monolith or beads, metallic and metal oxide substrates (in the form of plates, beads, etc.) are employed as the photocatalyst support to which titania is bonded utilizing a method known as the "sol-gel technique." There are many variations, but, a typical process for preparing colloidal sols and corresponding media is discussed in "Photocatalytic Degradation of Formic Acid via Metal-Supported Titania," H. Y. Ha and M. A. Anderson, J. of Environmental Engineering, March, 1996, pp. 217–18, the contents of which are incorporated herein by reference. First, a solution of titanium isopropoxide mixed with dilute nitric acid in a ratio of $H_2O/Ti(i-Pro)_4/70\% HNO_3$=300/30/20 ml is refluxed at 80 degrees centigrade for 3 days. The resulting colloid is then concentrated with a vacuum rotary evaporator. The final titania concentration of the colloid becomes 1.06 mol/L at pH 0.8. The media support used were stainless steel 304 plates and tin (IV) oxide-covered glass. The stainless-steel plates were pretreated by firing at 450 degrees centigrade for 2 hours to produce a metal oxide layer. A PMW spinner system was used to produce uniform titania layers on the support. The support was spun at 2500 rpm for 30 seconds. The coated gel was first dried at room temperature and then fired at a temperature that may vary between 300 and 600 degrees centigrade with a heating rate of 3 degrees centigrade per minute. Typical dwell times were about 2 hours. The process is repeated until the desired catalyst thickness is obtained.

Type II catalyst/support examples include, but not limited to, U.S. Pat. Nos. 4,892,712, 4,966,759 and 5,032,241 all to Robertson et al.; U.S. Pat. No. 5,126,111 to Al-Ekabi et al.; and U.S. Pat. No. 5,035,784 to Anderson et al. In Type I and Type II arrangements, the substrate has no known function other than providing physical and structural support for the photocatalyst.

Type III catalyst/support configuration is a variation of the Type II media that involves synthesis and use of metal oxide aerogels, most prominently $SiO_2$ aerogels doped or co-gelled with other transition metal oxides such as titania to produce photochemically active catalyst/support material. There are many methods and variations of the basic technique used for preparing high porosity metal oxide aerogels. In general, preparation of metal oxide aerogels and porous glasses comprise a two step process in which a condensed metal oxide intermediate is formed. From this intermediate compound aerogels are prepared having any desired density, clarity and UV transparency, thermal insulation capacity, moisture and mechanical stability.

Two general reactions have been used to make earlier metal oxide aerogels. In the process of U.S. Pat. No. 2,249,767 to Kistler, first a metal alkoxide is hydrolyzed by reacting with water and an alcohol in the presence of a reagent (e.g. $NH_4OH$). Second, the hydrolyzed metal undergoes a condensation reaction to form a metal oxide gel, from which an aerogel is made by supercritical fluid extraction of the solvents. An improvement to the Kistler's method is given by the single-step sol-gel process of the U.S. Pat. No. 3,672,833 to Teichner et al. Teichner's method, employs a silicon alkoxide tetramethoxysilane or tetraethoxysilane which is hydrolyzed by one to ten times stoichiometric quantity of water with an alcohol in an acidic, neutral or alkali environment. This is followed by the condensation reaction in which the hydrolysis products polymerize to form a wet gel. In Teichner's method, the alcohol is removed directly from the wet gel at above supercritical pressure and temperature point of the alcohol. It should be noted that any metal that can form an alkoxide, which includes essentially the entire periodic Table of elements, could be used to make an aerogel. Examples include: silicon, germanium, zirconium, titanium, iron, magnesium, boron, cerium, lithium, and aluminum, to name just few.

Further improvement upon the techniques developed by Kistler and Teichner has been made recently through many new syntheses methods. Examples include, among others, U.S. Pat. No. 5,030,607 to Colmenares; U.S. Pat. Nos. 5,275,796 and 5,409,683 to Tillotson et al.; U.S. Pat. No. 5,538,931 to Heinrichs et al.; U.S. Pat. No. 5,718,878 to Zhang; U.S. Pat. No. 5,759,945 to Carroll et al.; U.S. Pat. No. 5,766,562 to Chattha et al.; and U.S. Pat. No. 5,753,305 to Smith et al. As an example, the properties of the low-density silica aerogels made by method of the U.S. Pat. No. 5,409,683 (Tillotson et al.) is described and incorporated here by reference in its entirety. The density of the silica aerogels prepared by this method varies typically between approximately 0.0015 $g/cm^3$ and 0.8 $g/cm^3$. Representative refractive index of the Tillotson silica aerogels are in the range of 1.0005 and 1.170 when measured at a wavelength of 632.8 nm. Light transmittance is typically greater than 85% at 632.8 nm. For a monolithic silica aerogel, 2 cm thick, a bulk density of 0.05 $g/cm^3$ and prepared by the method of U.S. Pat. No. 5,409,683, the light transmittance at $\lambda$=400 nm is typically 45%. The porosity, expressed as the percentage of open space within the total volume, falls in a range between 64% and 99.9%. The specific surface area of these silica aerogels is in the range of 450 to 1000 $m^2/g$. The properties of silica aerogels given here by reference to the U.S. Pat. No. 5,409,683 to Tillotson et al. are also typical of other metal oxide aerogels (e.g. titania) prepared by similar techniques.

A typical Type III media most useful to the practice of the present invention can be made by methods of the U.S. Pat. No. 5,409,683 to Tillotson which is incorporated here by reference. In Tillotson's two-step method, a high purity metal (e.g. silicon, titanium, zirconium) alkoxide is mixed with a hydrolysis rate reducing alcohol (such as methanol, ethanol or propanol), an additive (e.g. acetylacetone, acetic acid and hydrogen peroxide) and a sub-stoichiometric amount of water to form a solution. If silicon metal is used, the suitable alkoxide is tetramethoxysilane (TMES). Likewise, for titanium metal, the desirable alkoxide is titanium isopropoxide. The metal alkoxide solution is then reacted with a suitable acid catalyst (e.g. hydrochloric acid) to form an oligomeric mixture of a partially condensed metal intermediate and a reaction produced alcohol. This is followed by the removal of alcohol by distillation and evaporation. The next step involves adding a nonalcoholic solvent such as acetonitrile or acetone to the partially condensed metal intermediate to form a non-alcoholic solvated condensed metal intermediate which is then reacted with a second catalyst (ammonia or fluoroboric acid) and mixed. The amount of catalyst regulates the pH of the solution and determines the rate of gel formation. After mixing is completed, the condensed metal oxide product is cast, that is, poured into a mold to form a wet gel. The gelation takes about 72 hours and carried out at room temperature. The nonalcoholic solvent and any reaction-generated alcohol is then removed by supercritical extraction using liquefied carbon dioxide, chlorofluorocarbons (freons) or propane. More recently, methods have been developed for preparation of both bulk and thin film aerogels in which the gel drying is carried out under subcritical conditions (Jochen Fricke, "Superexpansive Gels," Nature, vol. 374, pp. 409–410, 1995). Another important development involves rapid aging technique for aerogel thin films (U.S. Pat. No. 5,753,305 to Smith, et al.).

An important application of the metal oxide aerogels is their use as heterogeneous catalyst and support structure for chemical processes involving oxidation, epoxidation, hydrogenation, reduction, synthesis, etc. As such, co-gelled metal oxide aerogels such as titania-silica aerogels and transition metal aerogel-supported catalysts (e.g. platinum, nickel, cobalt and copper supported on silica aerogel) are well known in the art. For example, U.S. Pat. No. 5,538,931 to Heinrichs, et al. teaches a process for preparing a supported catalyst comprising a transition metal such as palladium or platinum on an aerogel (e.g. silica) that is most useful as a hydrogenation catalyst. U.S. Pat. No. 5,766,562 to Chattha et al. discloses a method for preparing titania aerogel supported precious metal (e.g. platinum, rhodium) catalyst useful for the automotive exhaust gas ($NO_x$, hydrocarbons and carbon monoxide) emission control. U.S. Pat. No. 5,030,607 to Colmenares teaches a method for preparation of UV light-transparent silica aerogels doped with photochemically active uranyl ions ($UO_2^{++}$) for photocatalytic synthesis of short chain hydrocarbons in a fluidized bed photoreactor.

In Type IV photocatalyst/support media, a photocatalyst (e.g. doped and undoped modifications of $TiO_2$, CdS, etc.) is deposited by bonding or cementing onto the fabric of a modified or unmodified natural or synthetic polymer material. Examples for polymers of natural origin (or biopolymers) include wood, paper, kozo, gampi, Kraft lignin, and woven cotton, kenaf, linen, wool, etc. (U.S. Pat. No. 5,246,737 to Muradov and U.S. Pat. Nos. 5,604,339 and 5,744,407 to Tabatabaie-Raissi et al.).

Finally, the Type V media includes the broad field of moderate-temperature (approximately 150–350° C.) thermal oxidation catalysts. Of particular interest to practice of the present invention is a sub-class of the moderate temperature thermal oxidation catalysts that include supported transition metal oxide catalysts and cation modified zeolites as dual function sorbent/catalyst media For example, U.S. Pat. No. 5,414,201 to Greene discloses a combined sorbent/catalyst dual function media which removes dilute VOCs, both halogenated and otherwise, from air at room temperature, and then acts as a catalyst at higher temperatures (350° C.) to both desorb and oxidize trapped VOCs. Due to their microporous crystalline structure, various forms of zeolites like zeolite A (3A, 4A and 5A), Faujasites (zeolites X and Y) and Pentasils (ZSM-5 and Silicalite) have been widely used as commercial adsorbents. Two dual function media, Cr—Y and Cr-ZSM-5 as well as metal-loaded Co—Y zeolite catalyst, prepared by Greene, Prakash and Athota (J. of Applied Catalysis B: Environmental 7 (1996) 213–224), and Ramachandran, Greene and Chattedjee (J. of Applied Catalysis B: Environmental 8 (1996) 157–182), are given below and included here by reference in their entirety.

Cr—Y is made by exchanging $NH_4$—Y with chromium nitrate solution containing 1.5 gram of chromium nitrate in one liter of distilled water maintained at a pH of 4 for 72 hours. $NH_4$—Y is prepared by exchanging 15–20 grams of H—Y (LZ-Y-84 from UOP, Si/Al=2.5, 20 wt % alumina as binder) with 2.24 mol/l ammonium chloride solution for 2 hours. Cr-ZSM-5 is made by exchanging $NH_4$-ZSM-5 with chromium nitrate solution containing 2.3 grams of chromium nitrate in one liter of distilled water at 50° C. for 72 hours. $NH_4$-ZSM-5 is prepared by exchanging 15–20 grams of H-ZSM-5 (MFI from UOP, Si/Al=16, 20 wt % alumina as binder) with 2.24 mol/l ammonium chloride solution. After repeated washing, both exchanged catalysts are dried and subsequently calcined at 500° C. Typical exchanged chromium loading of the Cr—Y and Cr-ZSM-5 catalysts were 0.6 and 0.3 wt %. Typical BET surface area of the Cr—Y and Cr-ZSM-5 dual function catalysts were 474 and 388 $m^2/g$.

To prepare Co—Y, about 20 grams of $NH_4$—Y is cobalt exchanged with a solution containing 16 grams of $Co(NO_3)_2.6H_2O$ dissolved in 1l of deionized water. The solution is stirred continuously for 48 hours at 90° C. Typical cobalt loading on the zeolite was 1.5 wt %. After the exchange of all the cobalt ions in the cobalt nitrate solution with $H^+$ ions of the zeolite catalyst, the pellets were thoroughly washed with deionized water, dried at 120° C. for 2 hours and then calcined at 500° C. for 10 hours. The measured BET surface area of the Co—Y catalyst exceeds 600 $m^2/g$ of catalyst.

Still another media useful for the practice of this invention has been disclosed by U.S. Pat. No. 5,720,931 to Rossin for catalytic oxidation of organic nitrogen-containing compounds. Typical catalyst composition comprises a noble or a base metal supported on titania (Degussa P-25$^R$) or zirconia with added promoters such as molybdenum, tungsten, or vanadium. A typical formulation given by EXAMPLE I of the U.S. Pat. No. 5,720,931 is incorporated here by reference, in its entirety. 25 g of Degussa P-25 titania powder is slurried in 250 ml deionized water. To the slurry is added 2.9 g of lanthanum nitrate hydrate dissolved in 30 ml distilled water. The slurry is placed in a rotary evaporator at 45° C. Water is evaporated from the slurry overnight. The remaining solid is dried at 125° C. for 2 hours, then crushed and sieved to 25/60 mesh granules. The granules are then calcined at 450° C., for four hours. Approximately 8 g of this granules are slurried in 200 ml distilled and deionized water. To this slurry is added approximately 0.9 g ammonium metavanadate dissolved in 80 ml distilled and deionized water. The slurry is then placed in a rotary evaporator at 60° C. and water is completely evaporated. The remaining solids are then dried at 125° C., for two hours, then calcined at 450° C., for four hours. About 2 g of the resulting granules is slurried in 50 ml deionized water. Then, 0.04 g tetraammineplatinum nitrate dissolved in 25 ml distilled, deionized water is added to the slurry. The slurry is placed in a rotary evaporator at 60° C., and the water is evaporated overnight. The resulting material is dried at 125° C., for two hours, then reduced in a hydrogen atmosphere for another two hours, at 450° C., then calcined at 450° C., for two hours. The resulting final product contains approximately 1-wt % Pt, 5-wt % V, 5-wt % La, and remaining $TiO_2$ support.

A further description of photocatalytic patents will now be described:

U.S. Pat. No. 5,790,934 to Say et al. discloses a compact reactor for the photocatalyzed conversion of contaminants in a fluid stream. The reactor includes a support structure with multiple non-intersecting aluminum fins oriented parallel to the general flow direction of the stream. The fins were spray coated with a 1:1 mixture of titanium dioxide photocatalyst and alumina. Several germicidal lamps were inserted into the fins that totaled 148 pieces that were either flat or pleated. The photocatalytic reactor of Say et al. had several alternative designs but all included a large number of flat or pleated fins or baffles at various relative configuration to the light source. Although, it is understood that such a design does present certain advantages with respect to the contaminants mass transfer to the photocatalytic surfaces, it is not at all clear how such configurations can be useful in insuring a uniform irradiance over all catalytic surfaces at or near $q_{EK}$. Furthermore, no effort was made to decouple the process energy efficiency from the DRE of the target pollutant (formaldehyde vapor). Also, no references are given to the use of multifunctional photo- and thermocatalytic media of the Type III–V configuration.

U.S. Pat. Nos. 4,888,101 & 5,116,582 to Cooper and U.S. Pat. No. 5,736,055 to Cooper et al. disclose several titania-based, substantially of the Type 0 slurry photoreactor designs. In one application, a replaceable cartridge for use in a photocatalytic fluid purification is described. The fluid flows through the cartridge in the presence of light. The cartridge includes a flexible; porous element having titania coating associated with it and a rigid support structure. In another embodiment of the invention, a system for photocatalytic modification of a chemical composition comprising substantially titania entrapped within a layer of Pyrex glass wool interposed between two transparent plates. In yet another embodiment, a photocatalytic slurry reactor is disclosed that is driven by solar or artificial UV illumination. A tubular UV lamp is suspended by an O-ring within a cylindrical reactor jacket, creating an annular region through which a titania slurry is pumped. A helical stainless steel wire wrapped about the bulb acts as a turbulence generator to break up the boundary layer for increased radial mixing.

These processes are substantially Type 0 slurry reactors with generally acceptable mass transfer characteristics but non-uniform irradiance over catalytic surfaces, i.e. category I limitation. No effort was made by these researchers to decouple the process energy efficiency from DRE of the target pollutants. Also, no references are given to the use of multifunctional photo/thermocatalytic media of the Type III–V configuration.

U.S. Pat. Nos. 5,604,339 & 5,744,407 to Tabatabaie-Raissi et al. describe the use of photocatalysts, and in particular titania, as coating on the woody or biopolymeric support materials as an in-situ treatment technique to prevent emission of harmful volatile organic compounds such as formaldehyde, (α-pinene, β-pinene and limonene from emitting surfaces. This invention is strictly an in-situ application and no description is made of ex-situ treatment of airborne contaminants or process vent gases utilizing a photoreactor. No references are given to the use of multifunctional photo/thermocatalytic media of the Type III–V configuration or the use of decoupled media and processes similar to those disclosed here.

U.S. Pat. No. 5,638,589 to de Lasa et al. as previously referenced describes a photocatalytic reactor that requires fiberglass mesh supported photocatalyst wherein only polluted water passes through and treated. The fiberglass mesh is substantially inorganic compound and not a carbon containing synthetic polymeric or biopolymeric material that enhances destruction of pollutants. de Lasa et al. describe no separate series connection of different reactors, nor parallel connections of the reactors, nor different length of catalytic media. Furthermore, the conical baskets do not allow for maximum or uniform collection and distribution of the light source photons. Finally, de Lasa et al. has no teaching for thermocatalytic or combined thermo- and photocatalytic media and reactor applications. There are no references to decoupling phenomena and means to mitigate that effect in U.S. Pat. No. 5,638,589.

U.S. Pat. No. 5,580,461 to Cairns et al. teaches a process for treating a fluid comprising at least one chemical contaminant. Their purification process involves first contacting the contaminated fluid with a particulate adsorbent material to adsorb the target compound. The contaminant-loaded adsorbent is then separated from the fluid and brought into contact with aqueous slurry of a suitable photocatalyst. The contaminant on the adsorbent material is decomposed to form a product. The product of photocatalytic decomposition is then removed from the adsorbent material and slurry solution. The regenerated adsorbent material and photocatalyst slurry is recycled. The macro-process described by Cairns et al. employs a combined Type 0 process, does not teach a photoreactor design and the approach is substantially different from the reactors/processes disclosed here. There are no references made to decoupling.

U.S. Pat. No. 5,564,065 to Fleck et al. teaches a reaction chamber which is filled with a fine fibrous material capable of holding powdered titania. At the center of the chamber is a source of ultraviolet light. Air containing carbon monoxide is passed through the reaction chamber to be oxidized into carbon dioxide, which then removed out of the filter. An alternative embodiment uses a rectangular plate several feet square containing fibrous material and $TiO_2$. The reactor design for this application is similar to that of U.S. Pat. No. 5,126,111 to Al-Ekabi et al. The process is substantially a Type I media application with the Category I radiation field. No description is given regarding the use of multifunctional photo- and thermocatalytic media having Class III–V configuration. No references are given to the coupling phenomena or methods to deal with that effect.

U.S. Pat. No. 5,374,405 to Firnberg et al. teaches a rotating fluidized bed reactor in which inert solid particles are held in place by centrifugal force. The reactor includes a rotating porous bed drum within a plenum vessel. Gas enters through the walls of the drum and exits at the top. An ultraviolet light source is included within the drum for effecting photochemical reactions. In one embodiment, the solid particles are inert and loaded with reactant, which react with the gas. In other embodiments of this disclosure, the particles do not contain the reactant and reactant is provided within the gas stream. No references are given to the use of medium-pressure mercury lamp in conjunction with the multifunctional photo/thermocatalytic media of the Type III and V. No description of the decoupling of process energy efficiency from contaminants DRE is given. No direct reference to the use of bandgap semiconductor photocatalysts such as titania or use of high-power lamps are disclosed.

U.S. Pat. No. 5,246,737 to Muradov teaches a method for immobilizing a semiconductor or noble metal material on a number of supports including biopolymers. A solution containing methylene chloride and silicone polymer mixed with titania catalyst was used to form slurry. The slurry was applied onto the surface of cotton fiber with a soft brush. No description is given for treating airborne contaminants. Moreover, Muradov does not teach a process or photoreactor to accomplish vapor-phase detoxification. Also, the application of photocatalyst in solution with a solvent containing silicone can adversely affect photocatalyst activity toward oxidative mineralization of environmental pollutants. No references are made to the use of multifunctional photo- and thermocatalytic media of the Type III–V configuration. Also, there is no mention of the use of decoupled media or processes similar to those disclosed here.

U.S. Pat. Nos. 4,966,759, 4,892,712 & 5,032,241 to Robertson et al. and U.S. Pat. No. 5,126,111 to Al-Ekabi et al. describe methods for immobilizing $TiO_2$ and other photoactive compounds onto a porous, filamentous, fibrous/stranded glassy transparent mesh for ex-situ oxidation and removal of organic pollutants from fluids. Like U.S. Pat. No. 5,035,784 to Anderson, these are also based on Type II photocatalyst/support and photo-processes. The mesh/matrix can be fiberglass material that supports the sol-gel deposited titania photocatalyst. Robertson et al. correctly recognized usefulness of dispersing the photocatalyst uniformly throughout the reaction volume in much the same way titania slurry is prepared. They also recognized that in a practical slurry-free process, $TiO_2$ must be immobilized onto a suitable transparent support to allow UV transmission and uniform catalyst illumination. The manner in which fiberglass-supported titania is meshed and wrapped around the UV lamp does not produce a well-defined catalytic media that is reproducible and permit uniform catalyst surface irradiance. It is abundantly clear from the previous discussions that a glassy mesh type photocatalytic matrix/media does not readily allow for a uniform surface irradiance like the Category I media and photoreactor design. Also, Robertson et al. and Al-Ekabi et al. provide no references to the use of multifunctional photo- and thermocatalytic media with Class III–V configuration and no references are made to decoupled reactor/process designs disclosed here.

U.S. Pat. No. 5,069,885 to Ritchie teaches an apparatus for purification of water in a tubular photoreactor that includes a non-transparent substrate coiled longitudinally and helically around a transparent sleeve. The non-transparent substrate has photocatalyst media bonded to it. Like U.S. Pat. No. 5,035,784 to Anderson, this is also Type II media, Category I radiation field. No references are given to multifunctional photo- and thermocatalytic media of Class III–V configurations. No description of the coupling phenomena and methods to mitigate that are given or discussed.

U.S. Pat. No. 5,045,288 to Raupp et al. describes a technique for removing halogenated volatile and non-volatile organic contaminants from a gaseous stream by mixing with a gaseous oxygen bearing substance in the presence of a solid metal oxide catalyst, exposed to near ultraviolet (UV) radiation. This patent has a Type I photocatalyst/support configuration. Raupp et al. does not teach a photoreactor design or mention polyfunctional catalysts like those disclosed here. No references to the coupling phenomena and methods to mitigate that are given.

U.S. Pat. No. 5,035,784 to Anderson et al. teaches a method for the degradation of complex organic molecules, such as polychlorinated biphenyls on porous titanium ceramic membranes by photocatalysis under ultraviolet light. A special membrane preparation technique known as "sol-gel" process is used. An organometallic titanium compound is hydrolyzed to form a soluble intermediate, which then condenses into the organic titanium polymer. The process includes the preparation of a particulate gel, which is fired to achieve a ceramic material. Anderson et al. note that the control of process parameters is crucial, one important factor being the sintering temperatures at or below 500° C. to give a hard dry ceramic. It is not possible, nor desirable to deposit/immobilize ceramic like membranes atop surfaces of polymeric, biopolymeric (e.g. wood, paper, etc.) origin subject to the very high sol-gel preparation temperatures that will undoubtedly destroy the substrate. The photocatalyst/support arrangement is substantially Type II configuration. The patent by Anderson et al. does not teach a photoreactor design or mention the use of multifunctional catalysts similar to those disclosed here. No references are made to the coupling phenomena and techniques to mitigate that.

U.S. Pat. No. 4,966,665 to Ibusuki et al. describes an application involving vapor-phase, $TiO_2$-based photocatalysis of process vent gases containing chlorinated VOCs such as trichloroethylene (TCE) and tetrachloroethylene, is substantially a Type I photocatalyst/support application. No references are made to the use of multifunctional media having Type III–V configuration or the decoupled reactor designs similar to those disclosed here.

U.S. Pat. No. 4,446,236 to Clyde teaches a photochemical reactor which is divided into a first section suitable for containing a volume of fluid and a second section having at least one light transmitting wall. A porous, high surface area, fiber webbing is mounted within the reactor so that a portion of the webbing is immersed in the fluid to be reacted. The webbing moves within the reactor so that the webbing is sequentially immersed in the fluid contained in the first reactor section and then moved to the second reactor section where the webbing and fluid therein are irradiated. This process is substantially a Type 0 application and Category I radiation field design. Furthermore, no reference is given to mitigating the coupling effect present.

U.S. Pat. No. 3,781,194 to Juillet et al. teaches an application involving vapor-phase photocatalysis using $TiO_2$ in a manner similar to the U.S. Pat. No. 5,045,288 by Raupp et al. The only difference between this patent and the one described above is that Juillet et al. teach a method for oxidizing hydrocarbons to produce aldehydes and ketones, while, Raupp and Dibble describe a similar method for oxidizing halogenated organic compounds such as TCE.

SUMMARY OF THE INVENTION

A primary object of the invention is to provide a photoprocess and apparatus for an energy efficient mineralization and detoxification of organic pollutants or undesirable chemicals in both gaseous and aqueous streams.

A secondary object of this invention is to provide apparatus and teach methods of treating contaminated fluids using catalysts and energy sources capable of exciting and activating those catalysts. The energy sources capable of exciting and activating the catalysts include, among others, mercury vapor lamps (low, medium and high pressure, blacklight and fluorescent light and actinic), xenon lamps (including xenon-mercury and xenon flashlamp) and halogen lamps. In general, these light sources fall into two distinct classes, namely, low- and high-power lamps. The catalyst can be a unifunctional, multifunctional or combination of several unifunctional catalysts. Chemical composition, materials of choice and physical configuration of the catalyst is so chosen to be compatible with the choice of the light source and allow its efficient implementation in the decoupled reactors (full and partial) and treatment processes of the present invention. Both low-flux and high-flux media and reactors are based on well-developed principles that include:

(i) Fluid passage with no mass transfer intrusions.
(ii) Uniform irradiance over all catalytically active surface layers.
(iii) Decoupled process energy efficiency from the DRE of target contaminants.
(iv) Utilization of both photons and process waste heat by using multifunctional media.
(v) Simple and readily scaleable photoreactor/photoprocess design.

A third object of the invention is to provide an energy efficient photoprocess and apparatus wherein the catalyst is bonded to the fabric of the base material (i.e. flexible stocking or rigid, metallic or ceramic screen).

A fourth object of this invention is to construct a flexible base material, hereafter called "stocking" substantially from a natural polymeric (biopolymeric), synthetic polymeric or a combination of both natural and synthetic polymeric material to which a suitable photocatalyst is firmly applied. It is another object of this invention to expose the catalytic stocking to radiation in the range of wavelengths from 184 to 400 nanometers.

A fifth object of the invention is to fabricate the rigid metallic base material, hereafter called "support" substantially from any suitable metal, metal oxide or an alloy such as 316 or 304 stainless steel.

A sixth object of this invention is to surround the light source with either stocking or the support on to which a suitable photocatalytic, thermocatalytic or a combination of photo- and thermocatalytic material has been deposited, called hereafter "low-flux catalytic media."

A seventh object of the invention is to allow the contaminant stream to pass through the low-flux media, substantially in lateral direction, in a manner that permits retention of the target species within the low-flux catalytic media in a most efficient manner.

An eighth object of the invention is to promote full mineralization of the primary (target species) and secondary reactants to innocuous final products. The plurality of a light source radiating at the above-mentioned wavelength range and the low-flux catalytic media surrounding the light source, axisymmetrically, is referred to hereafter "single photocell arrangement".

A ninth object of the invention is to provide a flow regime through the single photocell arrangement that minimizes mass transfer intrusions to the low-flux media.

A tenth object of this invention is to provide an optimum configuration that allows most efficient radiant exchange from the light source to the low-flux media and most uniform catalyst surface irradiance.

An eleventh object of the present invention is to provide a segmented low-flux catalytic media; hereafter referred to as "low-flux multi-stage media" that allows multiple passage of the contaminated stream through the low-flux photocatalytic, thermocatalytic or combined photo- and thermocatalytic media.

A twelfth object of the invention is to segment the low-flux photocatalytic media in a single photocell arrangement in a manner that either maximizes the quantum efficiency of the photoprocess or minimizes the pressure drop across the single photocell, i.e., the difference between the pressures measured at exit port and inlet port of the single photocell unit.

A thirteenth object of the present invention is to provide a novel gas-solid contacting scheme and photoreactor (photocell) design that is most suited for use with the single-stage and multi-stage, low-flux media based on the band-gap photocatalysts, i.e. single-stage and multi-stage photocatalytic media.

A fourteenth object of this invention is to arrange several of these photocatalytic media, in parallel together, each with its own dedicated ultraviolet light source within an integrated reaction vessel, hereafter called "photocatalytic bank".

A fifteenth object of the invention is to connect/plumb together a number of banks in series to form a "photocatalytic module".

A sixteenth object of this invention is to connect/plumb together a number of photocatalytic modules, in parallel or in series, to form a photocatalytic pollution control "unit" or PPCU.

A seventeenth object of the invention is to arrange and plumb the sub-units of the PPCU in such a manner that either maximizes the overall energy efficiency (apparent quantum efficiency or photoefficiency) of the photocatalytic unit or minimizes the pressure drop across the photocatalytic unit (i.e. the difference between the exit port and inlet port pressure).

The subject inventor has determined in the subject invention if a linear light source (e.g. a low- or medium-pressure mercury vapor lamp) is used, then the best catalytic media arrangement will be one having a cylindrical (tubular) configuration. Within that configuration, the UV lamp is placed most advantageously along the media axis. It is also desirable to minimize the number of light blocking internals such as baffles, fins, turbulators, pleats, ribs, etc. As such, the active surface of the catalytic media would receive the most uniform irradiance. In the case of high power lamps such as medium- and high-pressure mercury vapor lamps, the type and configuration of the photocatalyst/support (media) is even more critical. This is so because the high power lamps emit radiation and heat at a level orders of magnitude higher than the low-pressure mercury lamps (LPMLs). The output power of a typical commercial LPML is approximately 1 W/in. On the other hand, medium-pressure mercury lamps (MPMLs) are commercially available with power output of up to 300 W/in, nominal. For the irradiance at the photocatalyst surface to remain at or near $q_{EK}$, a minimum distance, $l_{EK}$, between the light source and the catalyst surface must be maintained. $l_{EK}$ is a design parameter and characteristic of the type of UV light source used in the photoreactor. In the case of a tubular catalytic media irradiated with a single low-, or medium-pressure mercury lamp, $l_{EK}$ is calculated to be approximately 3.8 inches and 68 feet, respectively. For calculating $l_{EK}$, the electric to UV light energy conversion efficiency of 0.3 and 0.15 has been assumed for standard LPML and MPML (300 W/in), respectively.

Clearly, based on the $l_{EK}$ calculations determined by the subject inventor, the implementation of LPMLs as the source of UV radiation in practical photoreactors should not be unusually difficult as long as provisions are made to ensure uniform irradiance over all catalytic surfaces. In other words, LPML-driven systems are generally simpler to design and can accommodate many different types of media and reactor configurations. Thus, the primary consideration in constructing an LPML-based photoprocess is to engineer a uniform irradiance over all catalytic surfaces and design for maximum energy efficiency. The essential feature of such an energy efficient photosystem design is decoupling of the process photo-efficiency from conversion efficiency (or DRE) of the target contaminants. Accordingly, it is an object of this invention to provide a novel and improved LPML-based photocatalytic media (hereafter called "low-flux media") and a photosystem design that is highly energy efficient. The novel features of such a design will be disclosed later in this document.

Unlike, LPML-driven photo-processes, MPML-based systems, as indicated by the $l_{EK}$ calculation, require large and unrealistic photoreactor dimensions to accommodate both the photocatalyst and the light source. The requirements of very large catalyst surface area, optimum surface irradiance, uniformity of light distribution and media thermal management in MPML-based photo-processes pose a real design challenge. Therefore, it is clear that most photocatalyst/support materials and media configurations of the prior art are not particularly useful for the MPML-based photoreactors. Thus, another object of the present invention is to provide a new and novel method and process for implementing high power light sources for photo- and thermocatalytic service that is compact and highly energy efficient. The approach is based on the use of transition metal aerogel supported catalytic media and others within a specially designed photoreactor. In the terminology of the present application, MPML-based processes and media hereafter termed as the "high-flux" processes and media.

For high-flux applications, a rotating fluidized bed photoreactor is most desirable. The photocatalytic media is in the form of multifunctional, moderate temperature catalysts of the Type III (e.g. metal oxide aerogels, co-gelled metal oxide aerogels including titania-silica aerogels and transition metal aerogel-supported catalysts, etc.) or Type V (e.g. supported transition metal oxide catalysts, cation modified zeolites and doped titania catalyst). The reactor consists of a porous rotating drum located within a stationary plenum vessel. The waste stream enters the rotating drum through the porous side wall of the drum and exits from an opening near the top. Rate of the rotation of the drum and amount of solids added and bed thickness is adjusted to minimize bed carry over and maintain operation at or near minimum fluidization condition wherein the bed material expands but few bubbles are formed within the bed. A medium pressure mercury lamp placed within a quartz or fused silica sleeve at the middle and inserted into the photoreactor from the bottom or top. Provisions are made to allow feeding and removal of the photocatalytic media during normal reactor operation, if necessary.

Therefore, other objects of the invention described here are to provide gas-phase photocatalysis and air purification system with very high process quantum efficiency for treating various organic contaminants including: aliphatics, aromatics, halogenated organics, mercaptants, sulfur gases, and others.

Further objects and advantages of this invention will be apparent from the following detailed description of the preferred embodiments, which are illustrated schematically in the accompanying drawings.

BRIEF DESCRIPTION OF THE DRAWINGS

FIG. 13b shows a flow chart for determining optimum partitioning ratios of FIG. 13a.

DETAILED DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The present invention provides a new process for catalytic treatment of contaminants in fluids that is energy efficient, and readily scalable. The process employs catalytic media and an innovative fluid-solid contacting scheme. The performance enhancement is by decoupling of the process energy efficiency from the DRE for target contaminants. The novel features, and specifics of this technique are best demonstrated by an analytical treatise disclosed below. The methodology is for the case of a low-flux photoprocess using photocatalytic media described before. The technique can be used in a like manner to analyze high-flux photoprocess and media of the present.

Low-Flux Photocatalytic Media of the Present Invention

Figure 6:
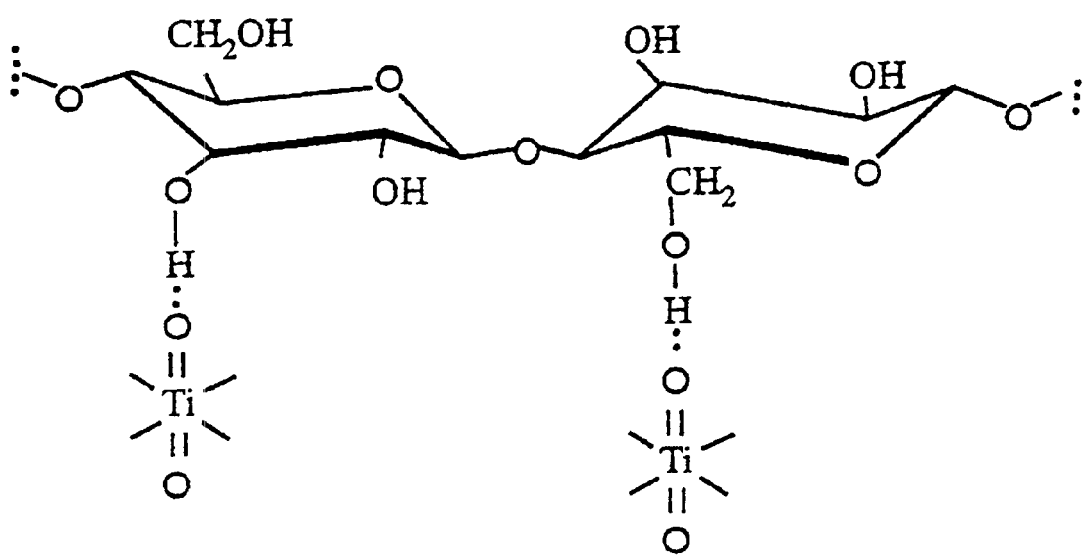
FIG. 6 depicts the scheme of hydrogen bonding of titania to cellulose polymer.

As far as the low-flux applications are concerned, the best media type and configuration is one that provides the most uniform loading of the undisturbed catalyst onto the base material/support while preserving the optimum catalytic activity. It is to be understood that in the terminology of this disclosure, the low-flux catalytic media of the present invention include photocatalysts and base materials (supports) that operate at or below the process temperature of approximately 100° C. In the preferred embodiment of this invention, the catalytic materials include special multifunctional photocatalysts. Yet, in another preferred embodiment of this invention, the base material is an integral part of or a component of the catalyst material, collectively comprising the low-flux catalytic media. Furthermore, in yet another preferred embodiment of this invention, the catalytic media suitable for use with the low-power UV light source include woven polymeric materials of natural origin (or biopolymers) such as cotton fabric and most desirably flannel cloth. Since cotton fibers contain a very high cellulose content, the chemical properties are essentially that of the cellulose biopolymer. Cellulose is a long linear polymer of anhydroglucose units $(C_6H_{10}O_5)_n$ and $1500<n<6000$. The polymer units are organized into a thread-like structure (elementary fibrils of very long length and approximately 3.5 nm in width). The elementary fibrils are bonded laterally to provide further strength (microfibrils of approximately 10–30 nm long). Each anhydroglucose ring consists of three hydroxyl and two oxygen (—O—) moieties (ring and bridge). Thus, it is possible for the $TiO_2$ molecules to bind to cotton fibers via following hydrogen bonding (see FIG. 6):

(i) ~Ti=O • • • H—O—CH$_2$~

(ii) ~Ti—O—H • • • O<(anhydroglucose ring); by hydroxylated $TiO_2$ surface.

This may explain the superior catalyst adhesion to biopolymer fibers and the high degree of catalyst coverage and coating uniformity achieved.

Figure 7A:
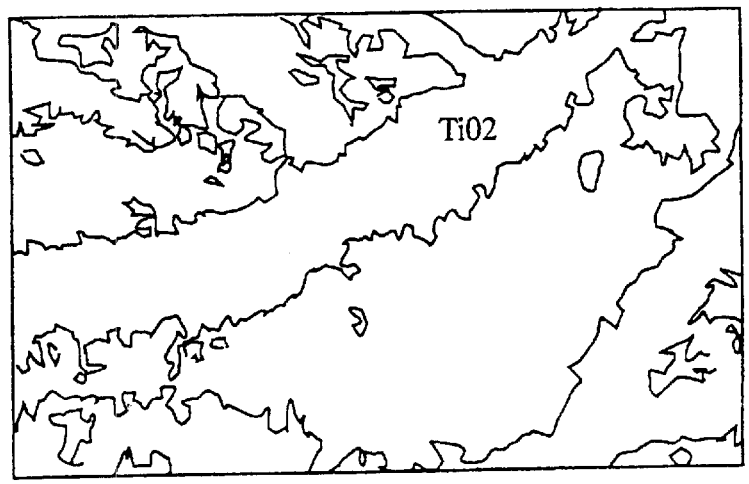
FIG. 7a shows the scanning electron micrograph of Kemira UNITI 908$^R$ catalyst particles on cotton (flannel) fibers, according to the subject invention.
Figure 7B:
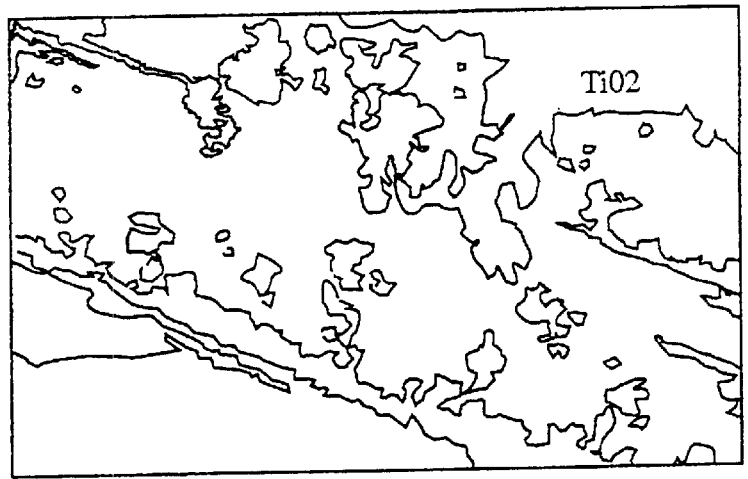
FIG. 7b shows the scanning electron micrograph of Kemira UNITI 908$^R$ catalyst particles dispersed on a fiberglass mesh support (PRIOR ART).
Figure 7C:
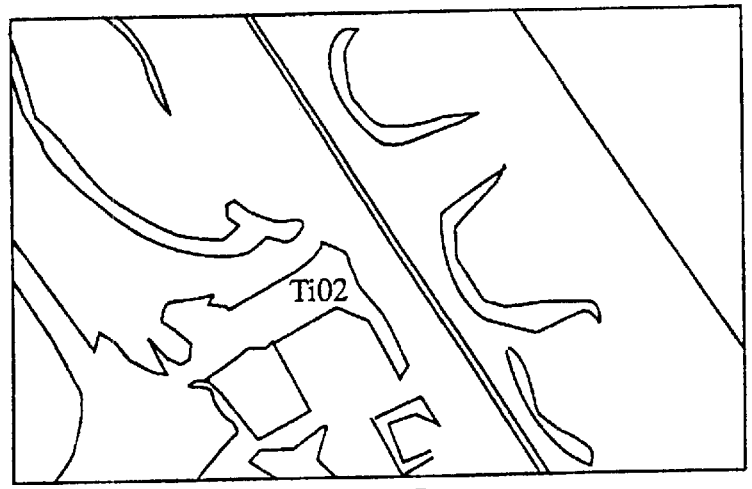
FIG. 7c shows the scanning electron micrograph of TiO$_2$ catalyst on fiberglass mesh prepared by the sol-gel technique of U.S. Pat. No. 4,892,712 to Robertson et al. (PRIOR ART).

The subject inventor has determined in the subject invention that unaltered natural polymers such as woven cotton cloth and flannel provide an excellent base material/support for bandgap photocatalysts. Biopolymeric materials are superior to other widely used media that include ceramic and woven glass mesh type matrices of the prior art. The low-temperature catalytic media of the present invention, including the integrated titania/biopolymer material, display low pressure drop, excellent stability and contaminant retention. FIG. 7 depicts the scanning electron micrographs of three catalytic media prepared at the subject inventor's laboratory. FIG. 7a shows the Kemira Uniti 908$^R$ titania immobilized onto a woven cotton cloth, as in the practice of the present invention. FIG. 7b depicts a fiberglass mesh support. FIG. 7c shows titania deposited by sol-gel technique onto a fiberglass mesh (as in U.S. Pat. No. 4,892,712 by Robertson et al.). Modifications a, b and c are representative of the photocatalyst/support configurations designated as Type IV, Type I and Type II, respectively. The uniformity and quality of catalyst deposition and dispersion on the woven cotton cloth (flannel) is readily observed. An explanation for the superior performance of the low-flux media of the present invention is given below.

Figure 8A:
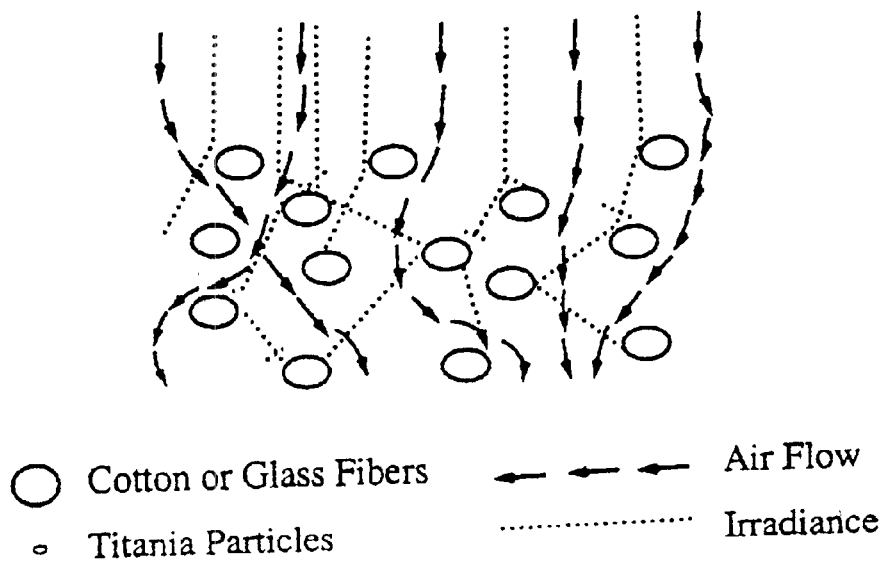
FIG. 8a depicts the air flow and surface irradiance distribution pattern over and within cotton (flannel) fabric fibers coated with TiO$_2$ according to the subject invention.
Figure 8B:
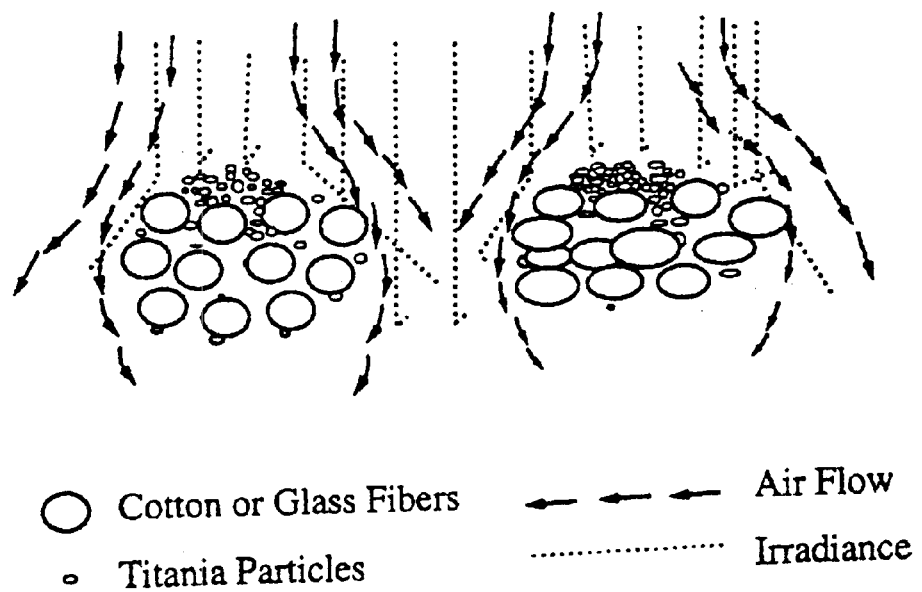
FIG. 8b depicts the air flow and surface irradiance distribution pattern over and within fiberglass mesh supported titania in the prior art.

FIG. 8a depicts one preferred embodiment of the low-flux media of the present invention comprising $TiO_2$ particles within the cotton fibers as a Type IV media. FIG. 8a and 8b show the likely pattern of fluid flow and light distribution within and around the media of the present invention and glass fibers (media Types I and II of the prior art), respectively. The uniform distribution of the catalyst particles on cotton fibers and relatively large distance between the fibers themselves result in uniform flow and surface irradiance that is superior to that obtained by catalytic media of the prior art (Type I&II). Furthermore, in the Type I and II media:

(i) Poor catalyst deposition allows bottom layers of the photocatalyst unexposed to UV light and, hence, not participating in the reactions.

ii) Non-uniform catalyst coating leads to irregular flow pattern through the mesh.

EXAMPLES 1 to 3 describe the preferred embodiments of the present invention with respect to preparation of the low-flux media. It is important to note that the following examples detail the best methods known to the applicant at the time of filing this application. It is envisioned that better techniques for the operation and preparation of the catalysts may be developed subsequently and are to be considered as a part of this specification thereof insofar as they come within the scope of the claims.

EXAMPLE 1

This EXAMPLE describes the manner in which one preferred embodiment of the invention's low-flux base material/support was prepared. A rectangular piece of unaltered cotton fabric was machine washed in hot water using a small amount of liquid detergent (e.g. Proctor & Gamble's Tide™), followed by two cold rinses. Then, tumble-dried at 55° C., approximately. The entire process above was repeated for the second time. Fabric's post-wash, fully shrunk dimensions were about 95% of the original, as received dimensions. The rectangular piece of fabric was then sewn along the seam and at both ends into cuffs.

EXAMPLE 2

This EXAMPLE describes the manner in which one preferred embodiment of the invention's low-flux catalytic media was prepared. The catalyst in the form of titanium hydroxide, $TiO_2$ or combination of titanium dioxide and titanium hydroxide was added to the synthetic polymeric, biopolymeric or combination of synthetic polymeric and biopolymeric fibers of the base material/support having a concentration in the range of 1–15 percent by weight of the media (base material and catalyst). The preferred form of the titanium containing catalyst material is in the form of commercial compounds marketed under the trade names such as Kemira UNITI-908$^R$, Degussa P-$_{25}{}^R$, Hombikat UV100$^R$, Bayer Bayertitan 5585$^R$ and Ishihara ST$^R$ series (e.g. ST-01, ST-11 & ST-31), to name just few.

In one preferred embodiment of the present invention, the catalytic material constitutes titania particles that comprise the crystalline form of anatase or rutile, preferably anatase having BET surface area greater than 45 m$^2$/g, preferably greater than 225 m$^2$/g; and particle size smaller than 0.1 microns, preferably less than 0.02 microns.

The titanium dioxide particles are firmly bonded to the base material via Van der Waals interaction and hydrogen bonding involving hydroxylated titania surface and OH-groups of the cellulosic anhydroglucose rings. The catalyst is then jet-impregnated into the base material (fabric support) from a pressurized aqueous catalyst slurry solution. The slurry solution was prepared and applied to the fabric by first dry ball milling titania powder so that all particles pass through U.S. sieve #60 mesh. Then, admixing 17 grams of catalyst for every 1000 ml of distilled water, preferably, deionized water (Ohmic resistance of 18.5 MΩ). After sonicating each 2L batch of the catalyst slurry solution for approximately one hour, about 50 liters of thoroughly mixed and sonicated catalyst slurry solution was emptied into a glass jar placed upon a magnetic stirrer. Using a PTFE stirring bar, the slurry solution was continuously and vigorously stirred.

The glass jar containing the slurry solution was then pressurized with nitrogen to about 5 psig. The slurry solution was jet injected, through a ¼ inch PTFE tubing and injector head, onto the inner face of the stocking of EXAMPLE 1. The pre-washed (preferably, machine-washed at least once before sewing and once after), fully shrunk, bone dry, and fully stretched tubular cloth (stocking) was then pulled over a tubular polyvinylchloride (PVC) arm. The cloth covered PVC tube turned slowly as the injector head sprayed the catalyst slurry onto and into the fabric along the PVC arm. Afterwards, the excess fluid was pumped out by squeezing the surface of the fabric, wringing and finally centrifuging for a period of approximately 15 minutes. Then, catalytic stockings were machine dried, eight at a time, at about 55° C., for approximately 30 minutes until bone dry. The catalyst loading on the fabric was determined by weighing fully dried stocking for quality assurance to fall within the range of 0.5 to 1.2 mg of catalyst per $cm^2$ of fabric surface area. Finally, to provide means for mounting the catalytic stocking within the photocatalytic unit, a Nylon® clamp (e.g. model CX34, by Deflect-O Corp. or SUPERFLEX IN-LINE Nylon 6.6 model IT9115-CO by Panduit Corp.) was inserted into each cuff.

EXAMPLE 3

This EXAMPLE describes the manner in which other preferred embodiments of the low-flux catalytic media were prepared. Different organic, inorganic and metal-organic additives were added to the catalyst slurry of EXAMPLE 2. The solution containing the catalyst and additive was then applied to the base material of EXAMPLE 1. Finally, the supporting base material (fabric) was allowed to dry overnight at room temperature. The preparation method and other details for each additive is given in TABLE I. The rationale for using each additive is disclosed below:

Acridine yellow dye (AY):

As an organic dye performs two useful functions: First, being a photocatalyst facilitates various electron transfer reactions (e.g. photogeneration of hydrogen from aqueous solutions of electron donors). Second, as a photosensitizer extends the absorption properties of the base material/support of semiconductor-based photocatalysts. Acridine yellow is one of few organic dyes that perform both functions. For example, prior art (Muradov, N. Z., et al. Reaction Kinetics and Catalysis Letters, v.3/4, 1981, 355) teaches that AY is an effective photocatalyst for the visible light (450–500 nm) induced photoreduction of methylviologen ($MV^{2+}$) in the presence of organic donor EDTA with the quantum yield of 56%, according to (vi)

$$MV^{2+}+EDTA+\{h\nu/AY\} \rightarrow MV^{+}+EDTA_{ox} \quad (vi)$$

Another advantage of using AY as a co-catalyst and sensitizer for $TiO_2$ is its relatively high resistance to oxidation.

$Fe(NO_3)_3$:

Prior art teaches that $Fe^{3+}$ ion is a powerful photo-oxidant when exposed to near-UV radiation in aqueous solution, according to (vii)

$$Fe^{3+}+D+h\nu(near\ UV) \rightarrow Fe^{2+}+D_{ox} \quad (vii)$$

Where, D and $D_{ox}$ is the original and oxidized form of the organic compound, respectively. OH-radicals can be produced from $Fe^{3+}$ by either light reaction with adsorbed water molecules, as in (viii):

$$Fe^{3+}+(H_2O)_{ads}+h\nu \rightarrow Fe^{2+}+OH^{\bullet}+H^{+} \quad (viii)$$

or by intermediate $H_2O_2$ formed via dark reaction (ix):

$$Fe^{3+}+(H_2O_2)_{ads} \rightarrow Fe^{2+}+OH^{\bullet}+H^{+}+\tfrac{1}{2}O_2 \quad (ix)$$

Partial hydrolysis of $Fe(NO_3)_3$ can form $Fe_2O_3$ that will remain on the titania surface and as the prior art teaches (Ibusuki, T., and K Takeuchi, J. Molecular Catalysis, 88, 1994, 93) can act as a co-catalyst with $TiO_2$ in various photooxidation processes (e.g. photooxidation of $NO_2$ to $HNO_3$).

Platinum (Pt):

The main function of Pt as a co-catalyst is its ability to mitigate electron transfer reactions by forming a reservoir for electrons. Presence of Pt colloids on the titania surface can potentially facilitate and prolong separation of the photogenerated electrons and holes thus increasing the overall efficiency of the photoprocess. Also, Pt can catalyze the oxygen reduction process for producing peroxoradicals as in (x):

$$O_2+e^{-}+H^{+} \rightarrow HO_2^{\bullet} \quad (x)$$

Peroxoradicals can be the source of additional hydroxyl radicals, the main active species in oxidative destruction of organics, thus (xi):

$$2HO_2^{\bullet} \rightarrow 2OH^{\bullet}+O_2 \quad (xi)$$

Platinum can also catalyze undesirable reactions, for example, the termination of OH-radicals via formation and decomposition of hydrogen peroxide according to the following reactions: (xii), (xiii), and (xiv)

$$2OH^{\bullet} \rightarrow H_2O_2 \quad (xii)$$

$$OH^{\bullet}+H_2O_2 \rightarrow H_2O+HO_2^{\bullet} \quad (xiii)$$

$$2H_2O_2 \rightarrow H_2O+O_2 \quad (xiv)$$

Activated carbon (AC):

The rationale for using super-activated carbon (surface area 250 $m^2/g$) as an additive to $TiO_2$ is to enhance the mass-transfer characteristics of the catalyst/support structure by increasing the surface area of the media. Apparently, once NG is adsorbed on the AC surface it diffuses to the titania surface thus increasing NG local concentration and, thus, increasing the apparent quantum efficiency. However, it is very important to employ an optimum $AC/TiO_2$ ratio, because at high $AC/TiO_2$ ratios, AC is likely to adversely affect the system efficiency by depriving $TiO_2$ surface from useful photons.

NaOH:

Prior art (Samodjai, G., in Photocatalysis: Fundamentals and Applications, N. Serpone and E. Pelizzetti (Editors), Wiley Interscience, N.Y., 1989, 251) teaches that alkali hydroxides (KOH or NaOH) catalyze the hydroxylation of oxide semiconductors (e.g. $SrTiO_3$) surfaces and thus, facilitate certain photocatalytic processes (e.g. water dissociation). Since the rate of OH-radical photogeneration is a function of the concentration of surface hydroxyl groups, then it is plausible that hydroxylation of the titania surface can affect kinetics of photooxidation.

TABLE I

| Photo-catalyst (g) | Additive (wt %) | Volume of slurry (ml) | Preparation details |
|---|---|---|---|
| DP (20.45) | None | 300 | Slurry |
| DP (5.74) | None | 750 | Slury |
| DP (10.34) | None | 400 | Slurry |
| H-UV (10.50) | None | 400 | Slurry |
| KU (10.50) | None | 350 | Slurry |
| $SrTiO_3$ (11.00) | None | 600 | Slurry |
| KU (12.01) | None | 700 | As received dyed (red) fabric |
| KU (12.00) | AY (0.41) | 500 | 100 ppm by weight Acridine yellow solution |
| KU (12.00) | NaOH (45.83) | 500 | Added 100 ml of 5.5 wt % NaOH solution |
| KU (12.00) | $Fe(NO_3)_3$ (16.67) | 500 | Added 100 ml of 2 wt % of $Fe(NO_3)_3$ solution |
| Pt/KU (12.00) | Pt (1.82) | 500 | 46 ml of 1 wt % $H_2PtCl_6$ diluted in 100 ml of water, purged with $H_2$ at 60° C. for 3 hrs |
| KUXA (12.00) | None | 600 | Slurry |
| KUXA (12.00) | AY (0.41) | 500 | Added 100 ppm by weight Acridine yellow to solution |
| KU (12.00) | Saffron (1.50) | 750 | 0.18 g of crushed Saffron in $H_2O$ added to KU slurry |
| DP (12.0) | AC (15.00) | 750 | 1.8 g of activated carbon Ax-21 added to DP slurry |

Where: DP- $TiO_2$ (Degussa P25), KU- $TiO_2$ (Kemira Uniti 908), H-UV-$TiO_2$ (Hombikat UV100), KUXA- $TiO_2$ (Kemira Uniti XA067), AY- Acridine yellow dye, AC - activated carbon.

Finally, particular choice of the catalyst also depends on the specific application involved. For example, when chlorinated compounds (e.g. trichloroethylene, TCE) are treated, hydrochloric acid is often formed as one of the final products. The chloride ion bonds strongly to the noble metals such as platinum and palladium when present in combination with $TiO_2$, $SiO_2$, or $SiO_2$ supported $TiO_2$. It has been observed that the noble metal deactivates quickly under these conditions due to the strong affinity of the chloride ions for noble metals.

Iron (Fe) as a transition metal can exist in two stable oxidation states, i.e. $Fe^{2+}$ and $Fe^{3+}$ and can catalyze reduction of halogenated organics. But, in a moist environment with excess oxygen, iron oxide forms leading to the catalyst inactivation. However, in a combined metal and metal oxide-supported noble metal catalyst, the $SiO_2$ support of the high-flux media (or carbonaceous substrate of the low-flux media) adsorbs target species and thus partakes in the catalytic action of the photocatalyst ($TiO_2$). As the charge carriers are formed on the light activated titania, electrons migrate to the surface of the photocatalyst, to be trapped by the noble metal. The negatively charged noble metal reduces $Fe^{3+}$ to $Fe^{2+}$. Then, $Fe^{2+}$ is oxidized back to $Fe^{3+}$ by the chlorinated compounds at the surface. The process continues without the noble metal or transition metal oxide deactivation. As such, $TiO_2$ harvests the incoming photons converting them to charge or charge equivalent. As noted before, the noble metal acts as a mediator to transfer the charge or charge equivalent to target organic species.

Therefore, it should be understood that in the preferred embodiments of this invention each element or the oxide of each element is an integral part of the catalytic media. Alternatively, iron can mediate the charge transfer to the platinum when the interaction between Fe and titania is such to preferentially cause charge transfer to Fe upon $TiO_2$ illumination. Therefore, a synergism exists and can be described for other noble metals and their oxides including Ru, Rh and Ag and other semiconductors such as $SnO_2$, $SrTiO_3$, $WO_3$, $Fe_2O_3$, CdS, ZnO, $Ta_2O_5$, $ZrO_2$ and CdSe.

High-Flux Photocatalytic Media of the Present Invention

As far as the high-flux applications are concerned, the preferred media type and configuration is one that provides highest catalytic activity at the lowest media temperature. It is to be understood that in the terminology of this disclosure, the high-flux catalytic media of the present invention include the plurality of the catalyst and base material (support) that operate in the temperature range of approximately 150–400° C. In the preferred embodiment of the present invention, the high-flux media is silica, alumina or combination thereof with well-defined framework and structural features as in zeolites, zeolite-like materials as well as the synthetic aerogel materials.

In the preferred embodiment of this invention, the catalytic materials including the multifunctional Type III (combined photo- and thermocatalyst) and Type V (combined sorbent and thermocatalyst) media are used. Yet, in another preferred embodiment of this invention, the base material is an integral part of or a component of the catalyst material, collectively comprising the high-flux catalytic media.

In one embodiment of the invention, the catalytic media suitable for use with the high-power UV light sources (e.g. medium-pressure mercury lamps) also include the UV-transparent silica aerogels doped with photochemically active compounds (e.g. $TiO_2$). It is yet another preferred embodiment of this invention to utilize as the high-flux media, co-gelled metal oxide aerogels such as titania-silica aerogels and transition metal aerogel-supported catalysts (e.g. platinum, nickel, cobalt and copper supported on silica aerogel).

In another preferred embodiment of this invention, the catalytic media composed of chromium- and cobalt-exchanged zeolite-Y and chromium-exchanged ZSM-5 (molecular sieve) is used. Yet, in another embodiment of this invention, multifunctional catalysts such as the noble or base metal supported on $TiO_2$ or ZrO2 and doped with one or more promoters chosen from the group of elements: Mo, W, V, and La, is used.

Rationale of the Invention

Among UV/AOTs, titania-based processes are of particular interest since they generally do not require added or otherwise consumable chemicals. Volumes have been written on the efficacy of UV-excited titania and other bandgap photocatalysts for treatment of organics in water and air. Despite all that, to date, no commercially viable UV/$TiO_2$—based pollution control device has been successfully mass-marketed. This is particularly true for applications involving aqueous-phase photocatalytic treatment. A review of the prior art reveals many reasons cited as the stumbling blocks to successful implementation of pollution control devices based on UV—excited, $TiO_2$ and other bandgap photocatalysts. A short list of the generally recognized impediments include:

Practical problems and poor economics of employing slurried colloidal titania in aqueous-phase applications.

Mass transfer limitations associated with processes that employ immobilized instead of slurried colloidal $TiO_2$.

Mass transfer limitations affecting treatment of dilute contaminated streams.

Non-uniform irradiance over catalytic surfaces and light transmission limitations within photocatalytic reactors of the prior art.

Higher costs when added oxidants are used in both slurried and immobilized titania-based processes.

As noted before, an important consideration is the overall energy efficiency of the photocatalytic service. Due to cost and performance considerations, most detoxification applications require single pass, continuous flow of the contaminant stream. Most photoreactors of the prior art are not able to utilize UV photons effectively, especially when very high DREs are required. This is a manifestation of the "one-pass or single-pass" process requirement that greatly limits the overall apparent process quantum efficiency (photoefficiency). It is generally recognized that, even under the best of conditions (i.e. no mass transfer limitations present and uniform catalyst surface irradiance) only a fraction of the maximum energy efficiency realizable can be obtained. This is especially true when the process DRE required is high. The net effect of this loss of process photoefficiency is to raise both the operating and capital costs of the photocatalytic treatment. This is so because generating photons capable of exciting the photocatalyst requires costly electricity and use of special UV lamps having electric to UV light energy conversion efficiency of no more than 35%, at best.

Therefore, it can be said that not until an engineering approach is found to eliminate this limitation, it is unlikely that UV photocatalysis can be implemented, widely, as a viable and cost-effective pollution control technology. Thus, it is the object of the present invention to substantially improve upon performance of the catalytic treatment process by:

(i) Devising a catalytic process that is unaffected by mass transfer intrusions.

(ii) Ensuring the most uniform irradiance distribution over all catalytic surfaces.

(iii) Implementing specially designed and formulated catalytic media and process configuration that allow decoupling of the process energy efficiency from DRE of the target pollutants.

(iv) Employing multifunctional media that allow combined photocatalytic and thermocatalytic activity, whenever desirable.

(v) Simplifying photoreactor and photoprocess optimization and scale-up.

Figure 9A:
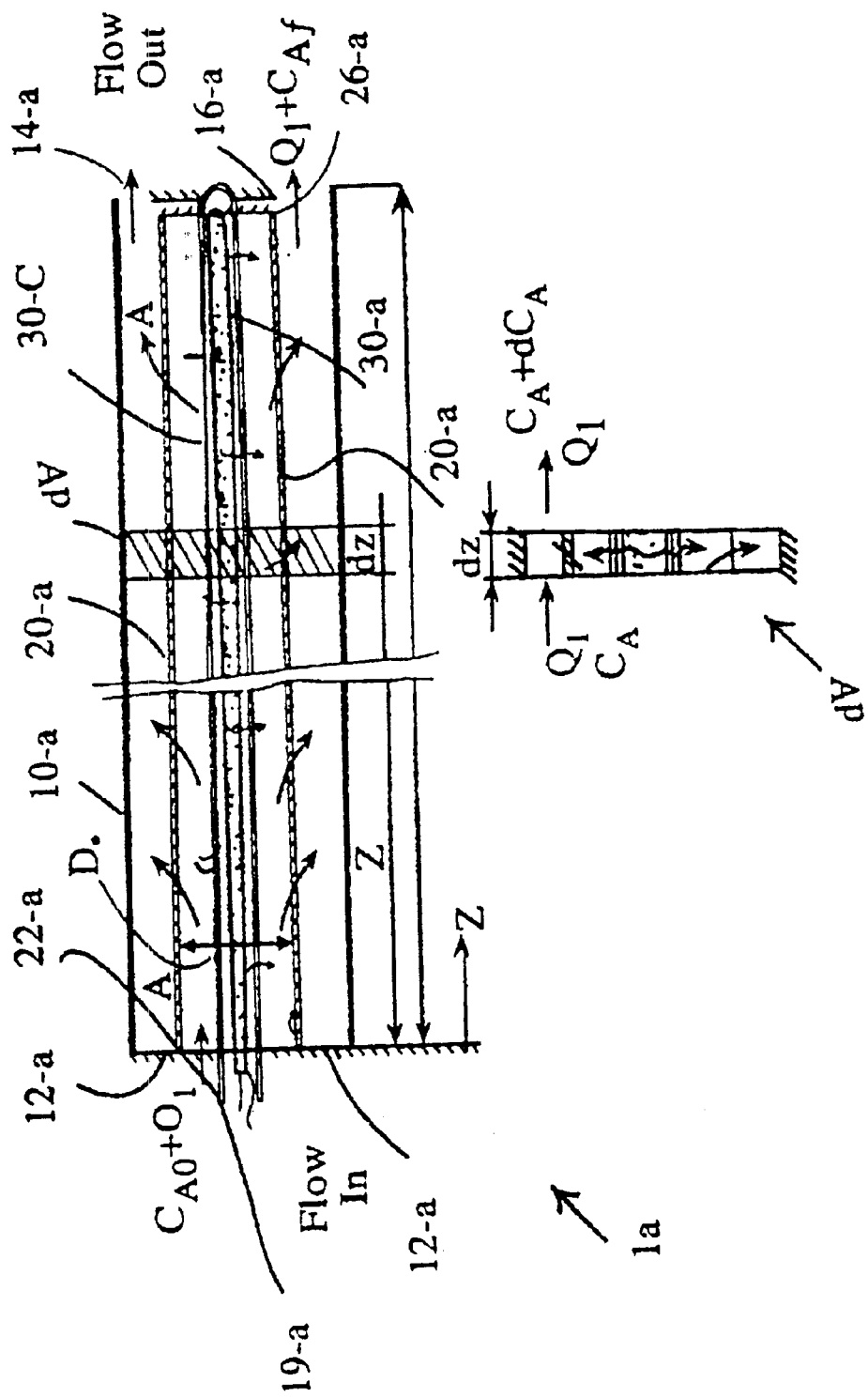
FIG. 9a shows a schematic diagram of a single-stage, low-flux reactor configuration of the subject invention depicting flow of the contaminated stream through the photocatalytic stocking.
Figure 9B:
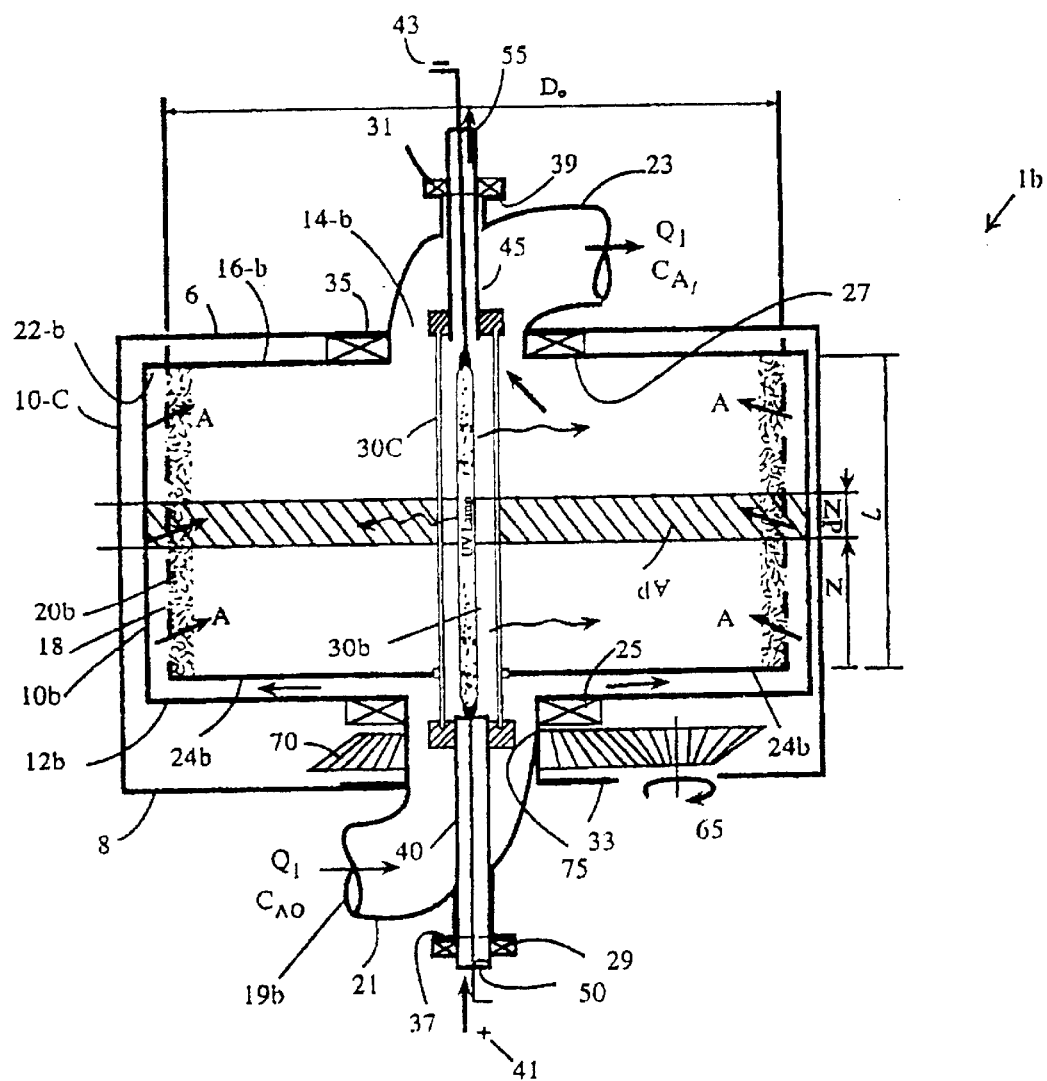
FIG. 9b shows a schematic diagram of a single-stage, high-flux reactor configuration of the subject invention depicting flow of the contaminated stream through the rotating bed of fluidized photocatalytic particles.

Now, the theoretical basis of the subject invention that guided the development of the present innovative photosystem designs is disclosed by considering the axisymmetrical configuration 1a and 1b of FIG. 9a and 9b. The catalytic media of the subject invention comprising the low-flux media 20-a can be supported photocatalyst, supported thermocatalyst or a multifunctional media that is both photocatalyst and thermocatalyst. In a like manner the high-flux media 20-b is a fluidized particle bed that can be supported photocatalyst, supported thermocatalyst, or a multifunctional media that is both photocatalyst and thermocatalyst. In the preferred embodiments of the present invention, the low- and high-flux media (20-a and 20-b) are the Type IV and Type III (or V), respectively. The low-flux reactor in one embodiment of this invention consists of a tubular cell 10-a in which the light source 30-a is placed concentrically along the axis, within a protective quartz or fused silica sleeve 30-c. In thermocatalytic or high-flux case, a heat source 30-b (such as a medium pressure mercury lamp, a heated coil or element, etc.) is placed along the axis and within a quartz or fused silica sleeve 30-c, as before. It is noted that, in the description that follows, the choice of an axisymmetric media is for the sake of illustrating the application of the preferred embodiments of this invention. The procedure described below is also applicable to media configurations having non-circular cross section (e.g. rectangular, elliptical, rippled, etc.).

Figure 10:
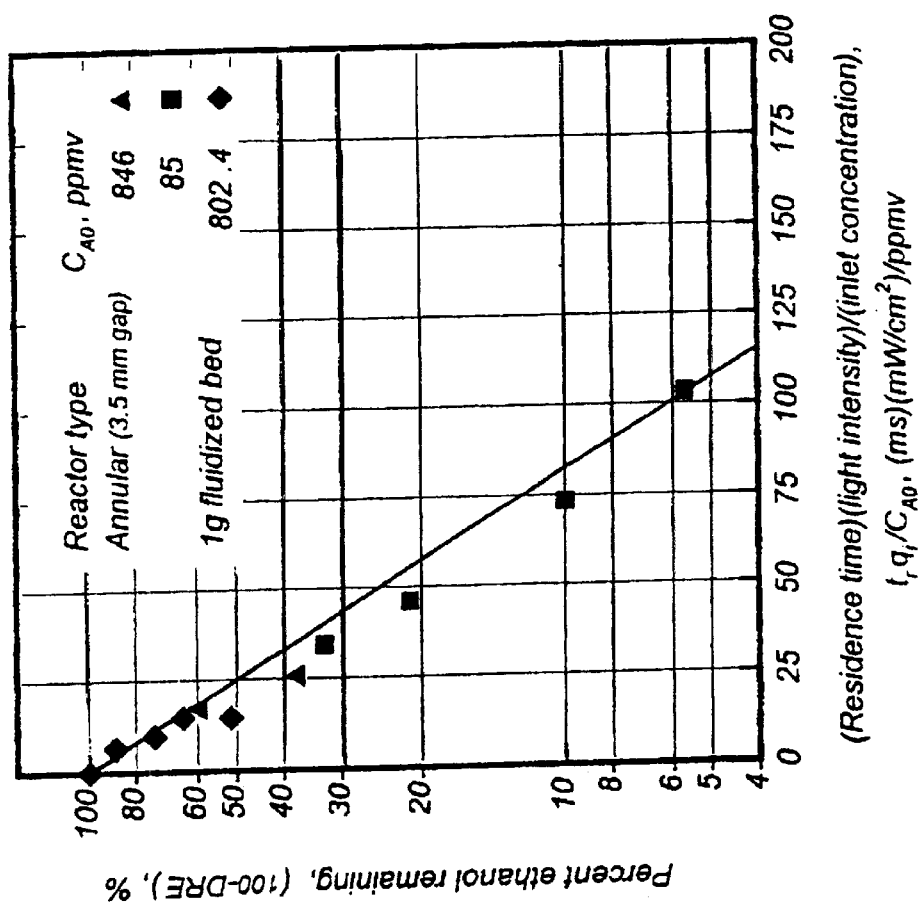
FIG. 10 depicts photocatalytic oxidation of ethanol in a 1 g fluidized bed reactor and a small gap annular flow reactor.

Referring to configuration 1a of FIG. 9a, 10-a refers to an impermeable hollow shell (metallic, synthetic polymeric, i.e. DuPont's TYVEK$^R$ and the like), having a closed end 12-a and opposite open-end passageway 14-a, about a closed mid portion 16-a. A permeable catalytic media 20-a (Type IV catalytic material coated onto cotton flannel, synthetic polymeric cloth or woven glass fiber cloth/mesh) has one end 22-a connected to shell closed end 12-a, and opposite end 24-a, connected to shell mid portion 16-a. Stream A passes into inlet 19-a, passes through the catalytic media 20-a and out end passageway 14-a.

In a like manner, referring to configuration 1b of FIG. 9b, 10-b refers to an impermeable rotating drum (i.e. metallic, and the like), having a closed end 12-b and opposite closed end 16-b about an open mid portion passageway 14-b. The impermeable rotating drum 10-b housed within a stationary plenum vessel 10-c, closed at both ends 6 and 8. A permeable rotating grid or distributor 18 holds the fluidized particle bed 20-b (Type III or V catalytic media). In the preferred embodiment of this invention, rotating grid 18 is fabricated in the form of a truncated cone with a 2–8° taper angle, more preferably about 4° taper angle. Furthermore, the rotating grid 18 is constructed using at least a 22 gage perforated sheet metal having at least 50% open area. The inside surface of the grid 18 is covered with a U.S. Sieve #100 mesh stainless steel screen butt-welded to perforated basket at either side and tightly wrapped on the outer surface with one layer of a close-knit glass fiber mesh/cloth. The rotating basket or grid assembly 18 has one closed end at 22-b connected to impermeable rotating drum closed end 16-b, and opposite end 24-b, connected at mid portion to fused silica sleeve 30-c. Stream A passes into inlet 19-b through the stationary inlet conduit 21 into the space between rotating plates 12-b and 24-b, through permeable rotating grid 18, passes through fluidized catalytic media 20-b and out end passageway 14-b, through stationary exit conduit 23. The rotating drum 10-b is supported at the bottom and top by ball (or roller) bearings 25 and 27, respectively. Additional bearings 29 and 31 are provided at the bottom and top to support rotating fused silica sleeve assembly 30-c. Special fluid-tight seals are also provided at the interfaces between the rotating and stationary articles at 33, 35, 37 and 39. The UV lamp 30-b is stationary, so are the connecting power leads 41 and 43. The lamp coolant (air or nitrogen) enters at 50 through rotating metallic (e.g. stainless steel) inlet tubing 40 and exits at 55 through the rotating metallic (e.g. stainless steel) outlet tubing 45. Finally, the gear system 65 delivers the torque 60 developed by an electrical motor to gear 70 connected to the rotating inlet conduit 75.

The fluid containing contaminant A enters the catalytic media 20-a in FIG. 9a. It flows radially outward through the catalytic media and then along the reactor axis, in the space between the catalytic media and reactor wall, and out of the rector at the opposite end. In a like manner, the contaminated stream enters the high-flux reactor radially through the grid and centrifugal fluidized particle bed and exits the reactor axially at one open end of the rotating drum. Both the low-flux and high flux reactors of FIG. 9a and 9b can operate either horizontally or vertically, independent of direction of gravitational acceleration.

It is understood that the analysis disclosed below is equally valid if the direction of the flow that enters and exits the low-flux reactor is reversed (i.e. contaminated stream entering the catalytic media from the dark side of the photosystem). In certain applications, it is desirable or advantageous to have the contaminant stream flow in crossing the catalytic media from the space between the catalytic media and reactor wall (dark side) to the space between catalytic media and heat/light source (light side). One example is when the incoming flow contains dust, particulate matter, or compounds detrimental to the catalyst activity. In the case of high-flux reactor, the fluid containing contaminant A must always enter the high-flux catalytic media of FIG. 9b from the dark side of the rotating particle bed. Finally, it should be noted that the analysis below follows the same line of logic regardless of whether a low-flux or a high-flux reactor is present, or whether or not the target species cross the light side to the dark side or vice versa. Now let:

In FIG. 9a and 9b, $Q_1$ refer to flow rate of contaminated stream A.

$C_{A0}$ be inlet concentration of target pollutant A.

$C_{Af}$ be exit concentration of target pollutant A.

$D_0$ be the mean diameter of the low-flux catalytic media 20-a in FIG. 9a or high-flux catalytic media 20-b in FIG. 9b.

$d\forall$ be low- and high-flux incremental volume for analysis.

L be the length of low-flux media 20-a in FIG. 9a or height of the high-flux fluidized catalytic media 20-b in FIG. 9b.

z be the coordinate distance from inlet 19-a in FIG. 9a or the closed end of the rotating basket/grid 24-b in FIG. 9b.

dz be the incremental length of the control volume being analyzed in FIG. 9a and 9b.

Furthermore, let's consider an irreversible surface reaction on the catalytic media. Assuming steady state conditions prevail, the material balance for species A in the elemental reactor volume $d\forall$ can be written as $$-Q_1 \frac{dC_A}{dz} = (-r_{AS}) = \text{rate of disappearance of reactant } A \quad (1)$$

Where $Q_1$ is the volumetric flow rate (actual), $C_A$ is the bulk concentration of species A, and $r_{AS}$ refers to the rate of reaction of species A on the catalyst surface. The rate of the reaction, $r_{AS}$, expressed per unit mass of catalyst, may be written either in terms of the diffusion rate from the bulk fluid to the catalyst surface or in terms of the rate on the surface as follows:

$$(-r_{AS}) = k_m a_L (C_A - C_{AS}) = k_{AS} \delta' C^p_{AS} (\alpha q_i)^m \quad (2)$$

Where;

$C_{AS}$=concentration of species A on the catalyst surface $k_m$=mass transfer coefficient from fluid to catalyst surface $k_{AS}$=reaction rate constant per unit mass of catalyst $a_L$=mass/heat transfer area per unit length of the catalytic media $\delta'$=Mass of catalyst per unit length of the catalytic media For radial/lateral flow through catalytic media, it can be said that, $k_{AS}\delta'$ is very much less than $k_m a_L$. Under these conditions, the mass transfer resistance is negligible with respect to the surface reaction rate, i.e., the kinetics of the surface reaction control the rate. Then, $C_{AS}$ approaches $C_A$ in the bulk fluid, and the rate is $$(-r_{AS}) \approx k_{AS} \delta' C^p_A (\alpha q_i)^m \quad (3)$$

In equation (3), the term $(\alpha q_i)$ represents the photonic contribution to the reaction rate of species A on the photocatalytic surface. In the case of a purely thermocatalytic media, equation (3) reduces to $$(-r_{AS}) \approx k_{AS} \delta' C^p_A \quad (4)$$

Exponent p and m represent reaction orders with respect to the concentration of species A and photons capable of exciting the photocatalyst. Clearly, in certain situations, the assumption that $C_{AS}=C_A$ may not be valid. In those situations $C_{AS}$ is determined in terms of the bulk concentration of species A. The rate of consumption of pollutant A on the surface of the catalyst can then be described by the Langmuir-Hinshelwood-Hougen-Watson (LHHW) formulation. For example, if the reaction at the surface is irreversible, involves only species A and product P of the reaction is very strongly adsorbed but adsorption of the reactant A is relatively week, then, the rate equation becomes:

$$(-r_{AS}) = k'_{AS} \delta' C_A / C_p$$

Another example is when the reacting molecules, intermediate products (or secondary reactants) or final reaction products are strongly adsorbed on the surface. This is the case when treating plasticizers such as diethylphathalate (DEP) or di-n-propyladipate (DPA). Oxidation of DEP and DPA on the surface of titania proceeds by way of phathalic acid (PA) and adipic acid (AA), respectively, as the intermediate products. PA and AA are strongly adsorbed on the catalyst surface. However, if the oxidant is present in excess or the concentration of pollutant A is low, and all other contaminants present adsorb very weakly, then, equation (3) is valid and p≈1. From equation (1) and (3), we have $$Q_1 \frac{dC_A}{dz} = -k_{AS} \delta' C_A (\alpha q_i)^m \quad (5)$$

Equation (5) is solved, subject to the following boundary conditions:

$C_A = C_{A0}$ at $z=0$; and, $C_A = C_{Af}$ at $z=L$ to yield $$\frac{C_{Af}}{C_{A0}} = \exp\left[-\frac{k_{AS} \delta' L (\alpha q_i)^m}{Q_1}\right] \quad (6)$$

Where; $C_{A0}$ and $C_{Af}$ refer to the bulk fluid concentration of species A at the reactor inlet and outlet and L is the reactor/catalytic media length. In terms of conversion, $x_m$, equation (6) can be rewritten to give $$x_m \equiv 1 - \frac{C_{Af}}{C_{A0}} = 1 - \exp\left[-\frac{k_{AS} \delta' L (\alpha q_i)^m}{Q_1}\right] \quad (7)$$

The apparent quantum efficiency of the photo-process, $\phi_1$, is defined as $$\phi_1 \equiv \frac{(-r_{AS})}{\pi D_0 \alpha q_i} \quad (8)$$

Where $q_i$ = irradiance on the catalytic surface $\alpha$ = absorptivity of photocatalyst material $D_0$ = mean diameter of the catalytic media 20-a or 20-b in FIG. 9a and FIG. 9b, respectively, as before.

Here, $r_{AS}$ is defined as the rate of reaction per unit length of catalytic media. Then, substituting for $(-r_{AS})$ from equation (3) into equation (8) and noting: p=1, we have $$\phi_1 \equiv \frac{k_{AS}\delta' C_A}{\pi D_0}(\alpha q_i)^{m-1} \quad (9)$$

At the onset, $\phi \equiv \phi_0$ and $C_A \equiv C_{A0}$, so that $$\phi_0 \equiv \frac{k_{AS}\delta'}{\pi D_0}(\alpha q_i)^{m-1} C_{A0} \quad (10)$$

or $$k_{AS}\delta'(\alpha q_i)^m = \frac{\pi D_0 \alpha q_i \phi_0}{C_{A0}} \quad (11)$$

Substitute from equation (11) into equation (6) and (7) to get $$\frac{C_{Af}}{C_{A0}} = \exp\left(-\frac{\phi_0 \alpha W_{uv}}{Q_1 C_{A0}}\right) \quad \text{and} \quad (12)$$

$$x_m = 1 - \exp\left(-\frac{\phi_0 \alpha W_{uv}}{Q_1 C_{A0}}\right) \quad (13)$$

Where, $W_{uv} \equiv i\pi D_0 q_i$ refers to the ultraviolet (all wavelengths at or below that needed to excite the photocatalyst) power output of the lamp 30-a in FIG. 9a or 30-b in FIG. 9b. Now, let $$\eta \equiv \frac{\alpha W_{uv}}{Q_1 C_{A0}} \quad (14)$$

Then, equation (12) and (13) can be rewritten as $$\frac{C_{Af}}{C_{A0}} = \delta_f = \exp(-\eta \phi_0) \quad (15)$$

Where, by definition: $\delta_f = C_{Af}/C_{A0}$, and then $$x_m = 1 - \exp(-\eta \phi_0). \quad (16)$$

The process photo-efficiency $\phi$ can be expressed in terms of $\phi_0$, as $$\frac{\phi_1}{\phi_0} \equiv \frac{\frac{k_{AS}\delta'}{\pi D_0}(\alpha q_i)^{m-1} C_{Af}}{\frac{k_{AS}\delta'}{\pi D_0}(\alpha q_i)^{m-1} C_{A0}} = \frac{C_{Af}}{C_{A0}} \equiv \delta_f$$

Then $$\frac{\phi_1}{\phi_0} \equiv \frac{C_{Af}}{C_{A0}} \equiv \delta_f \equiv 1 - x_m \quad (17)$$

Thus $$\phi_1 = \phi_0(1-x_m) = \phi_0 \delta_f \quad (18)$$

Figure 1A:
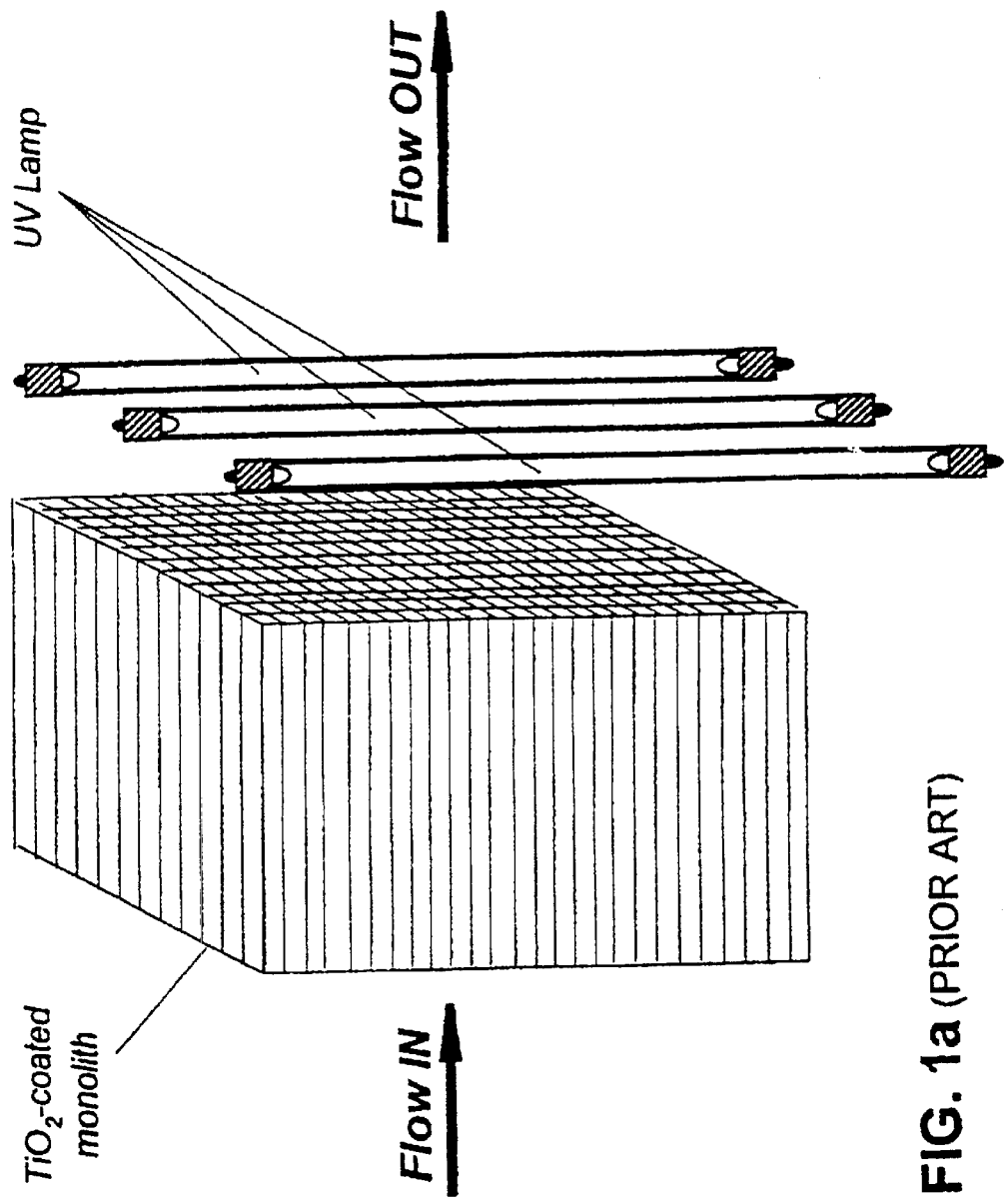
FIG. 1a shows a photocatalyst-coated monolith, a Category I design of the prior art.
Figure 1B:
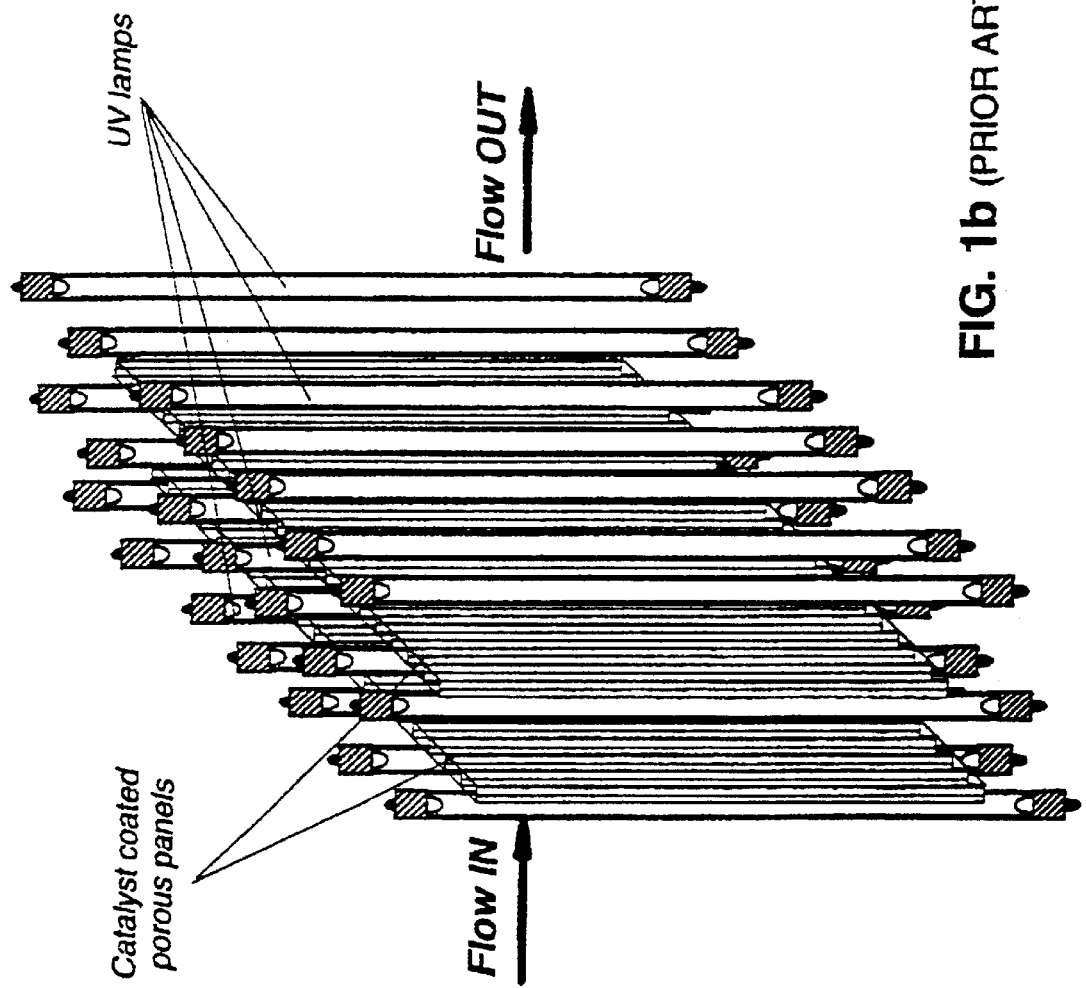
FIG. 1b depicts photocatalyst-coated panels, a Category I design of the prior art.
Figure 1C:
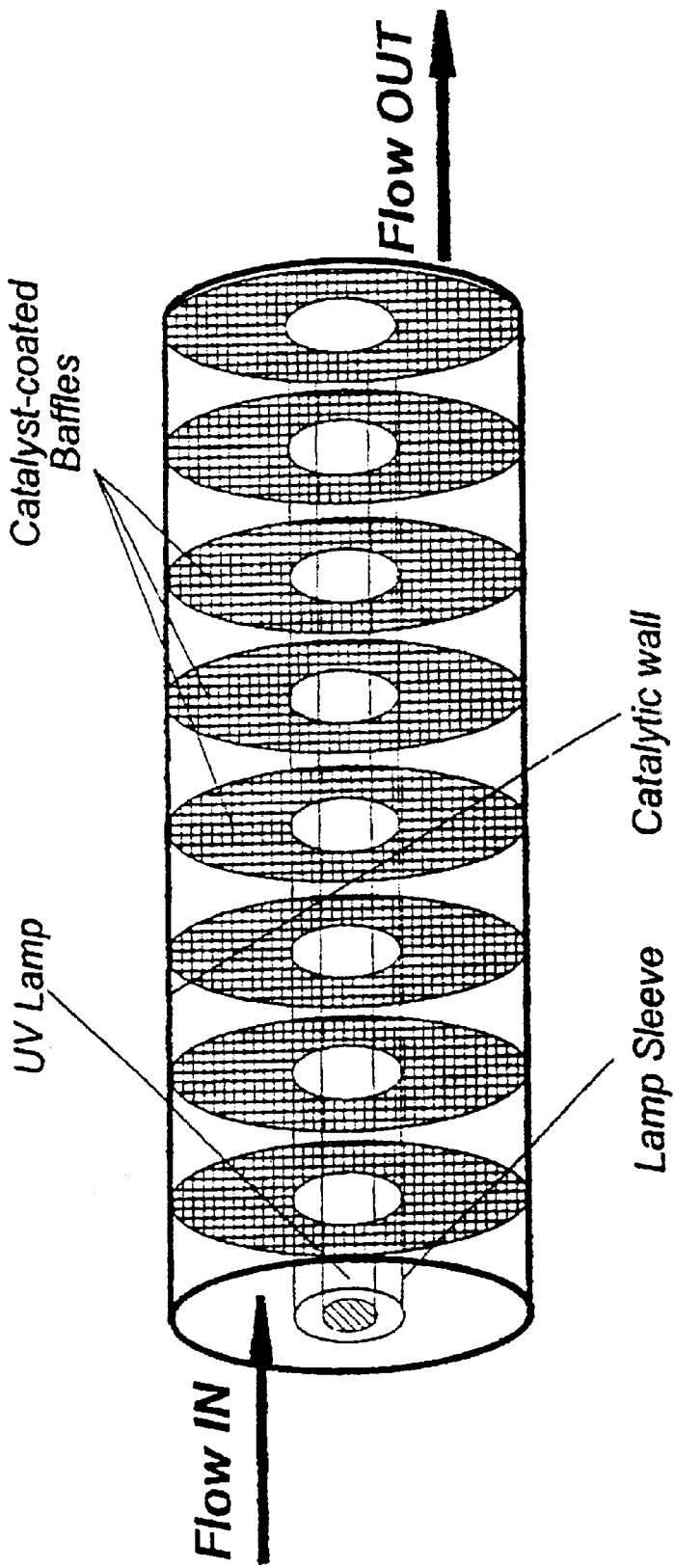
FIG. 1c displays a photocatalyst-coated baffled annular photoreactor, a Category I design of the prior art.

Equation (17) and (18) imply that in a single-stage low- and high-flux photocatalytic reactors 1a of FIG. 9a and 1b of FIG. 9b, the single-component conversion efficiency $x_m$ is always coupled to the apparent process photo-efficiency $\phi_1$ ($=\phi_0 \delta_f$). The "coupling" equation 18 also implies that as the process DRE→100% (i.e. $x_m$→1), the single-stage photo-efficiency approaches zero ($\phi_1$→0). This is an inherent deficiency of the photocatalytic processes that results in lower and lower photo-efficiencies (poor energetics) at increasingly higher and higher process DREs. A method for mitigating this effect and, thus, decoupling $\phi_1$ from $x_m$, constitutes the essence of the present invention, disclosed in the following pages. From equation (16), write $$\frac{dx_m}{d\eta} = \phi_0 \exp(-\eta \phi_0) \quad (19)$$

Combining equation (18) and (19) gives $$\phi_1 \equiv \frac{dx_m}{d\eta} \equiv -\frac{d\delta_f}{d\eta} = \phi_0 \delta_f$$

Also $$\phi_1/\phi_0 = (dx_m/d\eta)/(dx_m/d\eta)_{at\ \eta=0} = 1-x_m = \delta_f \quad (20\text{-a})$$

Alternatively, the generalized form of the coupling equation can be written as $$\phi_1/\phi_0 = (d\delta_f/d\eta)/(d\delta_f/d\eta)_{at\ \eta=0} = 1-x_m = \delta_f \quad (20\text{-b})$$

Finally, for purely thermocatalytic media, combining equation (4) to (7) gives $$x'_m \equiv 1 - \exp\left[-\frac{(-r_{AS})_{max} L}{Q_1 C_{A0}}\right] \quad (21)$$

Where, $(-r_{AS})_{max}$ refers to the maximum value of thermocatalytic reaction rate that is $$(-r_{AS})_{max} = k'_{AS} \delta' C_{A0} \quad (22)$$

and $$k'_{AS} \equiv A \exp(E/R_g T) \quad (23)$$

Where, A is the frequency (or pre-exponential) factor and E is the activation energy. $R_g$ refers to ideal gas constant.

Noting that, surface ("heterogeneous") Damkohler member, $Da_1$ is defined as $$Da \equiv \frac{(-r'_{AS})L}{Q_1 C_{A0}} \quad (24)$$

Then, equation (21) can be rewritten as $$x'_m = 1 - \exp(-Da). \quad (25)$$

Figure 20:
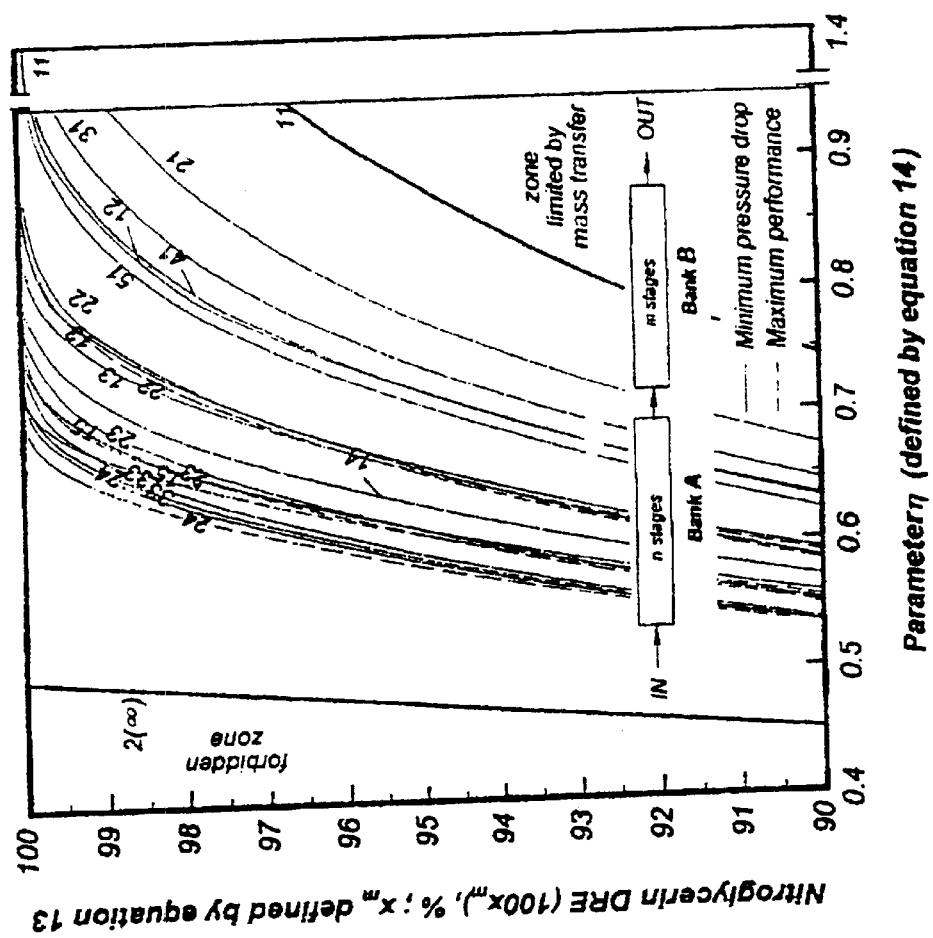
FIG. 20 depicts the performance of a full-scale photocatalytic pollution control unit (PPCU) of the present invention, having two parallel modules each employing two banks in series and segmented (multistage) cotton (flannel) stockings, for inlet concentration of nitroglycerin $C_{A0}=10$ ppmv, 4" OD photocatalytic stockings, and 60" long LPML (Voltarc$^R$ T64T6-VH) 65 W nominal power.

For the general case wherein the catalyst media 20-a of FIG. 9a and 20-b of FIG. 9b may be active as either photocatalyst or thermocatalyst, combining equation (16) and (25) yields $$x_m = 1 - \exp[-(\eta \phi_0 + Da)] \quad (26)$$

Equation (26) represents the general case of the photocatalytic, thermocatalytic or combined photo- and thermocatalytic process conversion efficiency subject to no mass transfer limitations. Equation (26) can be rewritten as $$x_m = 1 - \delta_f = 1 - \exp[-(\eta\phi_0 + Da)]$$

where, as before $$\delta_f \equiv \frac{C_{Af}}{C_{AO}} \quad (27)$$

Then $$\delta_f = \exp[-(\eta\phi_0 + Da)] \quad (28)$$

From equation (14)

$$\eta \equiv \frac{aW_{uv}}{Q_1 C_{AO}} \equiv \frac{a}{Q_1 C_{AO}} \equiv aH \quad (29)$$

Where $$H \equiv \frac{1}{Q_1 C_{AO}} \quad \text{and} \quad (30)$$

$$Da \equiv \frac{(-r'_{AS})L}{Q_1 C_{AO}} = (-r'_{AS})LH \quad (31)$$

Then $$1 - x_m = \delta_f = \exp[-(\eta\phi_0 + Da)] = \exp[-(a\phi_0 - r'_{AS}L)H] \quad (32)$$

In equation (32), "a" is a parameter whose value depends on the units of $Q_1$, $C_{AO}$, and $W_{uv}$ as well as the type of light source employed. $Q_1$, $C_{AO}$ and $W_{uv}$ are given in units of $Ls^{-1}$, ppmv and mW, respectively. In equation (32), "a" is equal to 1062 and 122,543 for typical low-pressure mercury lamp 30-$a$ (60 inch arc length and 32% electric to photon energy efficiency) and medium-pressure mercury lamp 30-$b$ (60 inch arc length, 200 W/in output and 20% electric to photon, $\lambda$<400 nm energy efficiency), respectively. Again, equation (32) represents conversion for the general case of a photocatalytic, thermocatalytic or combined photo- and thermocatalytic process that is 1—Free from mass transfer intrusions.
2—Provides uniform catalytic media surface irradiance
3—Results in a uniform catalyst temperature.

The coupling equation (20) now takes the following form:

$$x_m = 1 - \delta_f = 1 - (dx_m/dH)/(dx_m/dH)_{at\ H=0} \quad (33)$$

Again, equation (33) applies if the photocatalytic or thermocatalytic process is free from the mass transfer intrusions and all catalytic surfaces are uniformly irradiated or heated. The low-and high-flux catalytic media/processes of the present invention all conform to the requirements of equation (32) and (33), as depicted by the following examples.

EXAMPLES 4 & 5

EXAMPLES 4 and 5 describe the low-flux data obtained by the subject inventor using small-gap annular and fluidized bed photocatalytic reactors. These EXAMPLES are intended to show that if, by design, no mass transfer intrusions exists within photoreactor; then, equation 32 describes species conversion, regardless of the reactor type and fluid-solid contacting scheme.

EXAMPLE 4 refers to small gap annular reactor tests. The reactor body was a Pyrex$^R$ tube having 38 mm outside diameter and a nominal length of 90 cm. A standard, Voltarc Tubes, Inc. G36T6 germicidal low-pressure mercury vapor lamp was placed co-axially within the Pyrex tube. Titania (Degussa P25) wash coated onto the inner surface of the photoreactor. The reactor volume was 808 ml; flow passage (gap between the inner wall of the reactor and quartz sleeve encasing LPML) was 3.5 mm and catalyst geometrical surface area totaled 1531 cm$^2$. Air stream containing 845 and 85 ppmv ethanol vapor entered the annular photoreactor. All reactor walls were kept at a constant temperature of about 85° C.

EXAMPLE 5 refers to a standard 1 g (acceleration of gravity, 9.8066 n/s$^2$) fluidized bed (1 gSFB) photoreactor tests. The bed materials consisted of fine silica-gel particles that provided the base material for titania photocatalyst. The photocatalyst was deposited on the silica-gel particles by soak & dry technique. After wash coating silica particles, they were baked at 450° C. for several hours before use. The catalyst loading for these tests was approximately 20 wt %. The packed bed thickness for EXAMPLE 5 tests were about 11 mm and mean particle size fell in the range of 100–120 mesh (U.S. standard sieve sizes). The expanded bed volume was measured to be approximately 15.3 ml. The diameter of the quartz grid (distributor) was 40 mm. The fused silica fluidized bed tube was placed inside a photon bucket surrounded by six 8W low-pressure mercury lamps. LPMLs could be turned on in banks of 2, 3, 4, and 6 lamps.

FIG. 10 depicts ethanol conversion results for the low-flux flow photoreactor of EXAMPLES 4 and 5. It can be seen that ethanol conversion data obtained within the small gap (3.5 mm) annular and 1 g fluidized bed (11 mm thick particle bed) photoreactors closely conform to the plug flow approximation given by equation 32. In a like manner, all the low-flux catalytic media and photoreactors of the present invention also conform to plug-flow approximation given by equation (32) and (33). This will be demonstrated by EXAMPLES 7–12, later in the text. But first; we disclose the preferred embodiments and design criteria for the single-stage, high-flux rotating fluidized bed reactors of the present invention as follows.

EXAMPLE 6

The governing equations for designing the preferred high-flux rotating fluidized bed reactors of the present invention are as follows:

$$\Delta P_{FB} = m_{B1}/\omega_0^2/2\pi L \quad (34)$$

$$Ga = \left[\frac{150(1-\varepsilon_B)}{\varepsilon_B^3 \phi_S^2}\right] Re_{MF} + \frac{1.75}{\varepsilon_B^3 \phi_S} Re_{MF}^2 \quad (35)$$

$$Q_1 = \rho_f u_1 A_{grid} = \rho_f u_1 \pi D_0 L \quad (36)$$

Where;

$$Ga = \text{Galileo Number} = \left(\frac{\rho_S}{\rho_f} - 1\right) \omega_0^2 D_0 \frac{d_P^3}{v_f^2} \quad (37)$$

$$Re_{MF} = \text{Reynolds Number} = \frac{u_{MF} d_P}{v_f} \quad (38)$$

In equations 34 to 38, $\Delta P_{FB}$, $m_{B1}$, $\omega_0$, $\varepsilon_b$, $\phi_S$, $\rho_S$, $d_P$, $\rho_f$, $v_f$, $u_{MF}$, $u_1$, $D_0$, $L$, and $A_{grid}$ denote catalyst bed pressure drop, single-stage fluidized bed mass, angular velocity of the grid/basket, bed void fraction, sphericity of catalyst particle, particle density, mean particle diameter, fluid density, fluid kinematic viscosity, minimum fluidization velocity, superficial fluid velocity at grid surface, diameter of rotating grid/distributor, bed height, and grid surface area, respectively. The minimum fluidization velocities in centrifugal fluidized bed reactors are based on a correlation given by equation (36) due to Levy, E. K., Martin, N. and J. C. Chen, Fluidization, Edited by F. Davidson and D. L. Kearins, Cambridge University Press, London, p.71 (1978), which is incorporated herein by reference.

General guidelines for designing high-flux, multi-stage centrifugal fluidized bed photocatalytic, thermocatalytic and combined photo- and thermocatalytic reactors of the present invention based on the equations above are as follows:

1. Process conditions are so chosen to facilitate plug-flow behavior for species transported across the particle bed. This requires that the superficial fluid velocity to remain near minimum fluidization velocity $u_{MF}$ all the time. In the preferred embodiment of this invention, $u_1$ varies between 2 and 4 times $u_{MF}$. For reactor throughputs much beyond $4u_{MF}$, the extent of bubble formation and fluid by-pass is considerable.

Figure 2:
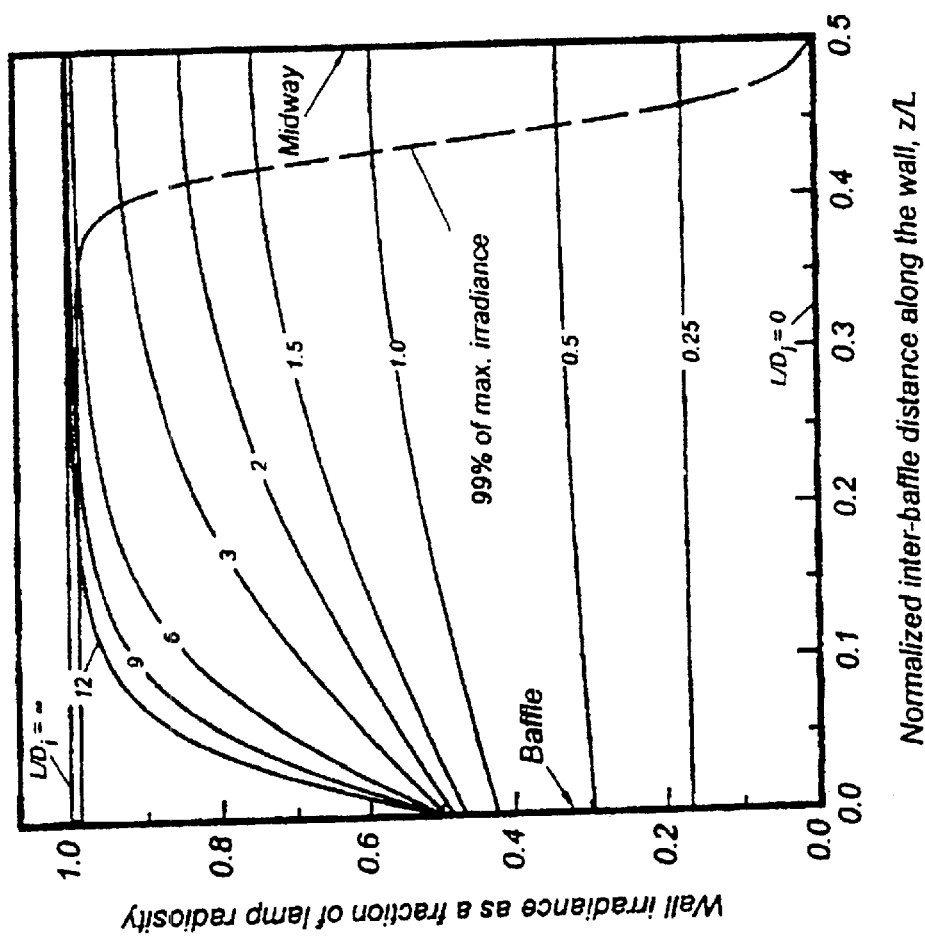
FIG. 2 shows the variation of wall irradiance for photocatalytic design of prior art depicted in FIG. 1c for the case in which photocatalyst surface emissivity is unity (i.e. all UV radiation incident on photocatalyst is absorbed), $k=D_i/D_o=0.375$, $D_i=25$ mm, and 65 W LPML.
Figure 3:
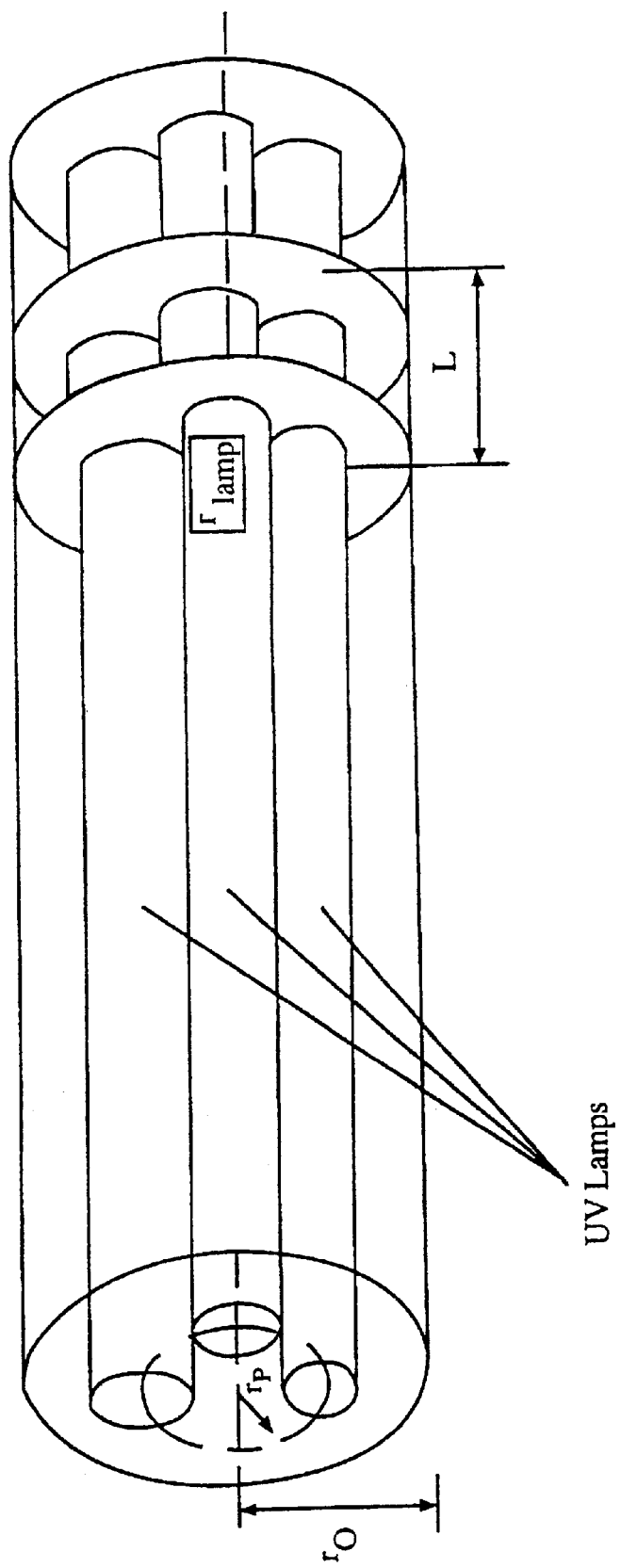
FIG. 3 is the experimental set up for surface irradiance measurements in a clustered tri-lamp photoreactor.
Figure 4A:
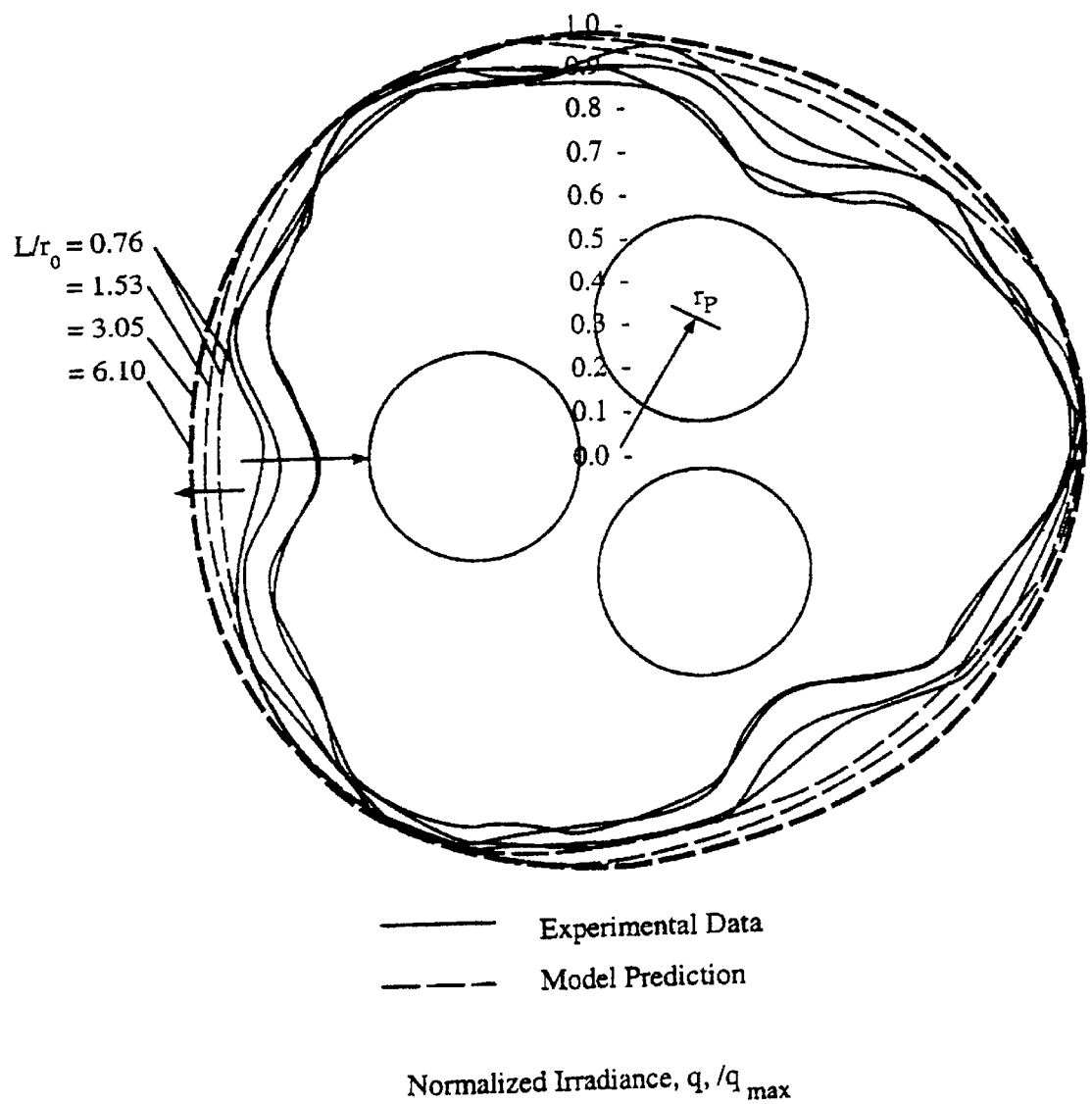
FIGS. 4a and 4b depict lateral variation of wall irradiance in tri-lamp annular baffled photoreactor. Normalized wall irradiance is given at mid-point between two neighboring baffles for a three lamp cluster (8 W each), lamp radius of $r_{lamp}=0.31"$ and single lamp wall peak irradiance of $q_{l,\infty}=3.69$ mW/cm$^2$, and packing ratio of a) $r_p/r_o=0.333$ and b) $r_p/r_o=0.452$.
Figure 4B:
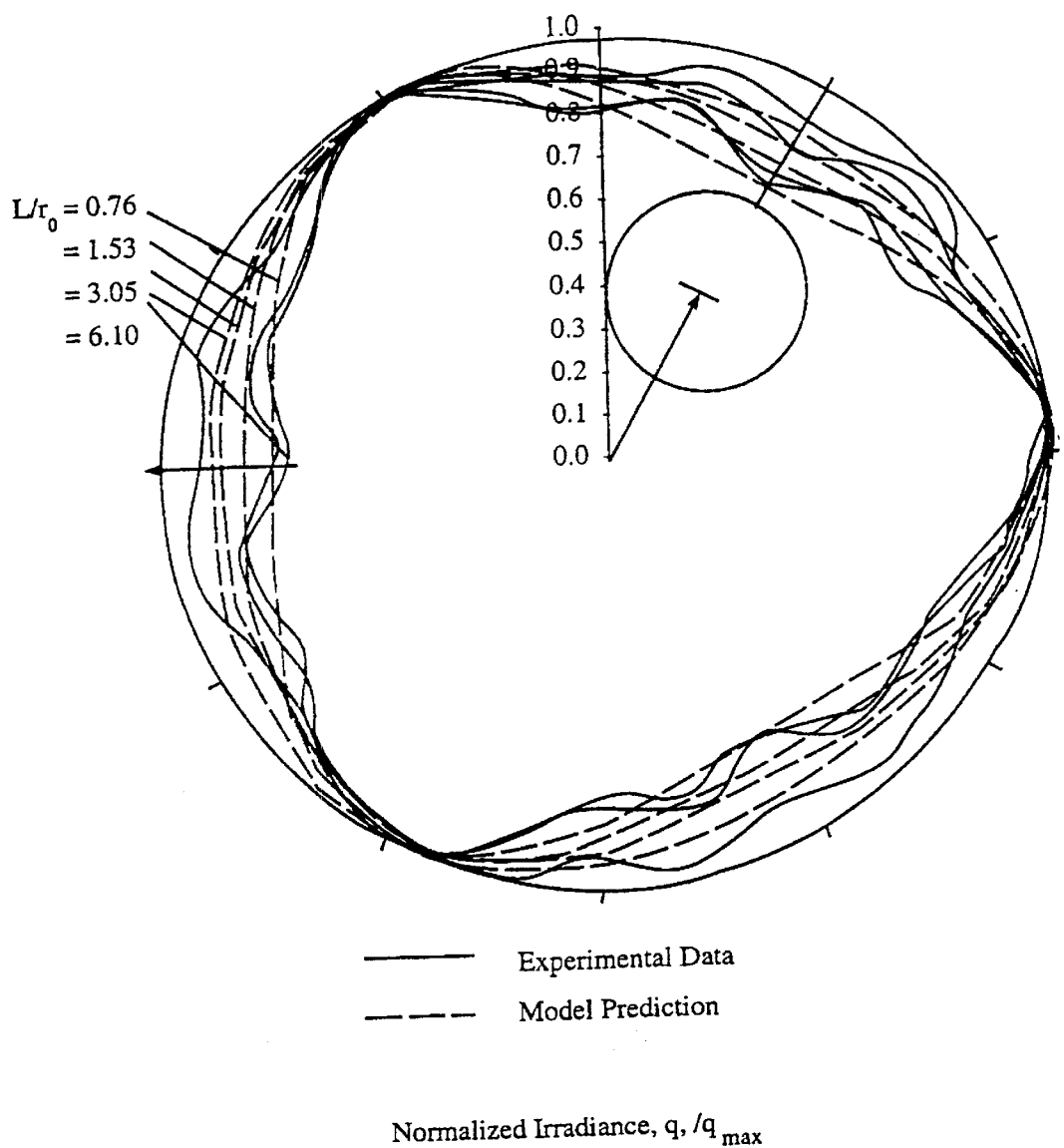
Figure 5:
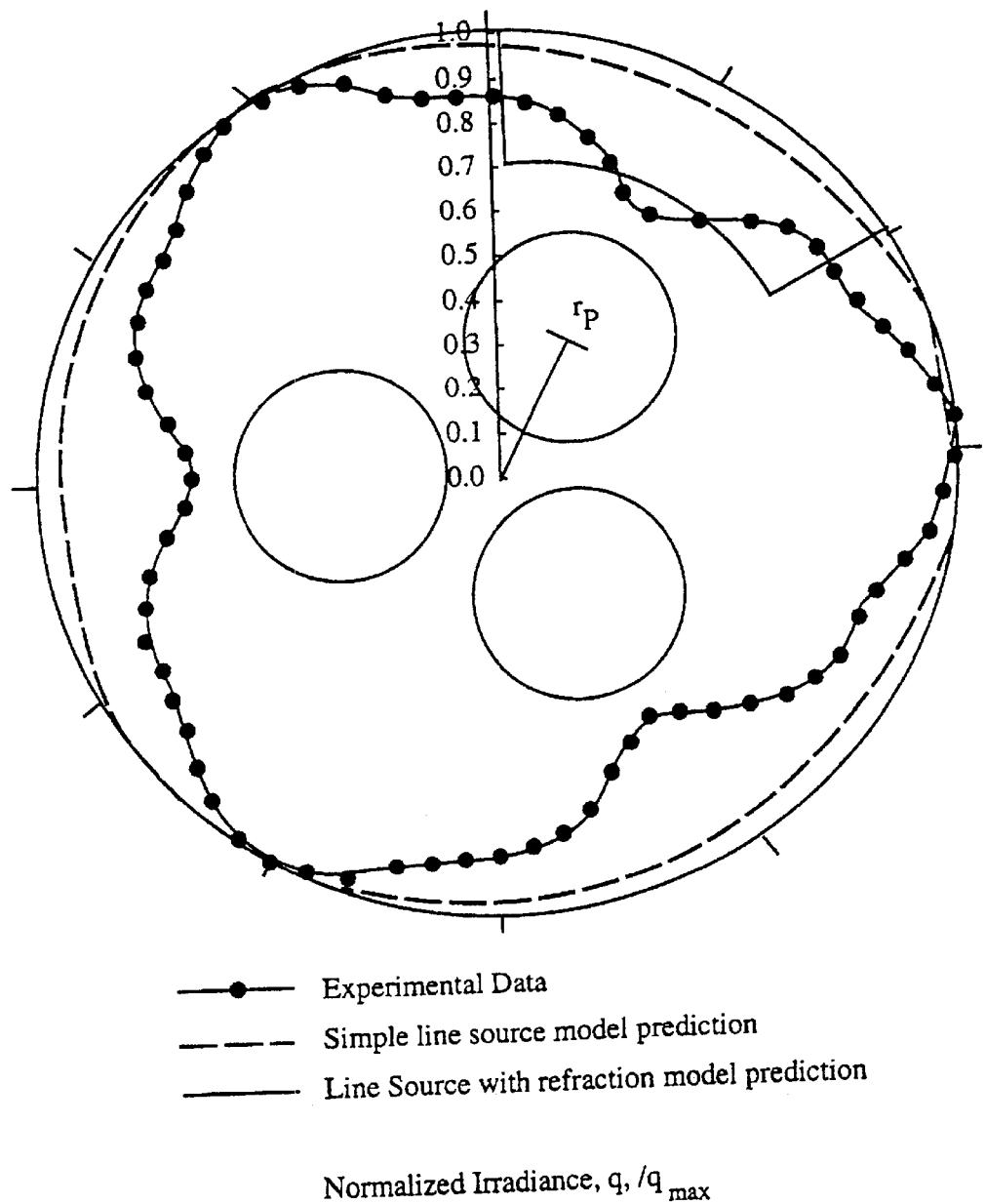
FIG. 5 shows lateral variation of wall irradiance in tri-lamp annular baffled photoreactor with refraction effects. Normalized wall irradiance is given at mid-point between two neighboring baffles for a three lamp cluster (8 W each), lamp radius of $r_{lamp}=0.31"$ and single lamp wall peak irradiance of $q_{l,\infty}=3.69$ mW/cm$^2$, and packing ratio of $r_p/r_o=0.333$.

2. With reference to equation (34), it is important to have large L but small $m_{B1}$ and $\omega_0$. Large L also favors irradiance on the bed surface (refer to FIG. 2 and note large $L/D_1$). The requirement for small bed mass can also be satisfied in most cases. Considering limited penetration of UV light across fluidizing particle bed of mostly opaque catalyst material, an expanded bed thickness of approximately 5–20 mm (depending on the mean particle diameter, bed void fraction, etc.) is normally sufficient. Bed angular velocity is related to reactor throughput via equation (35).

EXAMPLE 7

Figure 11A:
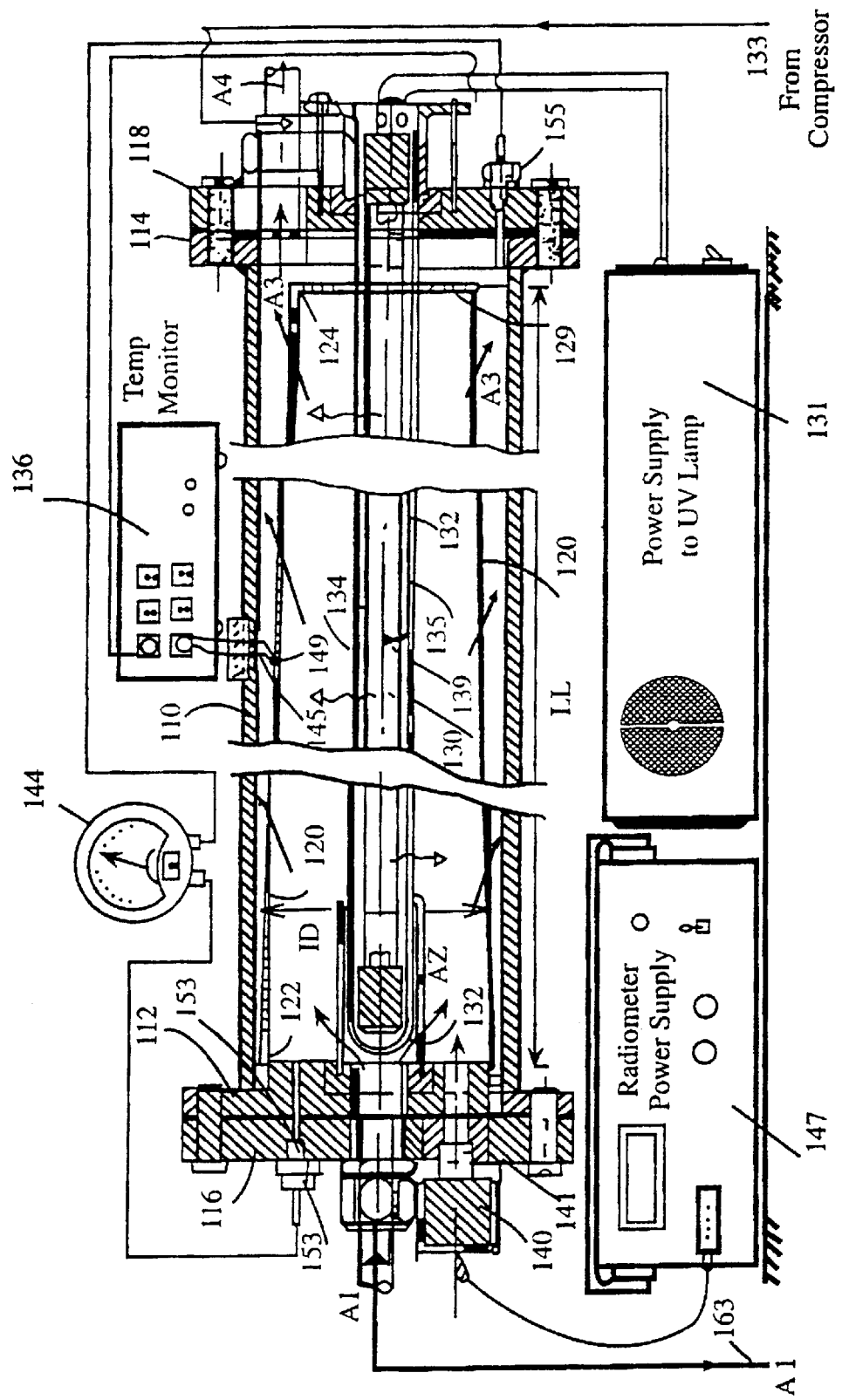
FIG. 11a is a schematic diagram of the single-cell photoreactor application of the subject invention having a single-stage low flux catalytic media (stocking).
Figure 11B:
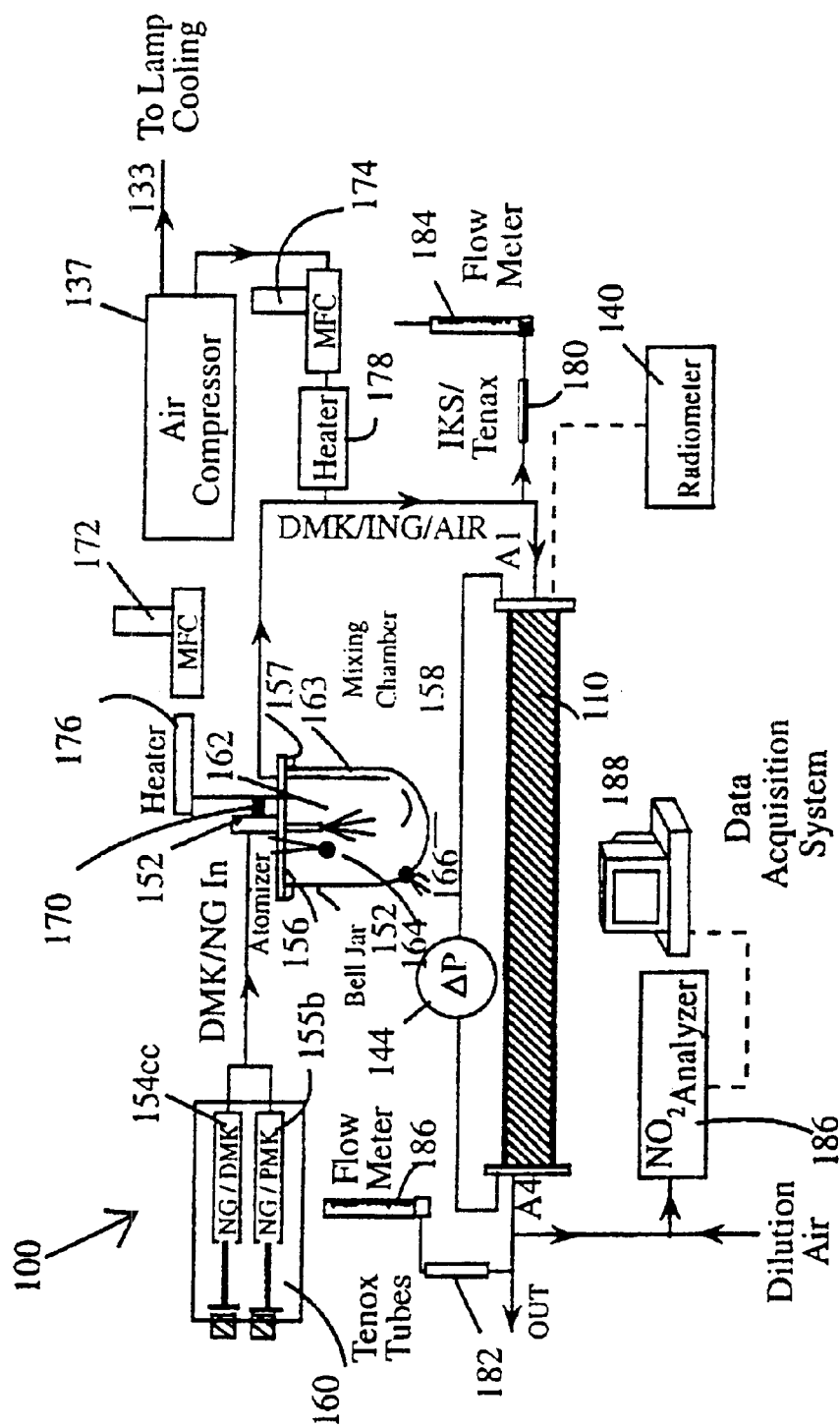
FIG. 11b is a schematic diagram of the experimental setup for low-flux flow photoreactor tests of the subject invention.

EXAMPLES 7 to 12 describe the preferred embodiments of the present invention with regard to the low-flux catalytic media implementation at single cell, plurality of multiple cells (or banks) and unit (multiple banks) levels. FIG. 11a and 11b depict one preferred embodiment 100 of the low-flux catalytic media implementation of the present invention wherein the catalytic process occurs within a single tubular metallic cell 110. With reference to FIG. 11a, the main reactor body 110 is constructed from seamless 6061-T6 (aerospace grade) aluminum tube, 4.5" OD×4.0" ID×60" long (LL). Two 6.0" diameter aluminum end caps 116 and 118 are bolted to two aluminum flanges 112 and 114, respectively. The aluminum flanges 112 and 114 are welded to either end of the reactor tube 110. The end caps not only seal the reactor tube, but also provide a means for installation of the photocatalytic stocking as well as the devices necessary for monitoring of the process variables (pressure, temperature, irradiance, etc.). The irradiance levels within the reactor are measured in two locations using an International Light, model IL1700/SED005 radiometer 140. Radiometer 140 measures 254 nm radiation with 120 volt power supply 147. Radiometer was mounted parallel to the lamp axis facing a quartz window 141 installed on the inlet end cap 116. Pressure drop across the photocatalytic stocking is measured with a differential pressure gauge 144 (Dwyer Magnehelic) connected with ⅛" OD PTFE tubing to two static pressure taps 153 and 155 attached to the reactor end caps 116 and 118, respectively.

The preferred light source for this embodiment is a standard low-pressure mercury vapor lamp such as one commercially available from VTI, e.g. G64T5VH having 120 volt power supply 131. The ultraviolet light source 130 is placed within a 1" OD quartz or fused silica sleeve 132 that is closed in one end. The quartz sleeve 132 is mounted along the axis of the phototube via a bushing assembly located on the exit end cap 118 as depicted in FIG. 11a. The open end of the quartz sleeve 132 protrudes from the exit end cap 118 to accommodate lamp's electrical connections and cooling line 133. Lamp cooling is accomplished by directing dry cooling air 133 (provided by an Ingersoll-Rand compressor model SSRXF50SE 137, FIG. 11b). Typically, 1.5 SCFM of air is fed through a ¼" OD PTFE tubing 134, that extends half way into the quartz sleeve 132 providing the necessary cooling to the UV lamp. This flow of air was sufficient to maintain lamp's cold spot temperature within the optimum range and around approximately 51° C. The lamp's cold spot temperature is measured by a type "K" thermocouple 135 attached to the lamp envelope at 139, halfway along its length. Reactor outer wall temperature is monitored with a thermocouple pasted onto the outer shell, half way down its length. Temperature monitor 136 gives the skin temperature of the catalytic stocking 120 via thermocouple 145 (attached to the fabric at 149) and lamp 130 envelope temperature via thermocouple 135 (attached to the lamp at 139).

Referring to FIG. 11a, catalyst/support (base material) 120 of the present invention comprised of a tubular cotton fabric onto which a suitable photocatalytic material has been deposited according to teachings of EXAMPLE 3 and Table I. In one preferred embodiment of the present invention, the low-flux media 120 is comprised of the woven cotton flannel fabric. Catalytic media 120 connects at one end 122 to flange 112 and has an opposite end 124 connected to an impermeable PTFE end baffle 129. A reagent mixing chamber 158 is used to prepare vapor-phase contaminant stream A as depicted in FIG 11b. Reagents are loaded into two Hamilton™ gas-tight syringes 154a and 154b as depicted in FIG. 11b. All syringes have shanks and plungers that are preferably glass and PTFE construction, respectively. The syringe volume (capacity) depends on the carrier gas flow (e.g. air) and varies between 1 to 50 ml. Fully loaded syringes are then placed on a KD Scientific syringe pump 160 that pumps reagents (e.g. a mixture of nitroglycerine and acetone as depicted in FIG. 11b) to a Sonics and Materials™ brand ultrasonic atomizer probe 152 via a ¹⁄₁₆" OD PTFE tubing as depicted in FIG 11b. The atomizer probe 152 is bolted to a stainless steel plate 156 that covers the open end a glass bell jar 150 of the mixing chamber 158 as shown in FIG. 11b.

The mixing chamber 158 comprised of an inverted glass bell jar 150 supported at the top by a stainless steel plate 156 and a round donut-shaped aluminum ring 157. The heated carrier gas such as air enters at the top of the mixing chamber through a ½" OD stainless steel tube 162. The atomized liquid is mixed with the carrier gas and delivered to the reactor via a 1" OD heated stainless steel line 163. The mixing chamber wall temperature and the gas within are measured using type "K" thermocouples 166 and 164, respectively as shown in FIG. 11b. A static pressure tap 170 at the top of the mixing chamber allows gas pressure measurement.

Now, with reference to FIG. 11b, dry compressed air from 137 enters the system through two mass flow controllers 172 and 174 (Porter, model 204A). One portion of the metered air (typically 10 SCFM) passes through air heater 176 (Omega, model AHP-7561) and then into the mixing chamber 158. The second portion of the metered air (typically 10.15 SCFM) passes through second air heater 178 (Omega, model AHP-7561) and after by-passing the mixing chamber 158, combines with and dilutes its exit flow as depicted in FIG. 11b. The combined stream enters into the photocatalytic reactor 110 at A1. According to FIG. 11a, air containing contaminant A passes into one end of catalytic media 120 about lamp 130 and then in the direction of arrow A2 through sides of catalytic media 120 and into the space between 120 and reactor wall 110 at A3 and exit out of the reactor at A4.

An isokinetic sampling probe 180 is installed just upstream of the reactor as depicted in FIG. 11b. Gas collected by the probe passes through a Tenax adsorbent tube (Supelco 35/60, Orbo #42) and through a rotameter 184 (Gilmont Accucal) for quantification. Typical sampling volume is 27 liters, collected at about 1.8 L/min for 15 min. The reactor effluent is sampled via 182 and 186, as depicted in FIG. 11b, in a manner similar to that described above for the reactor inlet stream. The sampling flow rate at the exit is lower than that at the inlet due to lower exit port pressure. A portion of the exit gas is diluted with air (31:1) and then fed to a chemiluminescence $NO_x$ analyzer 186 (TECO, model 42) for real time monitoring of NO and $NO_2$ concentrations. $NO_x$ data is acquired using a PC based data acquisition system 188 (Workbench PC, Strawberry Tree, Inc.) as shown in FIG. 11b.

The EPA method 5 and OSHA method 43 (or NIOSH-2507 method) are employed, wherever applicable, to sample and analyze the inlet and outlet reagent concentration. The less volatile organic compounds are trapped within absorbent tubes supplied by Supelco company. Isokinetic sampling probes are used with the less volatile compounds. The analytical system consists of a capillary gas chromatograph (GC), connected to a Varian Saturn II ion-trap mass spectrometric system. The GC column used is a J&W fused silica capillary column, 15 m long, ¼ mm ID, with 1 micron coating of DB-1. Fixed gases and volatile organic compounds are analyzed on a packed column (30 feet, ⅛" OD Hayesep $D_B$) using Varian GC 3400 equipped with flame ionization and thermal conductivity detectors.

EXAMPLE 8

The article of EXAMPLE 7 wherein the reagent solution was 5% by weight nitroglycerin (NG) in acetone (DMK). The carrier gas was heated air (approximately 85° C.) flowing at 8 standard cubic feet per minute (SCFM). The average outside diameter of the catalytic stocking 120 used was 3.5 inches.

EXAMPLE 9

The article of EXAMPLE 7 wherein the reagent solution contained 5% by weight nitroglycerin in acetone. The carrier gas comprised of air heated to 90° C. and flowing at 8 SCFM into the mixing chamber 158 and photocatalytic reactor 110 (FIG. 11b). The material of the catalytic media or stocking 120 was woven cotton duck fabric, having an OD of 2.75 inches.

EXAMPLES 10 to 12

The article of EXAMPLE 7 wherein the reagent solution contained 2-nitrodiphenylamine (2NDPA) stabilized nitroglycerin. The reagent delivery system was a U-shaped glass tube packed with glass wool and filled with a mixture of NG and 2NDPA solution. The carrier gas was heated air at 90° C. flowing at 8, 10 and 12 SCFM corresponding to EXAMPLES 10, 11, and 12, respectively. The low-flux media (catalytic stocking) 120 was woven cotton flannel (both sides brushed) having an OD of 3.75 inches.

EXAMPLE 13

This Example demonstrates the performance of a single-stage photocatalytic stocking (SSPCS). Base material/support for this SSPCS was super flannel cotton, having an OD of about 3.8 inches, prepared according to the teachings of EXAMPLE 1. The catalytic media of this example was Kemira UNITI-908 prepared according to instructions of EXAMPLE 2 with no additives or further modifications. The SSPCS was prepared in a manner described in EXAMPLE 3. The SSPCS was tested in the low-flux reactor of FIG. 11 according to the methods and procedures described in EXAMPLE 7 and 9. Briefly, the reagent solution used contained 5% by weight nitroglycerine in acetone. The carrier gas comprised of air heated to about 95° C. and metered at 15.5 SCFM (approximately 20.2 ACFM at the average reactor temperature) entering into the reagents mixing chamber 158 and then into the photocatalytic reactor 110 (FIG. 11b). Concentration of nitroglycerin in the gas-phase was approximately 9.0 ppmv. The nitroglycerine DRE measured at approximately 75% ($\approx$79.5% at the exit). The residence time for NG within the catalytic media was determined to be approximately 36 ms. Addition of some additives from TABLE I improves performance. For example, adding organic Saffron gives approximately 78% NG DRE ($\approx$81.5% at the reactor exit) for an NG inlet concentration of 10 ppmv but all other experimental conditions identical to that of the base-case test described above.

Figure 12:
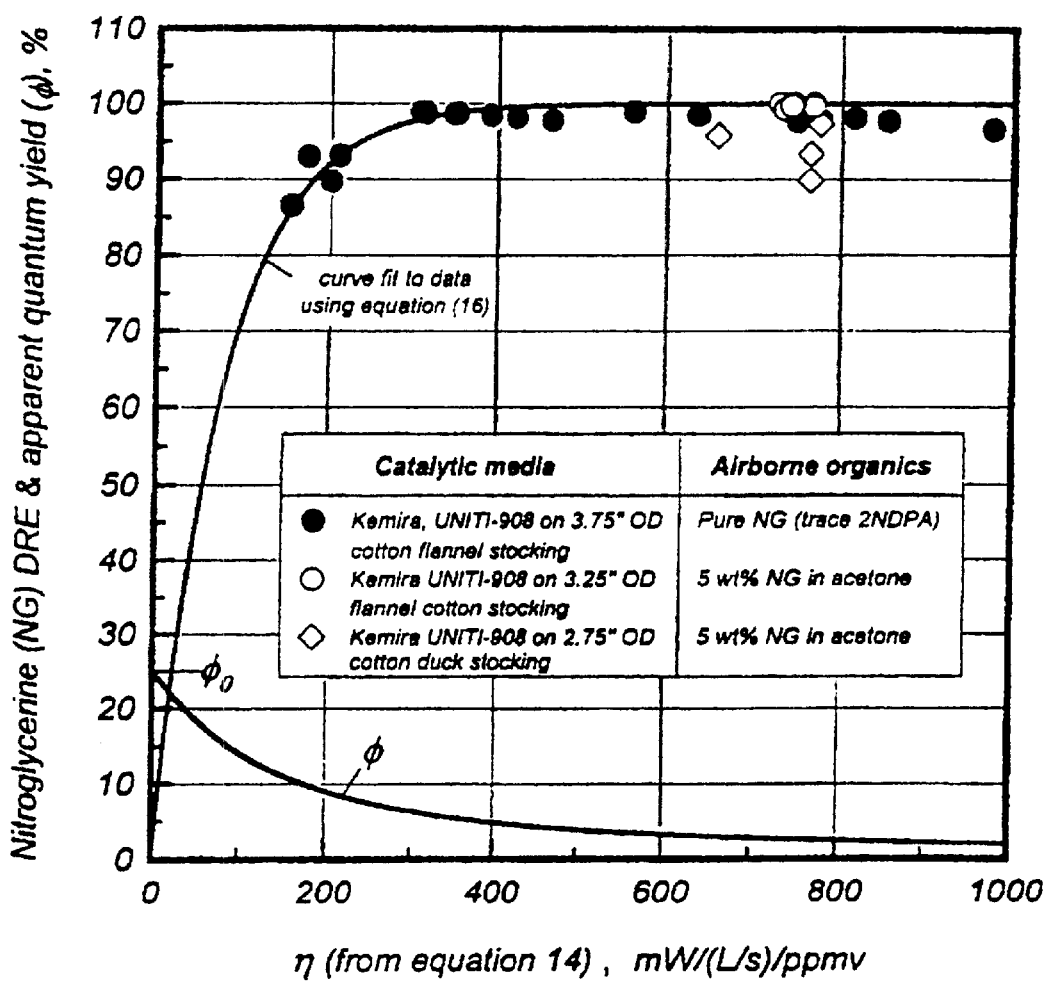
FIG. 12 shows experimental flow reactor data for nitroglycerine conversion, obtained in a single photocell equipped with a single-stage cotton stocking of 60 inches long and different diameters. A 60" long low-pressure mercury lamp (Voltarc$^R$ T64T6) having 65 W nominal power is used.

FIG. 12 depicts the laboratory flow reactor data of the EXAMPLES 8 to 12 for photocatalytic conversion of nitroglycerin in air. The plug flow behavior of the single-cell reactor of EXAMPLE 7 is depicted and indicates the validity of equations 32 and 33, described before. The quantum efficiency at the onset, $\phi_0$, for nitroglycerin vapors in air was estimated from the laboratory data of EXAMPLES 8 to 12 as displayed in FIG. 12 to be approximately 25%. In EXAMPLE that follows a method for mitigating the coupling effect and thus permitting partial or full decoupling of $\phi$ from $x_m$ (or $\delta_f$) is disclosed.

EXAMPLE 14

EXAMPLE 14 describes the preferred embodiments of the present invention for designing multistage catalytic media for both low-flux and high-flux applications. Let's consider a segmented photocatalytic, thermocatalytic or combined photo- and thermocatalytic media that will allow multiple contact between the contaminated stream and the catalyst. The catalytic media within a single-cell can be partitioned in a manner that either maximizes the quantum efficiency of the process or minimizes the pressure drop across the cell.

Figure 13A:
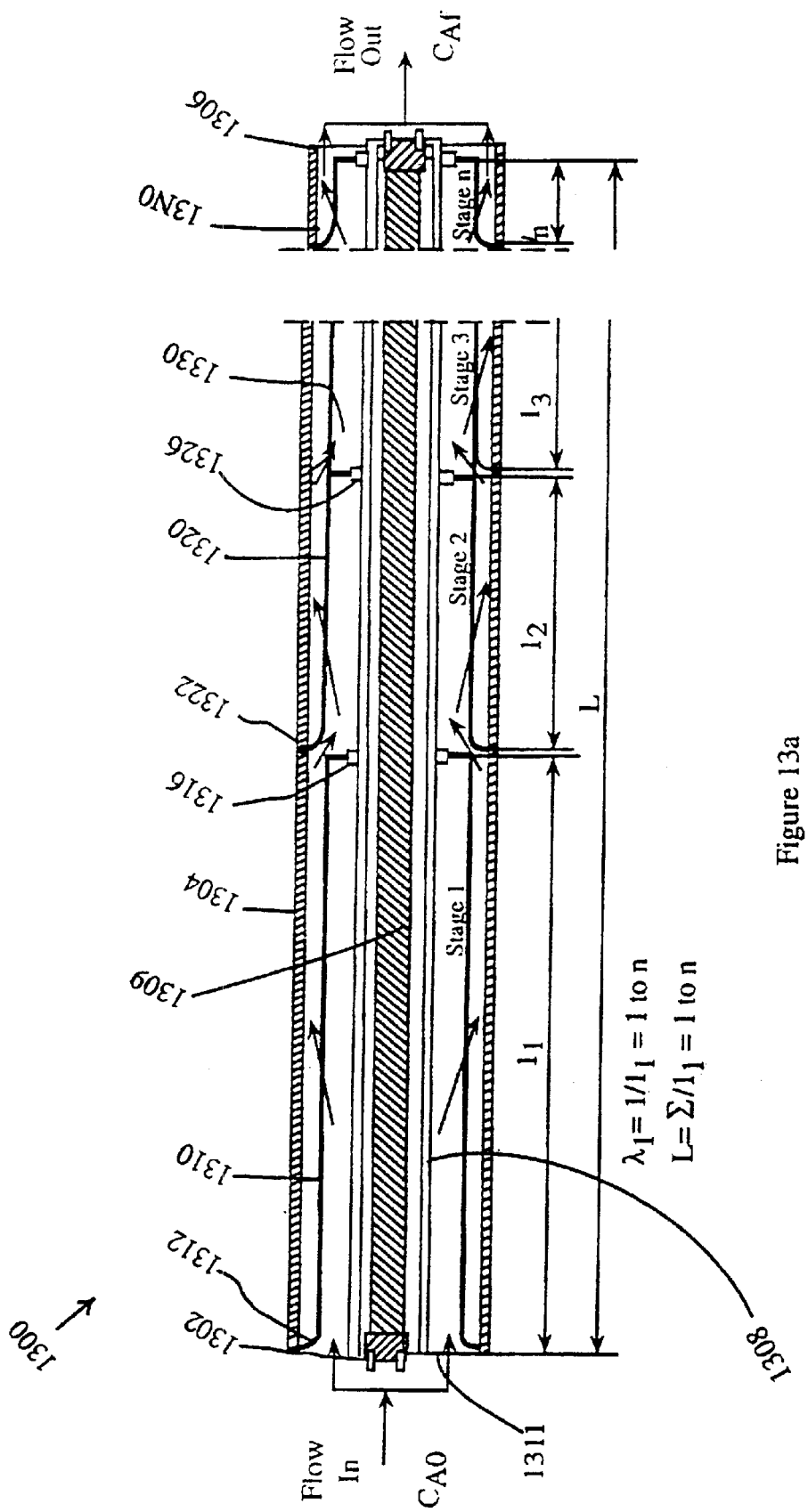
FIG. 13a depicts the schematic diagram of a single-cell multi-stage (of unequal lengths) low-flux catalytic reactor of the subject invention for decoupling calculations.

The underlying principles for designing multistage catalytic media are disclosed with reference to FIG. 13a that depicts a single multistage photo-cell 1300 having unequally partitioned media. In FIG. 13a, a longitudinal impermeable shell 1304 with inlet end 1302 and outlet end 1306 and UV lamp 1309 having protective sleeve 1308 are coaxially mounted. The first catalytic media 1310 inside the shell has one end 1312 connected to the inlet 1302 of the impermeable shell 1304 and an opposite end 1316 connected to the UV lamp sleeve 1308 at distance $l_1$. A second catalytic media 1320 has one end 1322 connected to inside the shell 1304 and an opposite end 1326 connected to the UV lamp sleeve 1308 at distance $l_2$. The third catalytic media 1330 is connected similarly at distance $l_3$ and the $n^{th}$ catalytic media 13n0 is connected at distance $l_n$. The length $l_1$ of the first media is greater than the length $l_2$ of the second media and so forth. Each media segment forms a different stage (i.e. stage 1, stage 2, stage 3, . . . , stage n). Fluid carrying contaminant A flows into inlet end 1311 of the first media 1310 through sides of first media to a space between the media 1310 and the impermeable shell 1304 and then similarly into the other media 1320, 1330, . . . , 13n0, respectively until it exits from the outlet end 1306 of the impermeable shell 1304. Now, with reference to FIG. 13a, rewrite equation (32) in the following form:

$$\ln \delta_f \equiv -(a\phi_0 - r'_{AS})H \equiv -\frac{(a\phi_0 - r'_{AS})}{Q_1 C_{AO}} \quad \text{or} \tag{39}$$

$$Q_1 \equiv -\frac{(a\phi_0 - r'_{AS})}{C_{AO} \ln \delta_f}$$

Again, $Q_1$ refers to the flow rate of contaminant stream through a simple, single stage catalytic media (also termed stocking or cartridge in the case of the low-flux application). For the more general case of a catalytic media having "n" unequal stages, equation (32) takes the following form:

$$\delta_{i+1} \equiv \delta_i \exp\left\{ \frac{-(a\phi_0 - r'_{AS})\lambda_{i+1}}{Q_n C_{A,i}} \right\} \tag{40}$$

Where:

$$\delta_i \equiv \frac{C_{A,i}}{C_{AO}}, \, \delta_{i+1} \equiv \frac{C_{A,i+1}}{C_{AO}}, \, \lambda_{i+1} \equiv \frac{l_{i+1}}{L}, \text{ and } Q_n$$

denotes the contaminant flow rate within a photocell having n unequal stages (as in FIG. 13a). Combining equation (39) and (40), to get $$\delta_{i+1} \equiv \delta_i \exp\left(\frac{\lambda_{i+1} \ln \delta_f}{\psi_n \delta_i}\right) \tag{41}$$

Where $$\psi_n \equiv \frac{Q_n}{Q_1} \tag{42}$$

$\psi_n$ is a monotonic function of n and as n→∞, $\psi_n$→$\psi_\infty$, asymptotically, where $$\psi_\infty \equiv \frac{Q_\infty}{Q_1} \equiv -\frac{\ln \delta_f}{1 - \delta_f} \tag{43}$$

Equation (43) can be readily proved by first considering equation (36) and noting that as n→∞, $\lambda_i$→1/n=ε, thus $$y(\varepsilon) = \frac{\delta_i}{\delta_{i-1}} = \exp\left(\frac{\varepsilon \ln \delta_f}{\psi_\infty \delta_{i-1}}\right)$$

Now, consider the Taylor expansion of the y(ε) in terms of ε as ε→0, and neglecting ε² and all higher order terms, to get $$y(\varepsilon) = \frac{\delta_i}{\delta_{i-1}} \approx 1 + \frac{\varepsilon \ln \delta_f}{\psi_\infty \delta_{i-1}} = \frac{\ln \delta_f}{n \psi_\infty \delta_{i-1}}$$

Then $$\delta_i - \delta_{i-1} = -d\delta = \frac{\ln \delta_f}{n \psi_\infty}$$

But $$\delta_i = \delta_0 - id\delta = 1 - id\delta$$

Likewise, for the no term to get $$\delta_n = \delta_0 - nd\delta 1 - nd\delta$$

But, $\delta_n = \delta_f$, and $$d\delta = -\frac{\ln \delta_f}{n \psi_\infty}$$

Then $$\delta_f = 1 + \frac{\ln \delta_f}{\psi_\infty}$$

Thus $$\psi_\infty = -\frac{\ln \delta_f}{1 - \delta_f}$$

This is equation (43) noted before. In this equation, $\psi_\infty$ is a function of $\delta_f$ only, i.e. at a given $\delta_f$, equation (43) sets the ceiling (upper limit) on the extent of the multi-stage reactor performance. In a way, full decoupling is possible only if the catalytic cartridge contains infinite number of reaction stages. For all other cases for which a finite number of partitions are made, only partial decoupling will be obtained.

It is easy to show that as n→∞, the apparent quantum efficiency of the process always approaches $\phi_0$ (i.e. $\phi_\infty$→$\phi_0$). Combine equation (39) and (43) to get $$Q_\infty = -\frac{Q_1 \ln \delta_f}{1 - \delta_f} = \frac{a \varphi_0}{(1 - \delta_f) C_{AO}}$$

Then $$1 - \delta_f = \frac{a \varphi_0}{Q_\infty C_{AO}}$$

Also, from equation (29)

$$\eta_\infty = \frac{a}{Q_1 C_{AO}}$$

Then $$1 - \delta_f = \phi_0 \eta_\infty$$

Finally, from equation (20), written in terms of $\delta_f$ (instead of $x_m$)

$$\frac{\varphi_\infty}{\varphi_0} = \frac{\left(\frac{d\delta_f}{d\eta_\infty}\right)}{\left(\frac{d\delta_f}{d\eta_\infty}\right)_{as\ \eta\to 0}} = \frac{-\varphi_0}{-\varphi_0} = 1$$

As discussed before, in equation (43), $Q_\infty$ refers to the contaminant flow rate across the catalytic media having an infinite number of stages (or compartments). Also, equation (43) provides the upper limit of performance for a single-cell photocatalytic, thermocatalytic or combined photo- and thermocatalytic reactor.

Now, again, with reference to FIG. 13a, write $$\frac{\delta_i}{\delta_{i-1}} = \exp\left(\frac{\lambda_i \ln \delta_f}{\psi_n \delta_{i-1}}\right); \quad i = 1 \text{ to } n.$$

Subject to following three constraints:

$$\lambda_1 + \lambda_2 + \ldots \lambda_n = 1; \quad \delta_0 = 1; \quad \delta_n = \delta_f$$

Then $$\psi_n \equiv \frac{\ln \delta_f}{\sum_{i=1}^{n} \delta_{i-1} \ln\left(\frac{\delta_i}{\delta_{i-1}}\right)} \quad (44)$$

or $$\psi_n \equiv \frac{\ln \delta_f}{\ln \delta_1 + \sum_{i=2}^{n} \delta_{i-1} \ln\left(\frac{\delta_i}{\delta_{i-1}}\right)}$$

Subject to constraint:

$$\delta_n = \delta_f \quad (45)$$

Here, the objective is to maximize the normalized throughput or $\psi_n \equiv Q_n/Q_1$ subject to the constraint of equation (45). A convenient method for solving an equation such as (44) subject to a restrictive condition such as equation (45) is by Lagrange's method of undetermined multipliers. Thus $$\delta_i = \delta_{i-1} \exp\left(\frac{\delta_{i-1} - \delta_{i-2}}{\delta_{i-1}}\right); \quad i = 2 \text{ to } n \quad (46)$$

Figure 13B:
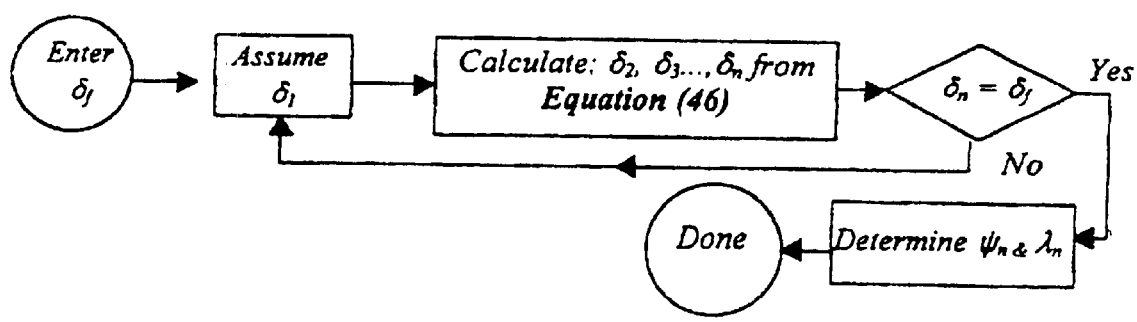

The values of the parameters $\delta_1, \delta_2, \ldots \delta_{n-1}$; $\lambda_1$, $\lambda_2, \ldots, \lambda_n$ and $\psi_n$ are determined by trial-and-error as depicted by the flow chart of FIG. 13b. A computer code in "C" language is given in TABLE II for calculating the optimum (with respect to performance) partitioning ratios for a single photocell catalytic media of the present invention. Again, the procedure just described results in a catalytic media and reactor configuration that is optimal with respect to the DRE of the target species but not pressure drop across the catalytic reactor.

TABLE III depicts the partitioning ratios for the optimum-performance, single-cell, and multi-segmented media having up to 7 partitions (calculated for exit DRE of 99.5%). TABLE IV depicts the extent of performance improvement expected in a range of DREs (varying from 70 to 99.9999%) for optimum-performance multi-stage low- and high-flux media having up to 10 non-equal stages, where n denotes the number of single-cell partitions chosen. In many applications, it is desirable to employ a media and reactor configuration that provides the least amount of pressure drop albeit at somewhat reduced overall system performance.

TABLE II

| | |
|---|---|
| ns=10 | '# of stages/partitions |
| a1guess=0.1 | 'initial estimate of $a_1$ |
| ntrial=100 | '# of iterations to determine $a_1$ |
| j=2.5 | 'exponent for rapid convergence, >2 |
| nt=count(col(1)) | 'enter % DREs in colunm 1 |
| col(2)=1−col(1)/100 | '$\delta_f$ values |

```
for n=1 to nt do
  cell(3,n)=a1guess^j for nn=1 to ntrial do
  cell(ns+2,n)=cell(3,n)
  cell(ns+3,n)=cell(3,n)
  for i=4 to ns+1 do
    cell(i,n)=((cell(3,n))^(1−1/j))*(exp(cell(i−1,n)/(cell(3,n))^(1−1/j))−1)
    cell(ns+2,n)=cell(ns+2,n)+cell(i,n)
  end for
  cell(ns+2,n)=−1n(cell(2,n))*(cell(3,n))^(1−1/j)−cell(ns+2,n)
  for ir=ns+1 to 3 do
    cell(ir,n)=1n(cell(ir+1,n)/(cell(3,n))^(1−1/j)+1))*(cell(3,n))^(1−1/j)
  end for
  cell(2*ns+5,n)=abs(cell(ns+3,n)−cell(3,n))/cell(3,n)*100
  end for
  cell(3,n)=(cell(3,n))^(1/j)
cell(ns+3,n)=cell(3,n)
cell(2*ns+6,n)=cell(3,n)
for i2=4 to ns+2 do
  cell(ns+i2,n)=exp(cell(ns+i2−1,n))−1
  cell(ns+3,n)=if(i2=4,cell(ns+3,n),cell(ns+3,n)+cell(ns+i2−1,n))
  cell(i2,n)=cell(ns+i2,n)/exp(cell(ns+3,n))
  cell(2*ns+6,n)=cell(2*ns+6,n)+cell(i2,n)
end for
cell(2*ns+3,n)=1n(cell(2,n))/cell(2*ns+6,n)
cell(2*ns+4,n)=(1−cell(2,n))/cell(2*ns+6,n)*100
for i3=2*ns+2 to ns+3 do
  cell(i3,n)=cell(i3−ns,n)/cell(2*ns+6,n)*100
end for
cell(2*ns+6,n)=100*cell(2,n)
end for
```

TABLE III

| # of stages, n | $I_1/L$ | $I_2/L$ | $I_3/L$ | $I_4/L$ | $I_5/L$ | $I_6/L$ | $I_7L$ |
|---|---|---|---|---|---|---|---|
| 1 | 1 | | | | | | |
| 2 | 0.6636 | 0.3364 | | | | | |
| 3 | 0.4934 | 0.3291 | 0.1775 | | | | |
| 4 | 0.3962 | 0.2957 | 0.1989 | 0.1092 | | | |
| 5 | 0.3245 | 0.2605 | 0.1978 | 0.1371 | 0.0801 | | |
| 6 | 0.2768 | 0.2316 | 0.1870 | 0.1432 | 0.1007 | 0.0606 | |
| 7 | 0.2413 | 0.2077 | 0.1744 | 0.1415 | 0.1092 | 0.0778 | 0.0480 |

TABLE IV

| # of stages | % Destruction & Removal Efficiency (DRE) | | | | | | | | | | |
|---|---|---|---|---|---|---|---|---|---|---|---|
| n | 99.9999 | 99.999 | 99.99 | 99.9 | 99.5 | 99 | 90 | 85 | 80 | 75 | 70 |
| 1 | 1 | 1 | 1 | 1 | 1 | 1 | 1 | 1 | 1 | 1 | 1 |
| 2 | 4.029 | 3.572 | 3.1 | 2.612 | 2.259 | 2.103 | 1.566 | 1.469 | 1.399 | 1.344 | 1.299 |
| 3 | 6.275 | 5.398 | 4.513 | 3.621 | 2.994 | 2.724 | 1.834 | 1.681 | 1.573 | 1.49 | 1.423 |
| 4 | 7.703 | 6.537 | 5.369 | 4.205 | 3.402 | 3.063 | 2.045 | 1.801 | 1.67 | 1.571 | 1.491 |
| 5 | 8.789 | 7.424 | 6.061 | 4.703 | 3.765 | 3.365 | 2.089 | 1.878 | 1.732 | 1.622 | 1.533 |
| 6 | 9.528 | 8.02 | 6.515 | 5.02 | 3.988 | 3.55 | 2.159 | 1.932 | 1.775 | 1.657 | 1.563 |
| 7 | 10.083 | 8.468 | 6.857 | 5.258 | 4.156 | 3.689 | 2.211 | 1.972 | 1.807 | 1.683 | 1.584 |
| 8 | 10.514 | 8.816 | 7.124 | 5.443 | 4.286 | 3.796 | 2.252 | 2.002 | 1.831 | 1.702 | 1.6 |
| 9 | 10.857 | 9.094 | 7.337 | 5.592 | 4.391 | 3.882 | 2.283 | 2.026 | 1.85 | 1.718 | 1.613 |
| 10 | 11.137 | 9.321 | 7.511 | 5.713 | 4.476 | 3.953 | 2.309 | 2.045 | 1.865 | 1.73 | 1.623 |
| ∞ | 13.816 | 11.513 | 9.211 | 6.915 | 5.325 | 4.652 | 2.558 | 2.232 | 2.012 | 1.848 | 1.72 |

EXAMPLE 15

Figure 14A:
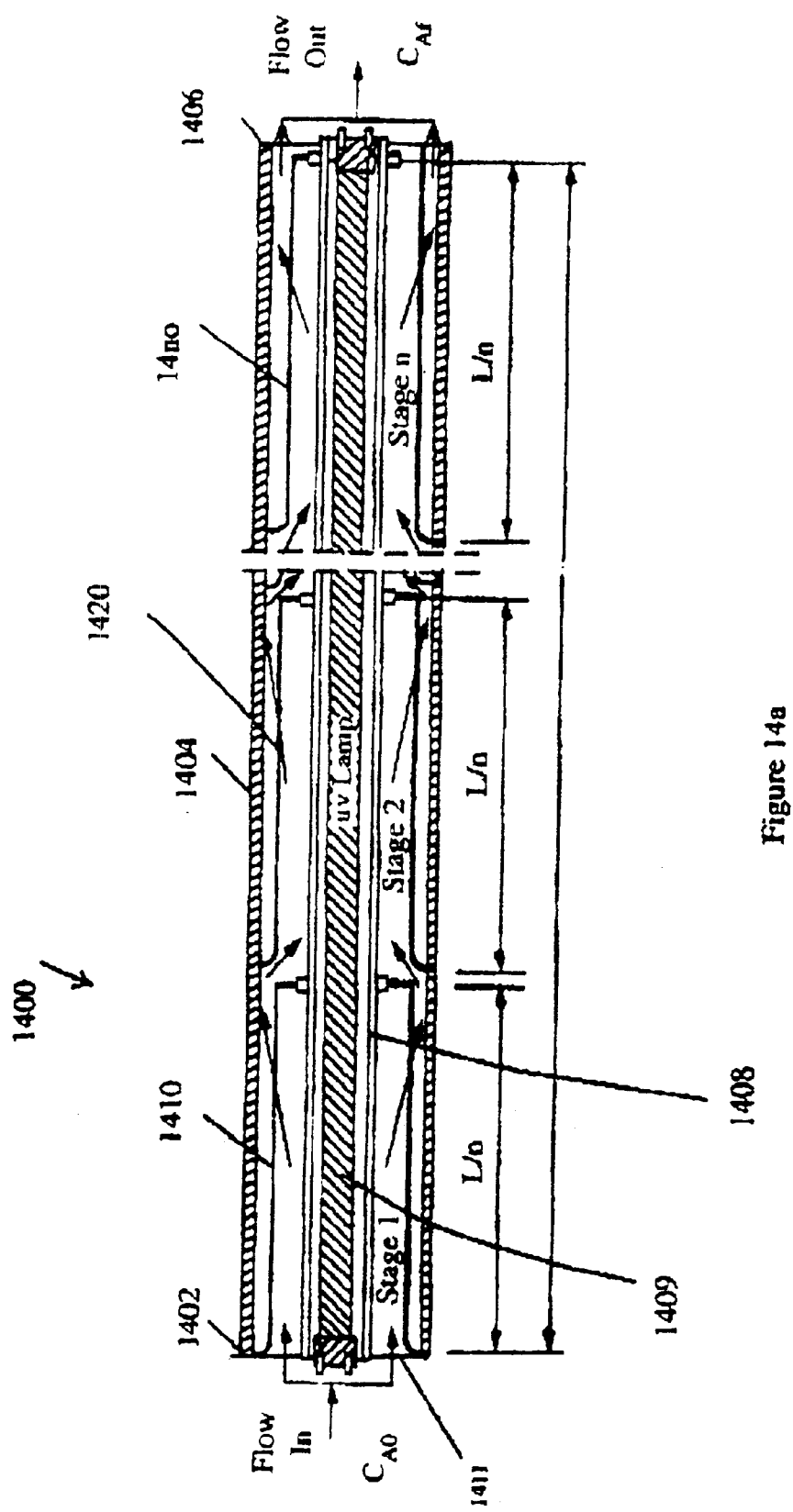
FIG. 14a shows the schematic diagram of a single-cell equipartitioned (all segments of equal length) low-flux catalytic reactor of the subject invention for decoupling calculations.

The analysis presented in EXAMPLE 14 is repeated with the objective of minimizing the overall cell pressure drop instead of maximizing its performance. Again, the Lagrange's method of undetermined multipliers can be employed which results in a uniformly partitioned media configuration. In other words, a single-cell catalytic process having equipartitioned media stages, will have the lowest overall pressure drop than all the like ones but having unequal reaction stages. An analytical technique similar to that described in EXAMPLE 14 for the high-performance media and photoreactor design can be used also to determine the performance ($\psi_n$) of a uniformly partitioned (equipartitioned) photocatalytic reactor as follows:

Consider the equipartitioned catalytic media of the photocell 1400 depicted in FIG. 14*a* that comprises a longitudinal impermeable shell 1404 with inlet end 1402 and outlet end 1406 and a UV lamp 1409 having protective sleeve 1408 coaxially mounted therein. The first catalytic media 1410 inside the shell has one end 1412 connected to the inlet 1402 of the impermeable shell 1404 and an opposite end 1416 connected to the UV lamp sleeve 1408 at distance L/n. A second catalytic media 1420 has one end 1422 connected to inside the shell 1404 and an opposite end 1426 connected to the UV lamp sleeve 1408 at distance L/n, as well. The third catalytic media 1430 is connected similarly at distance L/n as well as the n$^{th}$ catalytic media 14n0, which is also connected at distance L/n. The length of all partitioned media stages are equal to one another. Each media segment forms a different stage (i.e. stage 1, stage 2, stage 3, . . . , stage n). Fluid carrying contaminant A flows into inlet end 1411 of the first media 1410 through sides of first media to a space between the catalytic media 1410 and the impermeable shell 1404 and then in a like manner into the other media, i.e. 1320, 1330 . . . , 13n0, respectively until it exits from the outlet end 1406 of the impermeable shell 1404. Now, with reference to FIG. 14*a*, and noting that: $\lambda_1 = \lambda_2 = \ldots = \lambda_i = \ldots = \lambda_n = 1/n$, write $$\frac{\delta_i}{\delta_{i-1}} = \exp\left(\frac{\ln\delta_f}{n\psi_{n,m}\delta_{i-1}}\right); \quad i = 1 \text{ to } n. \tag{47}$$

Subject to following restrictions:

$$\delta_0 = 1 \text{ and } \delta_n = \delta_f$$

Sum both sides of equation (47) to get $$\psi_n \equiv \frac{\ln\delta_f}{\ln\delta_1 + \sum_{i=2}^{n} \delta_{i-1}\ln\frac{\delta_i}{\delta_{i-1}}}$$

Also $$n\psi_n = \frac{\ln\delta_f}{\ln\delta_1}$$

Then $$\delta_i = \delta_{i-1}\exp\left(\frac{\ln\delta_1}{\delta_{i-1}}\right); \quad i = 2 \text{ to } n. \tag{48}$$

Figure 14B:
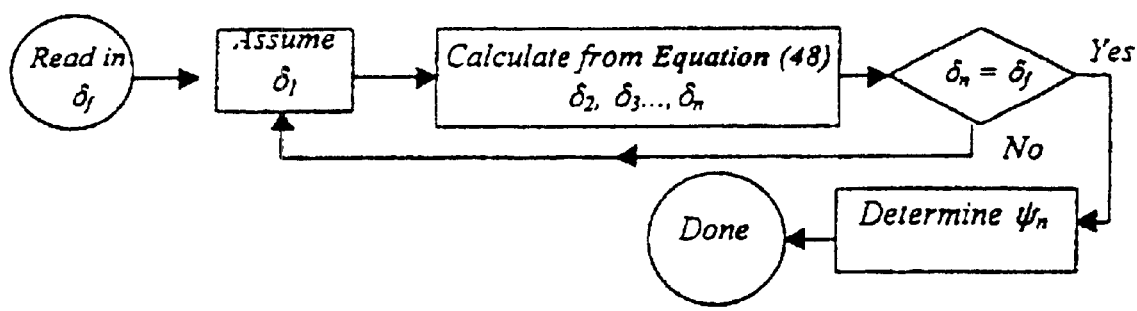
FIG. 14b shows a flow chart for determining performance of single-cell equipartitioned multi-stage catalytic reactors of the subject invention.

The system of algebraic equations above can be solved by trial-and-error according to the flow diagram of FIG. 14*b*. Equation (46) and (48) are the basis of all single-cell, multistage catalytic media design and optimization. TABLE V depicts the expected performance improvement, $\Psi_n$, for n equally segmented single photocell catalytic media (up to 10 equal stages) for a range of exit DREs varying from 70 to 99.9999%. The predicted performance improvement depicted above has been experimentally verified for a number of multistage (n=1 to 4) stockings and a multi-component waste stream containing nitroglycerine and acetone. It should be noted that the values given in TABLES III, IV and V are equally valid for any other combination of target compounds, apparent quantum yield of disappearance at the onset and inlet concentrations as long as no strongly adsorbed surface species are present. When the contaminant stream contains compounds such as plasticizers (e.g. di-n-propyladipate, diethylphathalate) or other similar compounds, the surface adsorption effects must be more rigorously accounted for and do affect results derived above.

TABLE V

| # of stages | % Destruction & Removal Efficiency (DRE) | | | | | | | | | | |
|---|---|---|---|---|---|---|---|---|---|---|---|
| n | 99.9999 | 99.999 | 99.99 | 99.9 | 99.5 | 99 | 90 | 85 | 80 | 75 | 70 |
| 1 | 1 | 1 | 1 | 1 | 1 | 1 | 1 | 1 | 1 | 1 | 1 |
| 2 | 3.713 | 3.325 | 2.92 | 2.496 | 2.183 | 2.043 | 1.551 | 1.458 | 1.392 | 1.339 | 1.296 |
| 3 | 5.691 | 4.951 | 4.196 | 3.424 | 2.872 | 2.631 | 1.814 | 1.668 | 1.564 | 1.484 | 1.419 |
| 4 | 7.033 | 6.042 | 5.04 | 4.026 | 3.309 | 2.998 | 1.967 | 1.788 | 1.662 | 1.565 | 1.487 |
| 5 | 7.985 | 6.813 | 5.633 | 4.444 | 3.609 | 3.25 | 2.067 | 1.865 | 1.724 | 1.617 | 1.53 |
| 6 | 8.693 | 7.385 | 6.071 | 4.752 | 3.829 | 3.432 | 2.139 | 1.92 | 1.768 | 1.652 | 1.559 |
| 7 | 9.24 | 7.827 | 6.409 | 4.989 | 3.997 | 3.572 | 2.192 | 1.96 | 1.8 | 1.678 | 1.581 |
| 8 | 9.675 | 8.178 | 6.678 | 5.176 | 4.129 | 3.681 | 2.233 | 1.991 | 1.824 | 1.698 | 1.597 |
| 9 | 10.031 | 8.465 | 6.897 | 5.328 | 4.237 | 3.77 | 2.265 | 2.016 | 1.844 | 1.714 | 1.61 |
| 10 | 10.326 | 8.703 | 7.079 | 5.455 | 4.326 | 3.844 | 2.292 | 2.036 | 1.86 | 1.727 | 1.621 |
| ∞ | 13.816 | 11.513 | 9.211 | 6.915 | 5.325 | 4.652 | 2.558 | 2.232 | 2.012 | 1.848 | 1.72 |

In a like manner, it can be shown that the results given by equation (46) and (48) will be applicable to the high-flux media and reactor configurations of this invention as well.

EXAMPLE 16

Figure 14C:
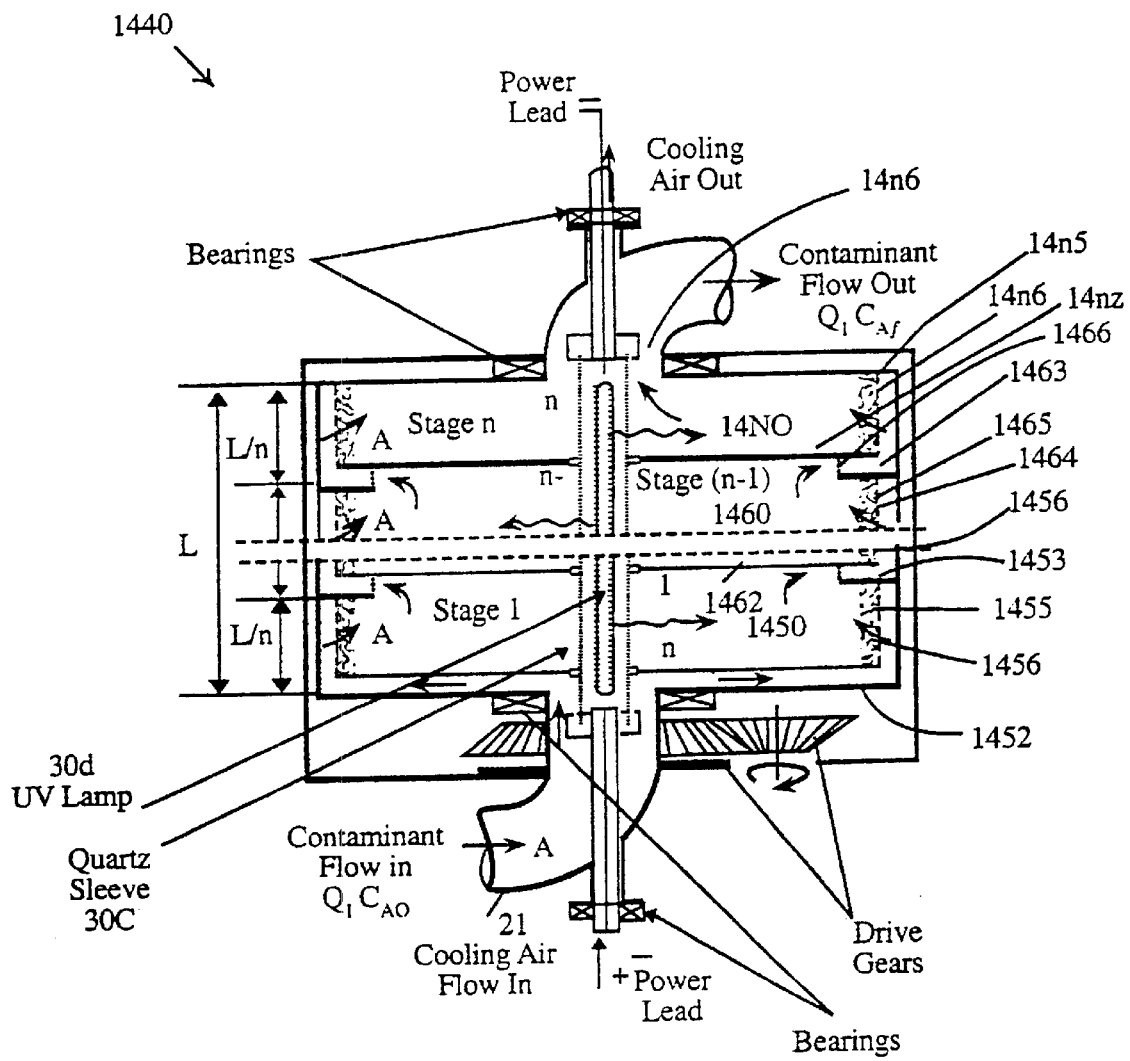
FIG. 14c shows the schematic diagram of a single-cell equipartitioned (all segments of equal length) high-flux centrifugal fluidized bed catalytic reactor of the subject invention for the decoupling calculations.

This EXAMPLE demonstrates the preferred embodiments of the present invention for designing high flux reactors. FIG. 14c depicts the equipartitioned, multistage high-flux media and reactor configuration of this invention that can be analyzed in a manner analogous to the low-flux photosystem of FIG. 14a. FIG. 14c combines the multistage equipartitioned embodiments of FIG. 14a with the high-flux media and reactor configuration of FIG. 9b, where the multistage embodiment is substituted for the single-stage fluidized bed media of FIG. 9b In FIG. 14c, fluid carrying contaminant A flows in the direction of arrow A into the rotating catalytic stages 1, . . . , n−1, n from the dark side of the rotating media 1455. 1565, . . . , 14n5, in a manner described in FIG. 9b before. In FIG. 14c, high-flux multistage rotating fluidized bed reactor 1440 has rotating stages 1450, 1460, . . . , 14n0, where n equals the number of partitions or baskets, all rotating in unison about stationary lamp 30b placed within the quartz sleeve 30c, also rotating in unison with the baskets. Fluid carrying contaminant A flows into the inlet port 21 and passes under the closed end 1452 of the basket 1450 and through the round perforated side 1454 and through high-flux catalytic media 1455 (suspended in place by the combined but opposing action of centrifugal outward acceleration of the media particles and inward acceleration due to aerodynamic drag forces on the media particles) into inner lit space 1450 and out the circumferencial gap opening 1456 near lip 1453. After which the contaminant fluid streams into the second rotating stage/basket 1460 beneath the closed end 1462 through perforated side 1464 through catalytic media 1465 into the inner lit space 1460 and out of the circumferencial gap opening 1466 next to lip 1463. Final contaminant flow streams through basket stage 14n0, in a like manner, having similar components 14n2, 14n4, 14n5, and out the exit port 14n6.

The multistage catalytic media and reactor design equations described in EXAMPLE 14 and 15 give the reactor performance in terms of a normalized throughput (with respect to that of a simple, single-stage catalytic media/reactor). The analytical results derived above and given in TABLE V for an equipartitioned single-cell photoreactor having "n" identical catalytic media or reaction stages are also applicable to a photosystem comprised of "n" identical series photocells. Results of TABLE V imply that a system of n series photoreactors or a single photoreactor having n segmented stages shall perform progressively better as the number of units in series or stages within a photocell, n, is increased. It is also clear from the discussion above that an optimized photocell and media of this invention will deliver slightly higher DRE than a comparable one with the same number of equal stages (compare results of TABLE IV and V).

It can be appreciated that depending on the number of reaction stages chosen (i.e. "n"), in certain applications, it may be better to accept a slightly lower performance by segmenting the catalytic media into equal length partitions than design for optimum performance. This is so because the multistage cell pressure drop increases quickly as the number of reaction stages, n, is increased. For the low-flux catalytic media (stocking) of the present work, the skin pressure drop can be calculated from Darcy's law for flow through porous media (i.e. $\Delta P_i = k u_i$) as follows:

$$\frac{\Delta P_n}{\Delta P_1} = \psi_n \sum_{i=1}^{n} \frac{1}{\lambda_i} \tag{49}$$

Figure 15:
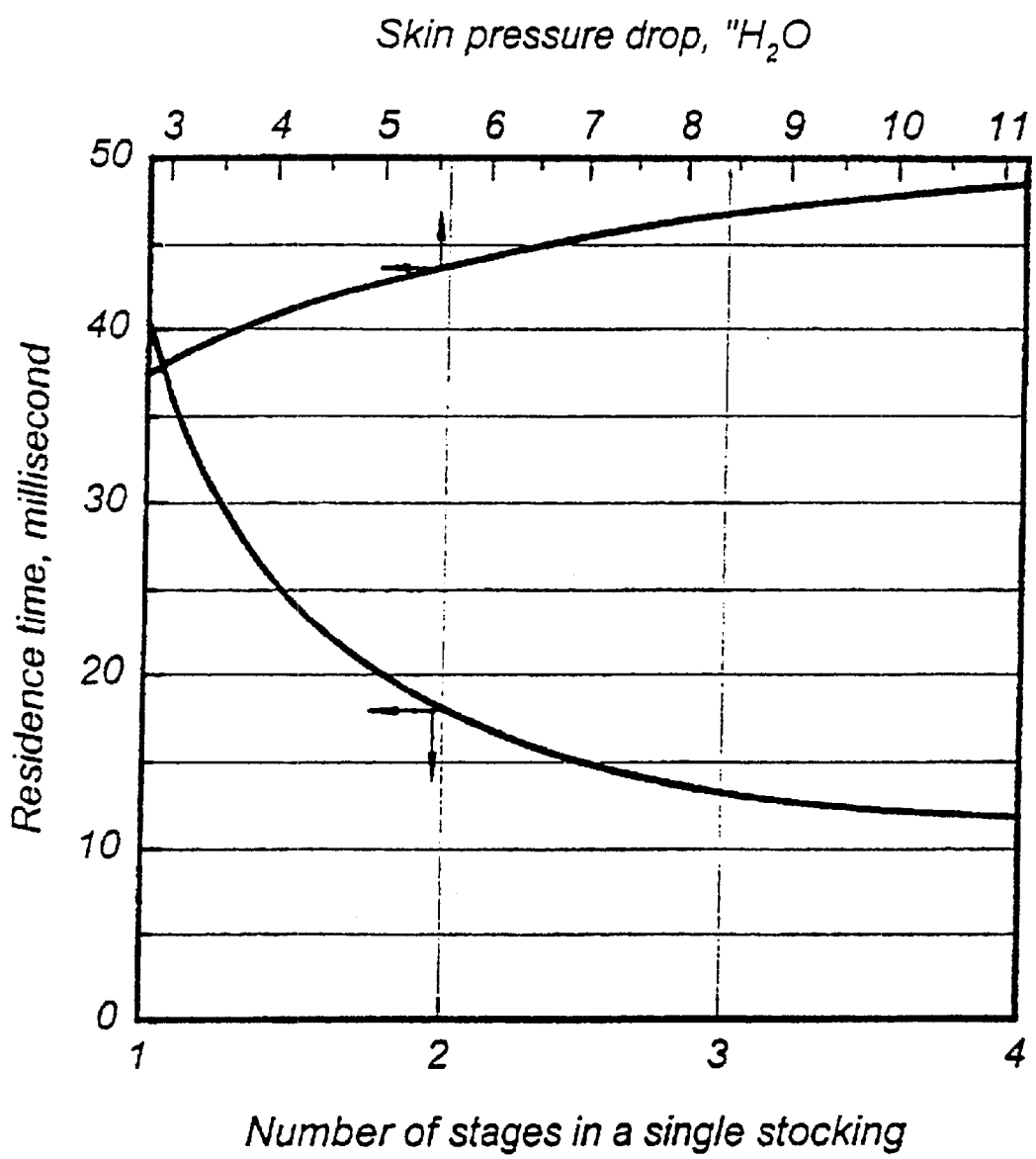
FIG. 15 depicts the performance of a single-cell multi-stage equipartitioned (all segments of equal length) catalytic media; Voltarc$^R$ Model T64T6-VH low-pressure mercury lamp, 60 inches long and 65 W nominal power, flannel cotton fabric as the base material with permeability of 0.075"H$_2$O/cps (typical), inlet nitroglycerin (NG) concentration of 10 ppmv, required NG destruction and removal efficiency (DRE) of 99.5%.

In this equation $\psi_n$ is given by equation (42) and $\lambda_i = l_i/L$, as before. The permeability factor, k, is primarily a function of the type of fabric material or media used, weight and weave density, as well as the catalyst type and loading density applied. For a typical low-flux media of the present invention such as super flannel fabric coated with Kemira, UNITI-908 $TiO_2$ at a loading density of about 10% by weight of the fabric, k=0.075"$H_2O$/(cm/s), approximately. FIG. 15 depicts the trade-off between performance (i.e. high DREs due to large number of media stages, n, chosen) and the corresponding cell skin pressure drop.

Figure 16:
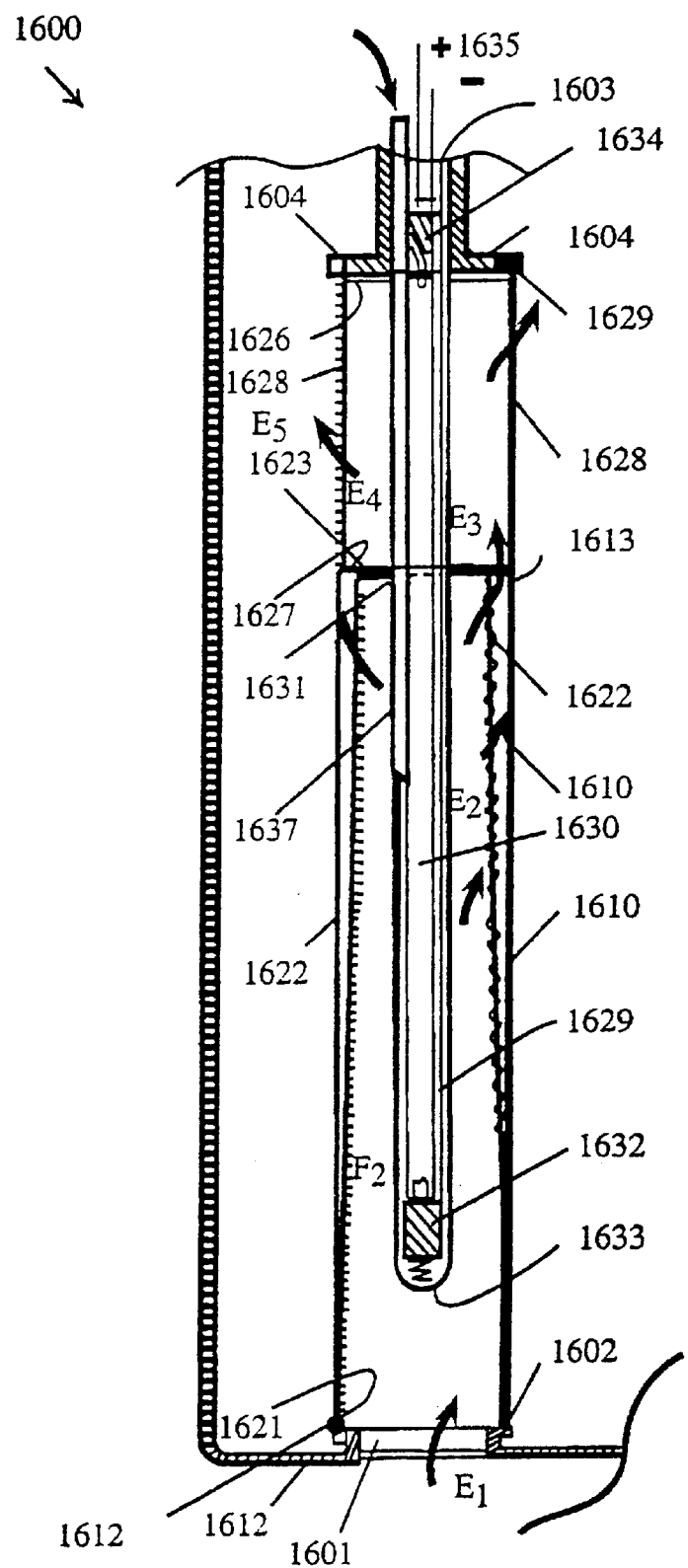
FIG. 16 depicts one embodiment of a low-flux, double-stage photocatalytic stocking of the present invention.

FIG. 16 depicts the low-flux design of the double-stage catalytic stocking 1600. The double-stage stocking consists of two segments partitioned at approximately 66 and 34% of the total photocell length. This is critical for achieving optimum conversion at a designated DRE of 99.5%. Different partitioning proportions must be used if the target DRE differs from the value above. The new partitioning ratios can be derived using the computer program given in TABLE III.

Referring to FIG. 16, double-stage stocking embodiment 1600 includes inlet flange 1602 having an interior opening. A hollow impermeable wall shell 1610 (fabricated from any suitable material such as DuPont's TYVEK[R] for flexible media or hard metallic tube if rigid shell design) has one end 1612 tie wrap connected to the opening in inlet flange 1602 and a second end 1613 connected to one end 1627 of a last stage catalytic media 1628 (prepared as previously described). Opposite end 1626 of last stage catalytic media is tie wrapped to a perimeter edge of an exit flange 1604. Along central axis of shell 1610 is a UV lamp 1630 placed within a quartz or fused silica sleeve 1629. One of the lamp ends 1632 lies adjacent to the close end 1633 of the quartz sleeve 1629 which is adjacent an opening 1601 in inlet flange 1602. The opposite end 1634 of the lamp 1630 connects to power supply leads 1635 that make the connection via the open end 1603 of the quartz sleeve 1629. The open end 1603 of the quartz sleeve 1629 is held in place within the opening of exit flange 1604 through which the quartz cooling dip tube 1637 services the UV lamp 1630 within the quartz sleeve 1629.

A first stage permeable catalytic media 1622 has an inlet end 1621 tie wrapped 1612 around passageway opening 1601 of inlet flange 1602, and a second end 1623 tied to a first mid-portion 1631 of quartz sleeve 1629.

A last stage permeable media 1628 has an inlet end 1624 connected to the exit/second rim 1613 of shell 1610, and a second end 1626 tie wrapped to a perimeter edge of an exit flange 1604.

Referring to FIG. 16, contaminated stream A flows into inlet opening 1601 of inlet flange 1602 in the direction of arrow E1, and flows over quartz sleeve closed end 1633 and through side walls of first stage permeable media 1622 in the direction of arrow E2 to the airspace between first media 1622 and interior walls of impermeable shell 1610. Stream A then flows in the direction of arrow E4 through the side walls of last stage permeable media 1628 and out of the double-stage photocell of the subject invention in the direction of arrow E5.

EXAMPLE 17

This Example demonstrates the application of a two-stage photocatalytic stocking (DSPCS). A DSPCS was fabricated and tested using the photoreactor of EXAMPLE 7. Again, the reagent solution used contained 5% by weight nitroglycerin in acetone as in EXAMPLE 13. The carrier gas was air heated to approximately 95° C. and flowing at 15.5 SCFM (approximately 20.2 ACFM) through the mixing chamber 158 (FIG. 11b) and then into photocatalytic reactor 110 (FIG. 11b) of EXAMPLE 7. Concentration of NG in the gas-phase was approximately 9.6 ppmv. Again, the stocking was cotton flannel having an OD of about 3.8 inches. The stocking had 2 stages with proportions for stage 1, and 2 being approximately 67, and 33 percent of the total stocking length, respectively. The nitroglycerin DRE was determined at about 98.3% (99.99% at the exit). The average nitroglycerin residence time was calculated to be about 36 ms.

Figure 17:
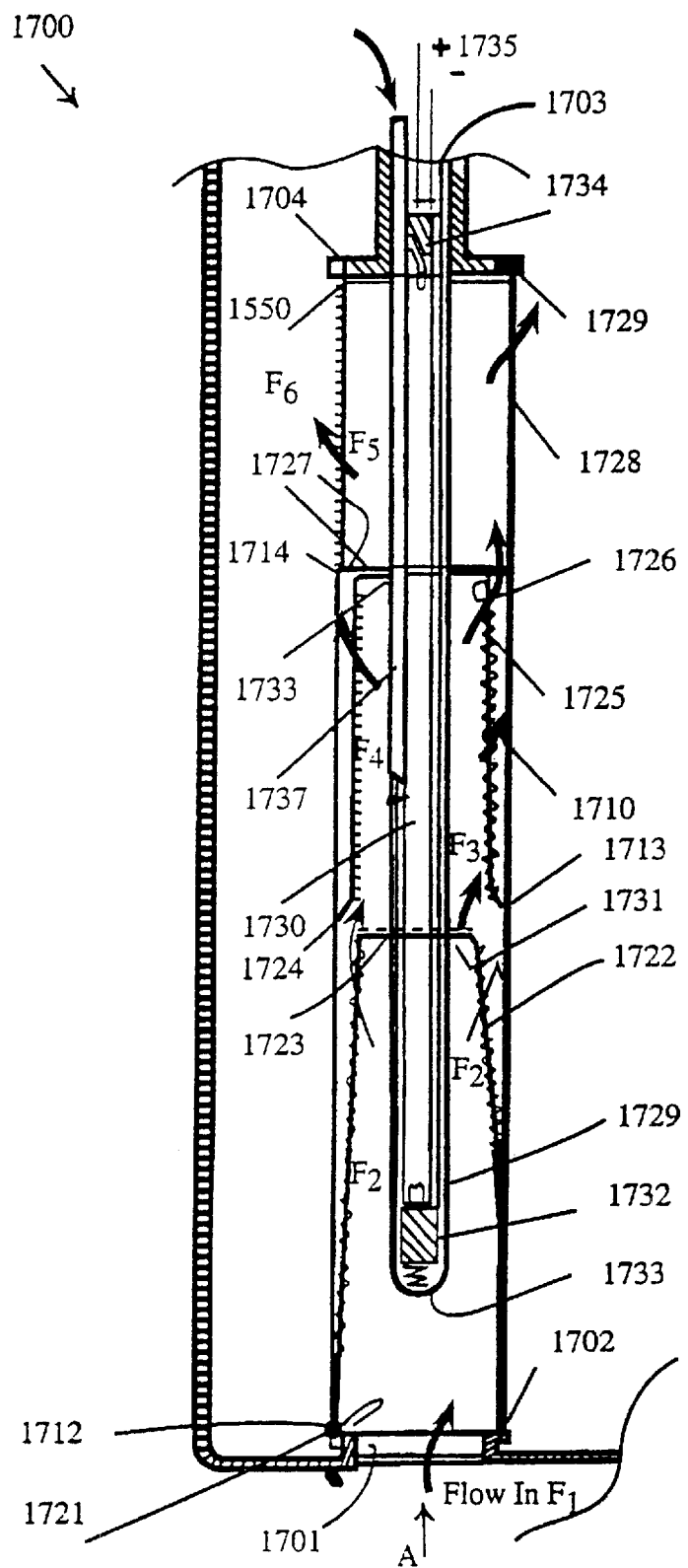
FIG. 17 shows one embodiment of a low-flux, triple-stage photocatalytic stocking of the present invention.

FIG. 17 depicts the low-flux design of the triple-stage catalytic stocking 1700. The 3-stage stocking consists of three segments partitioned at approximately 49, 33 and 18% of the total photocell length. This is critical for achieving optimum conversion at a designated DRE of 99.5%. Different partitioning proportions must be used if the target DRE differs from the value above. The new partitioning ratios can be derived using the computer program given in TABLE III.

Referring to FIG. 17, triple stage stocking embodiment 1700 includes inlet flange 1702 having an interior opening. A hollow impermeable wall shell 1710 (made from any suitable material such as DuPont's TYVEK if flexible design or hard metallic shell, e.g. aluminum or steel, if rigid design) has one end 1712 tie wrap connected to the opening in inlet flange 1702 and a second end 1714 connected to one end 1727 of a last stage catalytic media 1728 (prepared as previously described). Opposite end of the last stage catalytic media is tie wrapped to a perimeter edge of an exit flange 1704. Along central axis of shell 1710 is a UV lamp 1730 placed within a quartz or fused silica sleeve 1729. One of the lamp ends 1732 lies adjacent to the close end 1733 of the quartz sleeve 1729 which is adjacent an opening 1701 in inlet flange 1702. The opposite end 1734 of the lamp 1730 connects to power supply leads 1735 that make the connection via the open end 1703 of the quartz sleeve 1729. The open end 1703 of the quartz sleeve 1729 is held in place within the opening of exit flange 1704 through which the quartz cooling dip tube 1737 services the UV lamp 1730 within the quartz sleeve 1729.

A first stage permeable catalytic media 1722 has an inlet end 1721 tie wrapped 1712 around passageway opening 1701 of inlet flange 1702, and a second end 1723 tied to a first mid-portion 1731 of quartz sleeve 1729.

A second stage permeable media 1725 has an inlet end 1724 connected to an interior mid-wall portion 1713 of shell 1710, and a second end 1726 tie wrapped to a second mid-portion 1733 along the quartz sleeve 1729.

A last stage permeable media 1728 has an inlet end 1727 connected to the exit/second rim 1714 of shell 1710, and a second end 1750 tie wrapped to a perimeter edge of an exit flange 1704.

Referring to FIG. 17, contaminated stream A flows into inlet opening 1701 of inlet flange 1702 in the direction of arrow F1, and flows over quartz sleeve closed end 1733 and through side walls of first stage permeable media 1722 in the direction of arrow F2 to the airspace between first media 1722 and interior walls of impermeable shell 1710. Stream A flows in the direction of arrow F3 into inlet end 1713 of second stage.permeable media 1725 and in the direction of arrow F4 through second stage media side walls 1725 and to the airspace between the second media 1725 and interior walls of impermeable shell 1710. Stream A then flows in the direction of arrow F5 through the side walls of last stage permeable media 1728 and out of the 3-stage photocell of the subject invention in the direction of arrow F6.

EXAMPLE 18

This EXAMPLE relates to test results for a three-stage photocatalytic stocking (TSPCS). The experimental conditions and procedure for this test were essentially identical to that described in EXAMPLES 13 and 17 except that air was heated to about 90° C. and metered at 29.95 SCFM (38.2 ACFM) through the mixing chamber 158 (FIG. 11b) and into the photoreactor 110 (FIG. 11b) of EXAMPLE 7. Concentration of nitroglycerin in the gas-phase was 9.3 ppmv. The material of the stocking was cotton flannel (see EXAMPLE 13 & 17), having an OD of 3.75 inches. The stocking had 3 stages. The active length of stage 1, 2 and 3 were approximately 49, 33, and 18 percent of the total TSPCS length, respectively. Total volume of NG/acetone solution injected was approximately 160.1 ml. Total experiment run time was 81 minutes. The NG DREs varied between 75% and 87% (corresponding to exit DRE of 88% and 100%, respectively). The average NG residence time was calculated to be approximately 15 ms.

EXAMPLE 19

This EXAMPLE demonstrates the application of a 4-stage (equipartitioned) photocatalytic stocking (QSPCS). All experimental conditions and procedure for this case were essentially same as EXAMPLE 18 except that air was heated to about 95° C. and flowing at 40 SCFM (approximately 52

ACFM) through the mixing chamber 158 (FIG. 11b) and into the photoreactor 110 (FIG. 11b) of EXAMPLE 7. Concentration of NG in the gas-phase was about 9.55 ppmv. The material of the stocking was same as the EXAMPLES 13, 17 and 18 but having an OD of approximately 3.75 inches. Average UV light intensity on the inner surface of the QSPCS (at mid length) was measured (using ILC radiometer) to be about 2.06 mW/cm$^2$ (for $\lambda$=254 nm). NG DREs varied between 68.4% and 81.5% (corresponding to exit DRE of 77% and 90%, respectively). Total NG residence time within the QSPCS was calculated to be approximately 10.8 ms.

Figure 18:
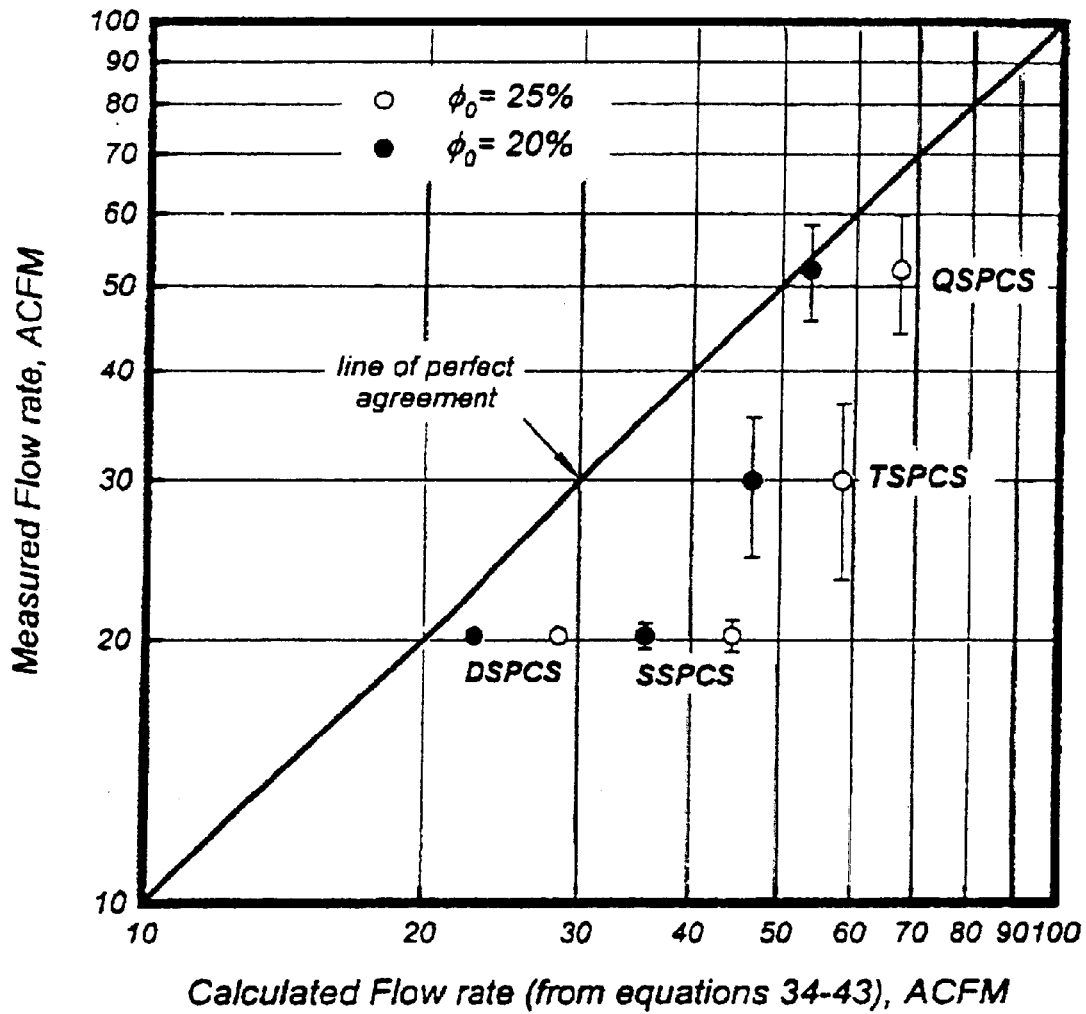
FIG. 18 depicts experimental vs. predicted performance for low-flux, multi-stage photocatalytic reactors of the present invention.

The predicted values (from equations 39–48) for $Q_n$ are plotted against the experimental values (from data of EXAMPLES 13, and 16 to 18) in FIG. 18. It can be seen that a good agreement is obtained between the predicted and measured values of $Q_n$. In general, the agreement between the predicted values and experimental data improves as the number of reaction stages is increased. There is also a large uncertainty associated with some of data as evident by the size of the error bars on the graph. Now, decoupling at module-level will be disclosed.

The benefits accrued from partitioning the catalytic stockings can be also realized by series arrangement of the single-cell reactors each containing a single-stage photocatalytic stocking. Therefore, the overall performance of a catalytic system comprised of many single-cell units will increase substantially by arranging all the unit cells in the system in series with each other. Again, the penalty to be paid for series arrangement of the photocells is the increased pressure drop through the unit. It is now understood that an increased photocatalytic system performance (i.e. higher target DREs) can result from either or combination of the following three design approaches:

1—Single-cell implementation of the multistage catalytic media

2—Module-level arrangement of the single-cell reactors, in series with each other.

3—Unit-level arrangement of the individual sub-units or modules in series, together.

Clearly, as far as the unit-level design is concerned, the unit cells or single photocells of the photosystem can be arranged in a number of different ways. For example, it is possible to arrange all of the photocells in parallel. In this way, the incoming flow divides equally amongst all individual single-cell photoreactors (ie. photocells or unit cells). Alternatively, the unit cells can be divided into smaller groups or banks that are plumbed to one another in series to form a cluster of parallel branches each containing two or more unit cells, in series. It should be clear from discussions above that the process DRE is a function of both $\phi_0$ of the target contaminant and the manner in which the individual photoreactors (photocells or sub-units) and catalytic media within each photoreactor has been configured.

Now, the criteria for the design and engineering of complex photosystems that combine the module-level decoupling with the single cell-level (media-level) partitioning to achieve optimum photosystem performance are disclosed.

EXAMPLE 20

Figure 19A:
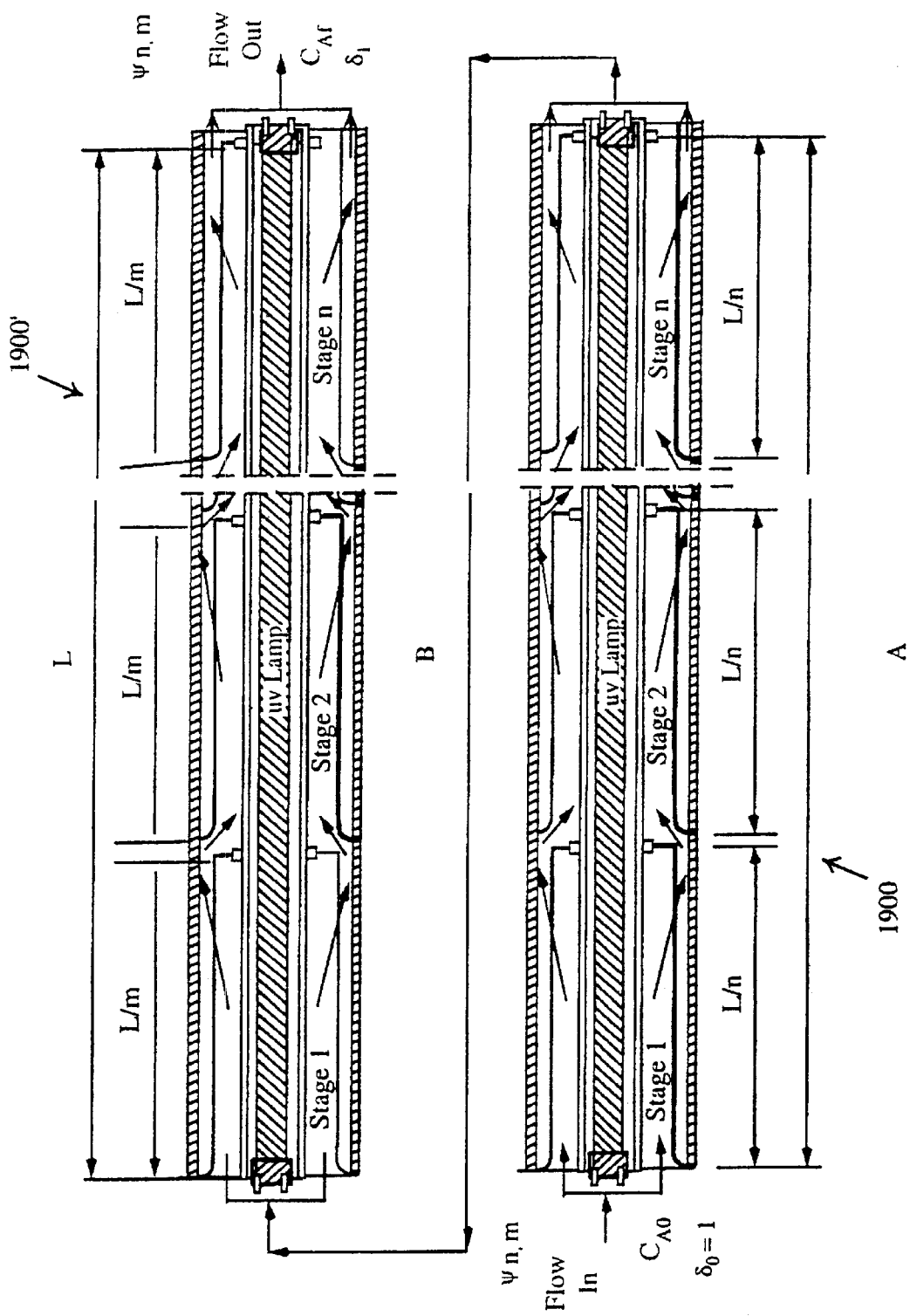
FIG. 19a depicts the schematic diagram of two multi-stage equipartitioned (all segments of equal length) low-flux series catalytic reactors of the subject invention for decoupling calculations.

This EXAMPLE describes the preferred embodiments of the present invention in the context of designing a double-bank, equipartitioned multistage series reactors. FIG. 19a depicts the configuration of one preferred embodiment of the present invention that has been reduced to practice as a full-scale photocatalytic pollution control unit (PPCU). FIG. 19a combines two equipartitioned multistage embodiments 1900 (Bank A) and 1900' (Bank B) in series. Depending on the volume of the flow to be treated by the process, concentration of the target species and ultimate DRE desired, Bank A and B may comprise one or several like photocells connected in parallel to each other. Also, Bank A 1900 can have n stages (at media-level) while Bank B has m stages (at media-level), where n can be less than, equal to or greater than m, as later described in reference to FIG. 20. Now, with reference to FIG. 19a, for two equiparititioned multistage series photoreactors, for the upstream photocell or Bank A (ie. 1900) having "n" equal stages, write $$\delta_i = \delta_{i-1} \exp\left(\frac{\ln\delta_f}{n\psi_{n,m}\delta_{i-1}}\right); \quad i = 1 \text{ to } n.$$

For the downstream photoreactor (Bank B 1900') having a media with "m" equal stages, write $$\delta_i = \delta_{i-1} \exp\left(\frac{\ln\delta_f}{n\psi_{n,m}\delta_{i-1}}\right); \quad i = n+1 \text{ to } n+m.$$

Subject to constraints:

$$\delta_0=1; \delta_n=\delta_0 \text{ and } \delta_{n,m}=\delta_f.$$

Then $$\ln\delta_1 = \frac{\ln\delta_f}{n\psi_{n,m}} \qquad (50)$$

or $$\eta_{n,m} = -\frac{\ln\delta_f}{\psi_{n,m}} = -n\ln\delta_1$$

and $$\begin{cases} \delta_i = \delta_{i-1}\exp\left(\frac{\ln\delta_1}{\delta_{i-1}}\right); & i = 2 \text{ to } n. \\ \delta_j = \delta_{j-1}\exp\left(\frac{n\ln\delta_1}{m\delta_{j-1}}\right); & j = n+1 \text{ to } n+m. \end{cases}$$

Figure 19B:
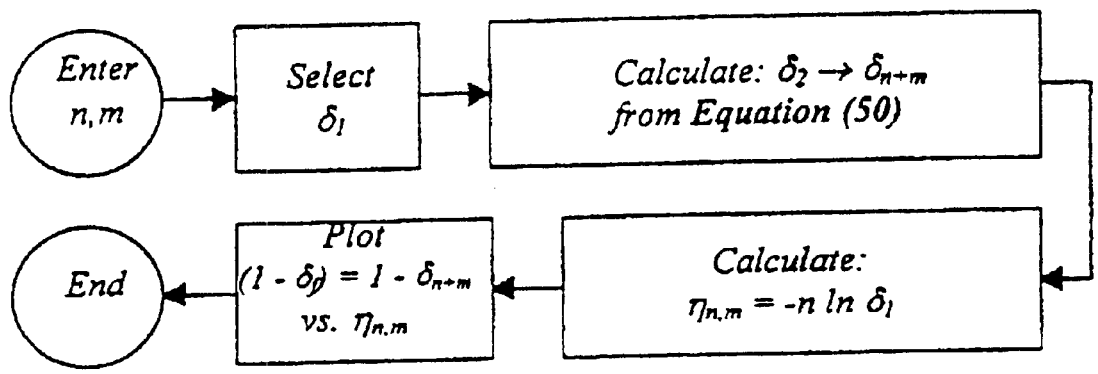
FIG. 19b shows a flow chart for determining performance of single-cell equipartitioned multi-stage catalytic reactors of the subject invention.

The system of algebraic equations above can be solved iteratively according to the flow chart shown in FIG. 19b.

Figure 19C:
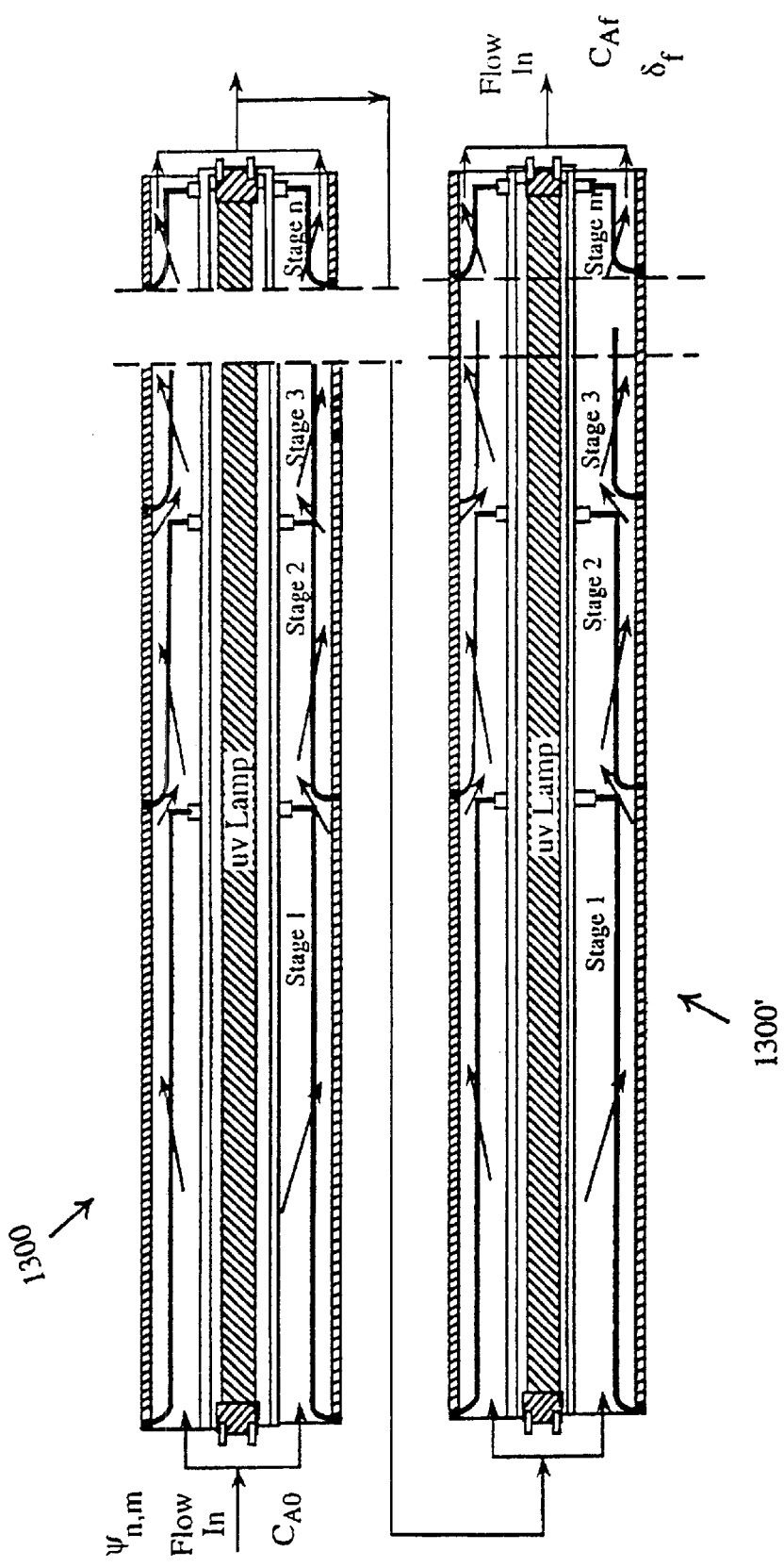
FIG. 19c depicts the schematic diagram of two multi-stage (of unequal lengths) low-flux series catalytic reactors of the subject invention for decoupling calculations.

In a like manner, FIG. 19c depicts the configuration of yet another embodiment of the present invention. FIG. 19c combines two multistage embodiments 1300 (Bank A) and 1300' (Bank B) in series. Again, Bank A and B may comprise one or several like photocells connected in parallel to each other. Also, Bank A 1300 can have n unequally divided stages (at media-level) while Bank B has m unequally divided stages (at media-level), where n can be less than, equal or greater than m, as discussed below.

The most desirable configuration for a given application depends on the exit DRE required, maximum pressure drop allowed, economic, and other considerations. Furthermore, the number of partitions at the cell or media levels as well as the level of partitioning chosen within each bank greatly affects the photosystem performance. The optimization calculations have been carried out for a number of configurations involving different combination of the partitioning numbers n and m for photosystems of FIG. 19a and 19c, with NG as the primary target contaminant at the inlet concentration of 10 ppmv. Typical results are given in FIG. 20. It can be seen that combining parallel and series interconnects results in a substantial process efficiency improvement. Results of FIG. 20 indicate that the photosystem efficiency is higher when the number of partitioned media in the downstream bank in the module is larger than that in the upstream bank of the series. In other words, if nm denotes n stage media implementation at the upstream bank of the module and m stage media implementation at the downstream bank in the module, then nm arrangement will give considerably higher photosystem performance than nm arrangement, where n<m. It is interesting to note that even though nm arrangement gives higher photosystem performance than nm arrangement (when n<m), both configurations will result in exactly the same pressure drop across the unit.

It can be appreciated that a large number of combinations incorporating the decoupling concept at the media-, module- and unit-levels are possible and not all can be mentioned and discussed here. Nonetheless, the methodologies developed in previous sections and described in many EXAMPLES given above are sufficient to allow exact calculation of the results and benefits derived from any other arrangement not covered in this disclosure.

EXAMPLE 21

Figure 21A:
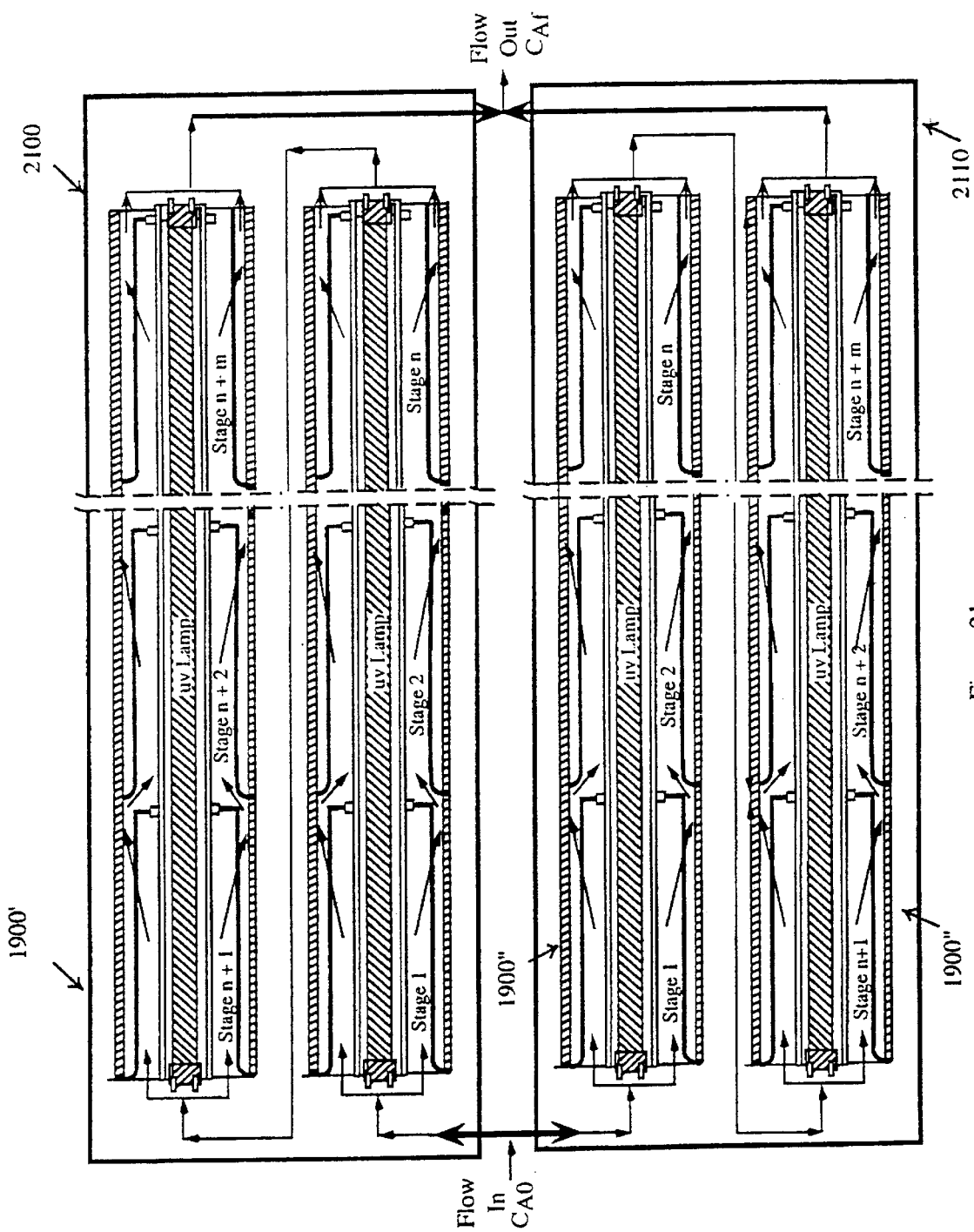
FIG. 21a depicts the schematic diagram of a two-by-two series-parallel multi-stage equipartitioned (all segments of equal length) low-flux catalytic reactor of the subject invention for decoupling calculations.
Figure 21B:
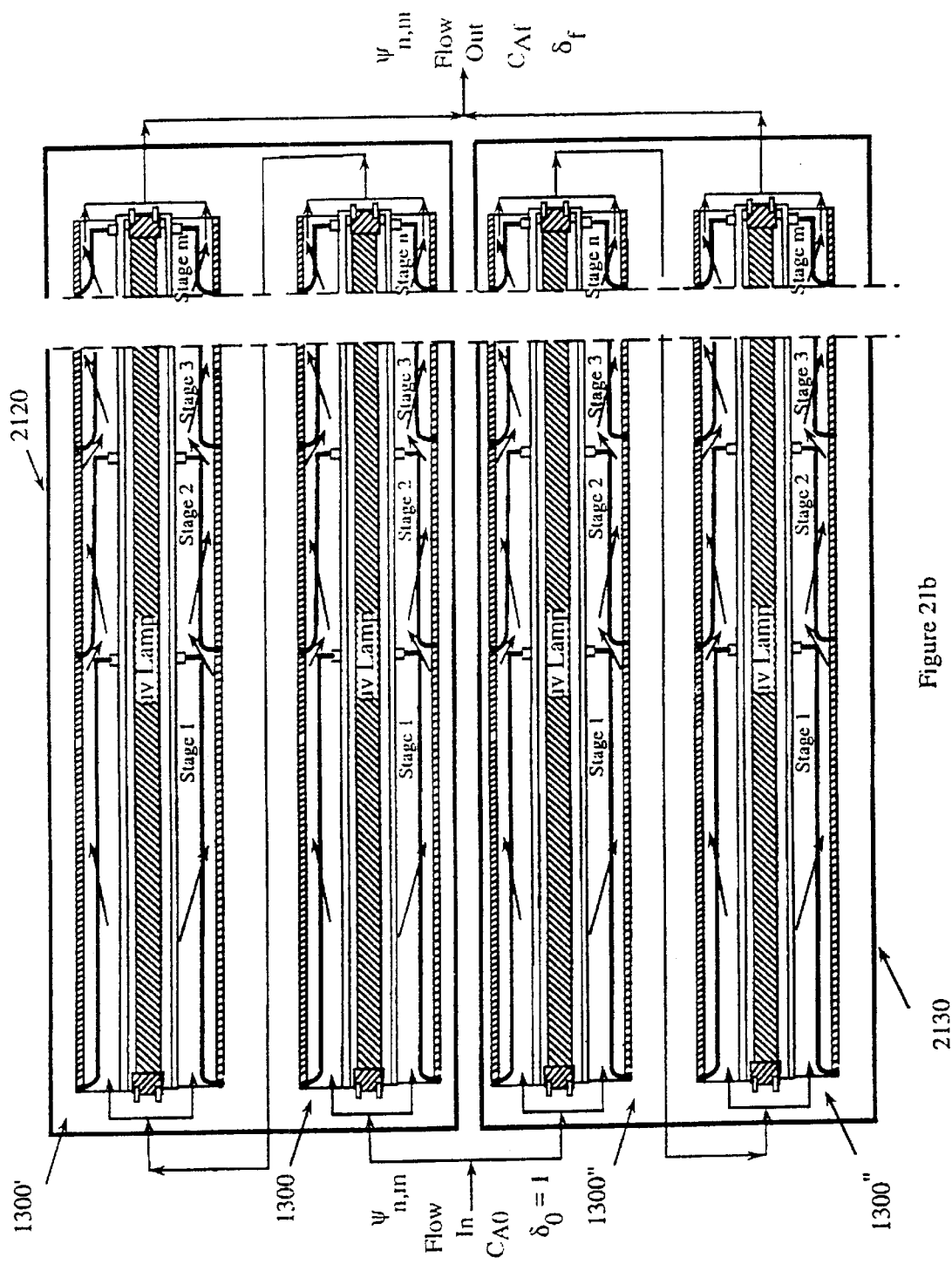
FIG. 21b depicts the schematic diagram of a two-by-two series-parallel multi-stage (of unequal lengths) low-flux catalytic reactors of the subject invention for decoupling calculations.

This EXAMPLE describes a full-scale system design based on the concepts disclosed here that is reduced into practice by the subject inventor. This EXAMPLE demonstrates the application of a partially decoupled photocatalytic pollution control unit (PPCU) based on a multistage design implemented at all component levels, ie. at media-, module- and unit-levels. With reference to FIGS. 21a and 21b, the full-scale low-flux PPCU consists of two sub-units or modules 2100 and 2110 (FIG. 21a) or 2120 and 2130 (FIG. 21b), plumbed together, in parallel to each other. FIG. 21a shows a two-by-two series-parallel arrangement of equipartitioned multistage media (stockings) implementation. In FIG. 21a, fluid containing contaminant splits between two identical sub-units or modules 2100 and 2110. Each sub-unit or module consists of 32 photocells clustered together (not shown in FIG. 21a) in two banks of 16 photocells each. Thus, each module has two banks and wherein each branch comprised of two photocells in series (1900 and 1900' in module 2100 and 1900" and 1900'" in module 2110). In other words, PPCU is arranged so that each of the two parallel modules has two banks of 16 branched photocells each or 16 parallel branches (not shown in FIG. 21a). In this arrangement, the incoming flow into each sub-unit or module splits into parallel streams (branches) and passes through 16 photocells of the first bank (1900 and 1900") before entering the second bank of 16 parallel photocells (1900' and 1900'"). FIG. 21b depicts a configuration similar to FIG. 21a except that the partitioning at the cell-level comprises unequal multistage media segmentation. In principle, it is possible to have multistage, cell-level segmentation of both equal and unequal type in one unit or a module. In practice, other considerations (e.g. cost, inventory, maintenance and service of the unit, etc.) are likely to limit the type and number of cell-level, module-level and unit-level multi-staging and rearrangements. FIG. 21a, with double or triple equipartitioned multistage stockings presents the most likely and practical PPCU configuration that can be implemented. It is important to note that the PPCU of FIG. 21a and 21b was designed and intended to use multistage stockings. The PPCU light chamber was intended to be simple design and thus no inlet manifold (flow distributor) was envisioned to be required. This is justified because the use of multi-stage stockings with the unit mitigates the effect of flow non-uniformity normally present with the use of single-stage stockings.

EXAMPLE 22

This EXAMPLE demonstrates the preferred embodiments of the present invention for designing high-flux photocatalytic, thermocatalytic or combined photo- and thermocatalytic reactors and media. The general layout of the multistage high-flux catalytic media and reactor configuration of the present invention at the single-cell level has already been described in FIG. 9b. Just as the low-flux system benefits from the module-level and unit-level decoupling, the high-flux system can also realize considerable performance boost by the series arrangement of the single-cell reactors. In other words, the overall performance of a high-flux catalytic system comprised of many single-cell units will increase substantially by arranging all the unit cells in the system in series with each other. Again, the penalty to be paid for series arrangement of the photocells is the increased pressure drop through the unit. In short, increased high-flux system performance can accrue from decoupling at the cell or media-level, module or bank-level and unit-level implementation and optimization.

Figure 22:
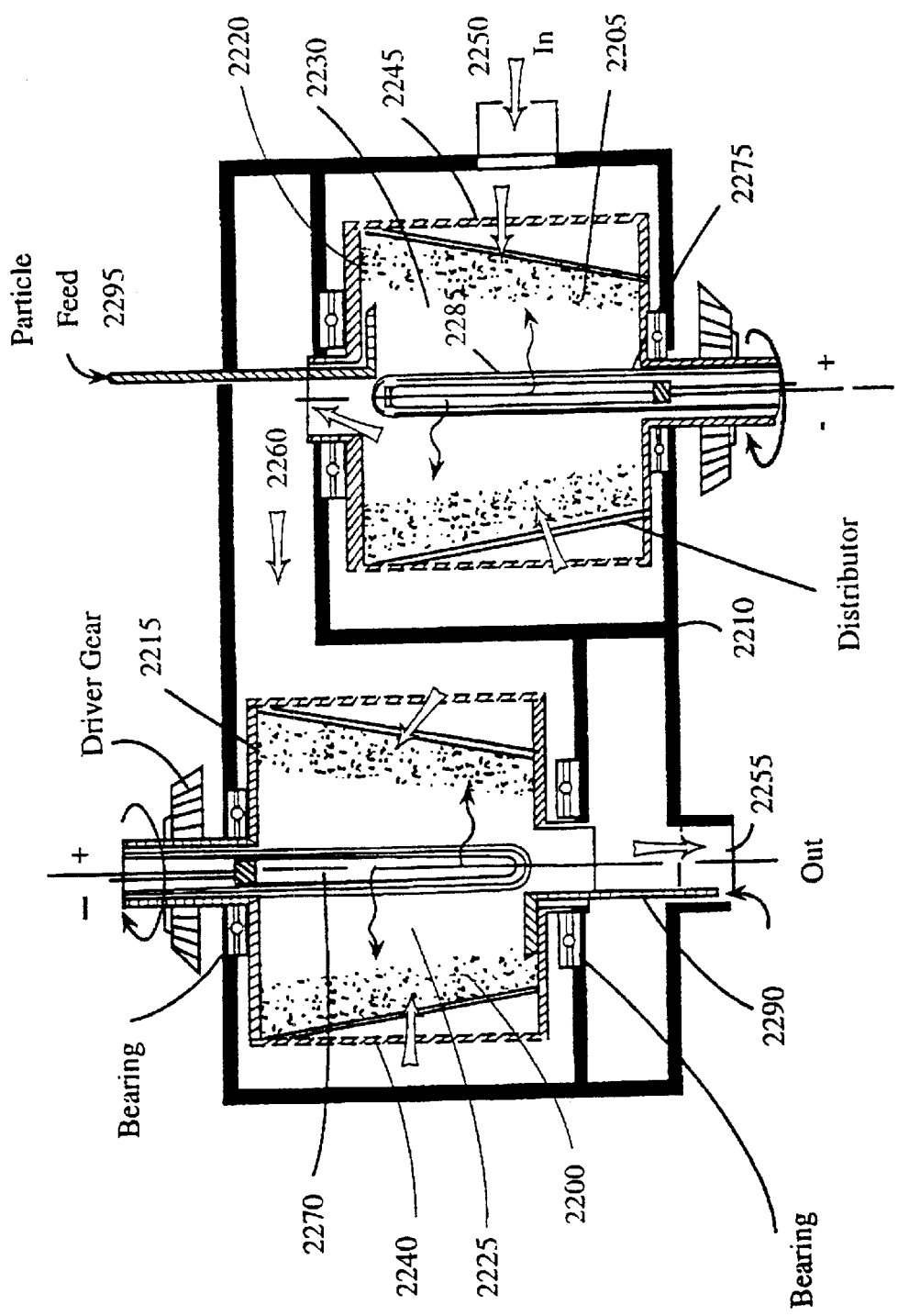
FIG. 22 depicts one embodiment of the present invention's high-flux media and photocatalytic reactor design.

The preferred embodiments and design of the high-flux catalytic media of the present invention is now disclosed with reference to FIG. 22. FIG. 22 depicts a 2-stage high-flux version of the low-flux full-scale unit of EXAMPLE 17, described before. The high-flux catalytic media 2200 & 2205 useful for the practice of this invention are from the group of dual function catalysts of the Type III (e.g. transparent co-gelled $SiO_2/TiO_2$ aerogels) and Type V (e.g. cation modified zeolites and noble or base metal supported titania). These moderate temperature catalytic media (approximately 200–400° C.) are most suited for the high-flux thermocatalytic and photocatalytic process engineering and reactor design applications.

The high-flux reactor design also follows the same guidelines described before for the low-flux reactor design and analysis. One preferred embodiment of the present invention for the high-flux reactor configuration that readily satisfies the decoupling requirements is rotating fluidized bed reactor 2210. FIG. 22 depicts one preferred embodiment of this Invention. The unit comprises two rotating fluidized bed reactors 2215 & 2220, in tandem, which rotate in the direction of arrow RI within a plenum vessel 2210. The baskets 2225 & 2230 rotate at high speed to hold catalyst particles within by the centrifugal action. The contaminant stream enters via perforated basket wall and distributor 2240 & 2245. The contaminated flow 2250 enters radially and exits axially, at the top 2255 and bottom 2260 of basket 2225 and 2230. High-flux lamps 2270 & 2275 (e.g. medium pressure mercury lamps such as Voltarc Tubes, Inc. UV LUX series lamps) are placed into the fused-silica sleeves 2280 & 2285 located at the middle, along the axis of the reactor, see FIG. 22. Two identical reactors 2225 & 2230 in series provide higher combined process efficiency due to partial decoupling effect, discussed before. The rotational speed of the baskets can be varied automatically to control catalyst carry over. This is particularly important in the case of transition metal aerogels as the bed material. Catalyst particles can be fed into the reactors through the injection tubes 2290 & 2295. The rotating beds 2230 & 2240 can be operated in either horizontal or vertical configuration. The type of catalytic media used in each reactor can be the same or different depending on the type of waste stream to be treated. Means can be provided for easy loading and removal of the bed materials. It is possible to run the centrifugal reactor under either fluidizing or packed bed conditions. The reactor parameters can be readily modified to meet the requirements of the treatment process.

It is to be noted that the contaminated stream that can be treated with the methods of the subject invention can be a fluid such as but not limited to air, gas, liquid, combination thereof and the like. As noted before, the contaminated stream can contain solid and particulate matter.

Although some preferred embodiments show the direction of the stream containing contaminants in one direction, the invention can effectively operate with the contaminant flow through the opposite direction, i.e. through inlet end to outlet end, and vice versa.

It is to be understood that the disclosure above is meant to be representative of the techniques and methods most useful to the practice of this invention. Since many modifications to the main embodiments of the invention can be made without departing from the spirit and scope of the invention, it is intended that all matter contained in the above description and shove in the accompanying drawings shall be interpreted as illustrative and not in a limiting sense.

It is also to be understood that the following claims are intended to cover all generic and specific features of the invention herein described and all statements of the scope of the invention which, as a matter of language, might be said to fall therebetween. Particularly, it is to be understood that in said claims, features, ingredients or compounds recited in the singular are intended to include compatible mixtures of such ingredients wherever the sense permits.

We claim:

1. A photocatalytic and thermocatalytic pollution control system, comprising:
   means for producing a target pollutant having a varying flow rate;
   a photocatalytic and thermocatalytic reactor having at least one light-heat source; and
   a loosely positioned photocatalytic and thermocatalytic media in the reactor for forming a fluidized bed, the fluidized bed for converting the varying flow rate target pollutant that passes through the reactor to a selected level of destruction and removal efficiency(DRE).

2. The photocatalytic and thermocatalytic pollution control system of claim 1, further comprising:
   means for rotating the fluidized bed about the at least one light-heat source.

3. The photocatalytic and thermocatalytic pollution control system of claim 1, wherein the light source includes:
   a high flux lamp source.

4. A photocatalytic and thermocatalytic pollution control system, comprising:
   means for producing a target pollutant having a varying flow rate;
   a first reactor having at least one photocatalytic media and at least one light source, wherein the at least one photocatalytic media and the at least one light source include: a low flux light source with organic polymer substrate adapted to operate below a sol-gel processing temperature, and a high flux lamp source with loosely positioned photocatalytic media that forms a fluidized bed, the fluidized bed for converting a target pollutant that passes through the photocatalytic media to a first selected level of destruction and removal efficiency (DRE); and
   a second reactor having at least one thermocatalytic media and at least one heat source for converting the target pollutant that passes through the at least one thermocatalytic media to a second selected level of destruction and removal efficiency (DRE).

5. A low flux and high flux photocatalytic pollution control system, comprising:
   means for producing a target pollutant having a varying flow rate; and
   a least one reactor having at least one photocatalytic media with both a high flux and low flux light source, wherein the at least one photocatalytic media includes at least one of: an organic polymer substrate adapted to operate below a sol-gel processing temperature, and loosely positioned photocatalytic media forming a fluidized bed, the one photocatalytic media for converting the varying flow rate target pollutant that passes through the at least one reactor to a selected level of destruction and removal efficiency(DRE).

6. The low flux and high flux photocatalytic pollution control system of claim 5, wherein the one photocatalytic media includes: the organic polymer substrate adapted to operated below the sol-gel processing temperature.

7. The low flux and high flux photocatalytic pollution control system of claim 5, wherein the one photocatalytic media includes: the fluidized bed.

8. The low flux and high flux photocatalytic pollution control system of claim 5, wherein the at least one reactor includes: a single reactor having a single low flux and high flux activated photocatalytic media.

9. The low flux and high flux photocatalytic pollution control system of claim 5, wherein the at least one reactor includes: a single reactor having a single low flux and a single high flux activated photocatalytic media.

10. The low flux and high flux photocatalytic pollution control system of claim 9, wherein the low flux photocatalytic media and the high flux photocatalytic media are in series to one another.

11. The low flux and high flux photocatalytic pollution control system of claim 9, wherein the low flux photocatalytic media and the high flux photocatalytic media are in parallel to one another.

12. The low flux and high flux photocatalytic pollution control system of claim 5, wherein the at least one reactor includes: two reactors in series to one another.

13. The low flux and high flux photocatalytic pollution control system of claim 5, wherein the at least one reactor includes: two reactors in parallel to one another.

* * * * *